US012806910B2

(12) United States Patent
Hayashi et al.

(10) Patent No.: US 12,806,910 B2
(45) Date of Patent: Nov. 24, 2026

(54) INK CONTAINER

(71) Applicant: BROTHER KOGYO KABUSHIKI KAISHA, Nagoya (JP)

(72) Inventors: Masahiro Hayashi, Anjo (JP); Satoru Oki, Nagoya (JP); Yuma Tanabe, Nagoya (JP); Naoya Okazaki, Hashima (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 207 days.

(21) Appl. No.: 18/787,499

(22) Filed: Jul. 29, 2024

(65) Prior Publication Data

US 2025/0042170 A1 Feb. 6, 2025

(30) Foreign Application Priority Data

Jul. 31, 2023 (JP) ................................ 2023-124426

(51) Int. Cl.
*B41J 2/175* (2006.01)

(52) U.S. Cl.
CPC ......... *B41J 2/17553* (2013.01); *B41J 2/1752* (2013.01); *B41J 2/17526* (2013.01)

(58) Field of Classification Search
CPC .. B41J 2/17513; B41J 2/17553; B41J 2/1752; B41J 2/17503; B41J 2/175; B41J 2/17509; B41J 2/17506; B41J 2/17523; B41J 2/17526
See application file for complete search history.

(56) References Cited

U.S. PATENT DOCUMENTS

| | | | | |
|---|---|---|---|---|
| 2014/0168324 | A1 | 6/2014 | Sasaki | |
| 2018/0272728 | A1* | 9/2018 | Ono | B41J 2/17509 |
| 2023/0045050 | A1 | 2/2023 | Oki et al. | |

FOREIGN PATENT DOCUMENTS

| | | | | |
|---|---|---|---|---|
| EP | 3112163 | B1 * | 11/2019 | B41J 2/1752 |
| JP | 2009-132098 | A | 6/2009 | |
| JP | 2014-117836 | A | 6/2014 | |
| JP | 2023-22950 | A | 2/2023 | |
| WO | WO-2019026103 | A1 * | 2/2019 | B41J 2/1752 |

* cited by examiner

*Primary Examiner* — Jannelle M Lebron
(74) *Attorney, Agent, or Firm* — Merchant & Gould P.C.

(57) ABSTRACT

An ink container is attachable to an attachment portion. The ink container includes a first member and a second member. The first member includes a chamber configured to store ink and a supply portion having a supply opening that opens forward in a front-rear direction. The second member is positioned forward of the first member.

13 Claims, 34 Drawing Sheets

INK CONTAINER

REFERENCE TO RELATED APPLICATIONS

This application claims priority from Japanese Patent Application No. 2023-124426 filed on Jul. 31, 2023. The entire content of the priority application is incorporated herein by reference.

BACKGROUND ART

An ink cartridge having an ink supply port for supplying stored ink to the outside is known. Further, there is known a cartridge attachment portion including an ink supply tube connected to the ink supply port and a lock portion for holding the ink cartridge. The ink cartridge that has entered the cartridge attachment portion rotates about the center of the ink supply port connected to the ink supply tube so that the rear side moves upward. The rear side of the ink cartridge moves upward, whereby the ink cartridge comes in contact with the lock portion and is held by the cartridge attachment portion. When the ink cartridge is removed from the cartridge attachment portion, the ink cartridge is separated from the lock portion by rotating in a direction opposite to the rotation direction when the ink cartridge is mounted.

SUMMARY

An ink container is attachable to an attachment portion. The ink container includes a first member and a second member. The first member includes a chamber configured to store ink and a supply portion having a supply opening that opens forward in a front-rear direction. The second member is positioned forward of the first member.

BRIEF DESCRIPTION OF THE DRAWINGS

FIG. 13A is a cross-sectional view of the ink cartridge 30 and the cartridge case 110, taken along a vertical plane intersecting a lower surface 70 of the ink cartridge 30.

FIG. 13B is a cross-sectional view of the ink cartridge 30 and the cartridge case 110, taken along a vertical plane intersecting a first key portion 77 of the ink cartridge 30.

FIG. 14A is a cross-sectional view of the ink cartridge 30 and the cartridge case 110, taken along a vertical plane intersecting a lower surface 70 of the ink cartridge 30.

FIG. 14B is a cross-sectional view of the ink cartridge 30 and the cartridge case 110, taken along a vertical plane intersecting a first key portion 77 of the ink cartridge 30.

FIG. 15A is a cross-sectional view of the ink cartridge 30 and the cartridge case 110, taken along a vertical plane intersecting a lower surface 70 of the ink cartridge 30.

FIG. 15B is a cross-sectional view of the ink cartridge 30 and the cartridge case 110, taken along a vertical plane intersecting a first key portion 77 of the ink cartridge 30.

FIG. 16A is a cross-sectional view of the ink cartridge 30 and the cartridge case 110, taken along a vertical plane intersecting a lower surface 70 of the ink cartridge 30.

FIG. 16B is a cross-sectional view of the ink cartridge 30 and the cartridge case 110, taken along a vertical plane intersecting a first key portion 77 of the ink cartridge 30.

DESCRIPTION

Figure 1:
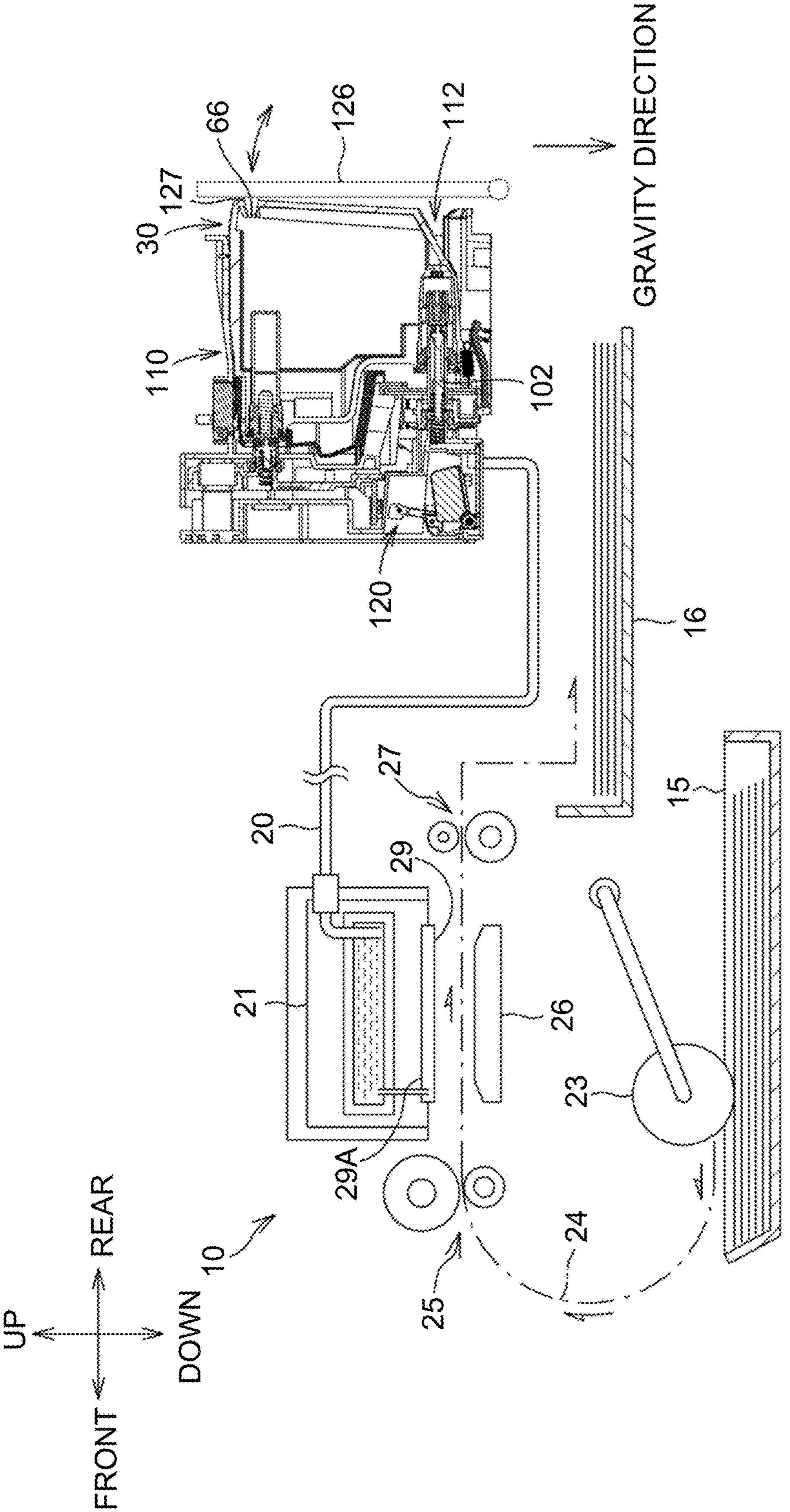
FIG. 1 is a longitudinal sectional view schematically showing an internal structure of a printer 10.

For example, an ink cartridge includes a positioning surface for determining a position of the ink cartridge in an up-down direction in the cartridge attachment portion. The positioning surface of the ink cartridge is brought into contact with the cartridge attachment portion, whereby the ink cartridge is held in a state where the position is determined in the up-down direction in the cartridge attachment portion. When the positioning surface of the ink cartridge is in contact with the cartridge attachment portion, the amount of movement of the ink cartridge when the ink cartridge is rotated in the cartridge attachment portion is limited.

The present disclosure provides an ink container that can be easily rotated in a state where a position of the ink container is determined in the up-down direction in an attachment portion.

(1) The present disclosure relates to an ink container attachable to an attachment portion. The ink container may includes: a first member that includes a chamber configured to store ink and a supply portion having a supply opening that opens forward in a front-rear direction; and a second member positioned forward of the first member. The first member includes: a first contact surface that is positioned upward of the supply opening in an up-down direction orthogonal to the front-rear direction, faces rearward in the front-rear direction, and is in contact with the attachment portion in an attached state where the ink container is attached to the attachment portion; a first engagement portion positioned at one side of the first member in a left-right direction intersecting the front-rear direction and the up-down direction; and a second engagement portion positioned at an other side of the first member in the left-right direction. The second member includes: a second contact surface that faces upward in the up-down direction and is in contact with the attachment portion in the attached state; a third contact surface that faces downward in the up-down direction and is configured to be in contact with the attachment portion in the attached state; a third engagement portion configured to engage with the first engagement portion; and a fourth engagement portion configured to engage with the second engagement portion. The first member is rotatable, with respect to the second member, about a rotation axis extending in the left-right direction.

The second member is positioned in the up-down direction in the attachment portion by the second contact surface and the third contact surface contacting with the attachment portion. The first member is rotatable about a rotation axis in the left-right direction with respect to the second member of which the position is determined in the up-down direction. The first contact portion comes into contact with the attachment portion by the rotation of the first member. The first contact portion is in contact with the attachment portion, and thus the ink container inserted into the attachment portion does not move rearward.

(2) The second member includes an electrical interface having an electrode facing upward. The first member is movable, with respect to the second member, in the up-down direction.

In the attachment portion, the position of the second member is determined in the up-down direction regardless of the position of the first member in the up-down direction. The position of the second member is determined in the up-down direction, and thus the position of the electrode of the electrical interface is determined in the up-down direction. This configuration can stabilize the electrical contact of the electrical interface with the electrode.

(3) The first member includes a right surface facing rightward in the left-right direction and a left surface facing leftward in the left-right direction. The first engagement portion is a protrusion that protrudes rightward in the left-right direction from the right surface. The second engagement portion is a protrusion that protrudes leftward in the left-right direction from the left surface. The third engagement portion is a recess configured to engage with the first engagement portion. The fourth engagement portion is a recess configured to engage with the second engagement portion.

(4) The first engagement portion is provided by a first protrusion and a second protrusion, as the protrusions. The second engagement portion is provided by a third protrusion and a fourth protrusion, as the protrusions. The third engagement portion is provided by a first through hole and a second through hole, as the recesses. The fourth engagement portion is provided by a third through hole and a fourth through hole, as the recesses. The first through hole and the second through hole are arranged in the up-down direction. The third through hole and the fourth through hole are arranged in the up-down direction. The first through hole is engaged with the first protrusion, and has a distance in the front-rear direction greater than a distance of the first protrusion in the front-rear direction and a distance in the up-down direction greater than a distance of the first protrusion in the up-down direction. The second through hole is engaged with the second protrusion, and has a distance in the front-rear direction greater than a distance of the second protrusion in the front-rear direction and a distance in the up-down direction greater than a distance of the second protrusion in the up-down direction. The third through hole is engaged with the third protrusion, and has a distance in the front-rear direction greater than a distance of the third protrusion in the front-rear direction and a distance in the up-down direction greater than a distance of the third protrusion in the up-down direction. The fourth through hole is engaged with the first protrusion, and has a distance in the front-rear direction greater than a distance of the fourth protrusion in the front-rear direction and a distance in the up-down direction greater than a distance of the fourth protrusion in the up-down direction.

(5) The first protrusion is a quadrangular pole having a first front surface and a first rear surface. The second protrusion is a quadrangular pole having a second front surface and a second rear surface. The third protrusion is a quadrangular pole having a third front surface and a third rear surface. The fourth protrusion is a quadrangular pole having a fourth front surface and a fourth rear surface. The first through hole has a first surface that faces the first front surface and a second surface that faces the first rear surface. The second through hole has a third surface that faces the second front surface and a fourth surface that faces the second rear surface. The third through hole has a fifth surface that faces the third front surface and a sixth surface that faces the third rear surface. The fourth through hole has a seventh surface that faces the fourth front surface and an eighth surface that faces the fourth rear surface. Each of the first front surface, the second front surface, the third front surface, and the fourth front surface extends in the up-down direction. A distance in the front-rear direction between the first surface and the second surface is greater than a distance in the front-rear direction between the third surface and the fourth surface. A distance in the front-rear direction between the fifth surface and the sixth surface is greater than a distance in the front-rear direction between the seventh surface and the eighth surface.

(6) The first surface is positioned rearward of the third surface. The fifth surface is positioned rearward of the seventh surface.

(7) The second surface is inclined, with respect to the first rear surface, so as to extend rearward as the second surface extends upward. The sixth surface is inclined, with respect to the third rear surface, so as to extend rearward as the sixth surface extends upward.

(8) The first rear surface is inclined, with respect to the second surface, so as to extend forward as the first rear surface extends upward. The third rear surface is inclined, with respect to the sixth surface, so as to extend forward as the third rear surface extends upward.

(9) The first protrusion has a first front surface and a second front surface. The second protrusion has a third front surface and a fourth front surface. The first through hole has a first surface that faces the first front surface and a second surface that faces the second front surface. The second through hole has a third surface that faces the third front surface and a fourth surface that faces the fourth front surface. The first front surface is inclined with respect to the up-down direction so as to extend rearward as the first front surface extends upward. The second front surface is inclined with respect to the up-down direction so as to extend frontward as the second front surface extends upward. The third front surface is inclined with respect to the up-down direction so as to extend rearward as the third front surface extends upward. The fourth front surface is inclined with respect to the up-down direction so as to extend frontward as the fourth front surface extends upward. The first surface is inclined with respect to the up-down direction so as to extend rearward as the first surface extends upward. The second surface is inclined with respect to the up-down direction so as to extend forward as the second surface extends upward. The third surface is inclined with respect to the up-down direction so as to extend rearward as the third surface extends upward. The fourth surface is inclined with respect to the up-down direction so as to extend forward as the fourth surface extends upward.

(10) The first engagement portion is provided by a first protrusion and a second protrusion, as the protrusions. The second engagement portion is provided by a third protrusion and a fourth protrusion, as the protrusions. The third engagement portion is provided by a first through hole and a second through hole, as the recesses. The fourth engagement portion is provided by a third through hole and a fourth through hole, as the recesses. The first through hole and the second through hole are arranged in the up-down direction. The third through hole and the fourth through hole are arranged in the up-down direction. The first through hole is engaged with the first protrusion, and has a distance in the front-rear direction greater than a distance of the first protrusion in the front-rear direction and a distance in the up-down direction greater than a distance of the first protrusion in the up-down direction. The second through hole is engaged with the second protrusion. The third through hole is engaged with the third protrusion, and has a distance in the front-rear direction greater than a distance of the third protrusion in the front-rear direction and a distance in the up-down direction greater than a distance of the third protrusion in the up-down direction. The fourth through hole is engaged with the first protrusion. The first protrusion is a quadrangular pole. The second protrusion is a cylinder. The first protrusion is a quadrangular pole. The first protrusion is a cylinder.

(11) The first engagement portion is provided by a first protrusion and a second protrusion, as the protrusions. The second engagement portion is provided by a third protrusion and a fourth protrusion, as the protrusions. The third engagement portion is provided by a first through hole and a second through hole, as the recesses. The fourth engagement portion is provided by a third through hole and a fourth through hole, as the recesses. The first through hole and the second through hole are arranged in the up-down direction. The third through hole and the fourth through hole are arranged in the up-down direction. The first through hole is engaged with the first protrusion, and has a distance in the front-rear direction greater than a distance of the first protrusion in the front-rear direction and a distance in the up-down direction greater than a distance of the first protrusion in the up-down direction. The second through hole is engaged with the second protrusion, and has a distance in the front-rear direction greater than a distance of the second protrusion in the front-rear direction and a distance in the up-down direction greater than a distance of the second protrusion in the up-down direction. The third through hole is engaged with the third protrusion, and has a distance in the front-rear direction greater than a distance of the third protrusion in the front-rear direction and a distance in the up-down direction greater than a distance of the third protrusion in the up-down direction. The fourth through hole is engaged with the first protrusion, and has a distance in the front-rear direction greater than a distance of the fourth protrusion in the front-rear direction and a distance in the up-down direction greater than a distance of the fourth protrusion in the up-down direction. The first protrusion and the second protrusion are different in position in the front-rear direction, and are arranged in the up-down direction. The third protrusion and the fourth protrusion are different in position in the front-rear direction, and are arranged in the up-down direction.

(12) The second member has an inner surface that faces the first member. The third engagement portion is a protrusion that protrudes rightward from an inner surface of the second member. The fourth engagement portion is a protrusion that protrudes leftward from an inner surface of the second member. The first engagement portion is a recess that engages with the third engagement portion. The second engagement portion is a recess that engages with the fourth engagement portion.

(13) The third engagement portion is provided by a first protrusion and a second protrusion, as the protrusions. The fourth engagement portion is provided by a third protrusion and a fourth protrusion, as the protrusions. The first engagement portion is provided by a first recess and a second recess, as the recesses. The second engagement portion is provided by a third recess and a fourth recess, as the recesses. The first protrusion and the second protrusion are arranged in the up-down direction. The third protrusion and the fourth protrusion are arranged in the up-down direction. The first recess engages with the first protrusion, has a distance in the front-rear direction greater than a distance of the first protrusion in the front-rear direction and a distance in the up-down direction greater than a distance of the first protrusion in the up-down direction. The second recess engages with the second protrusion, has a distance in the front-rear direction greater than a distance of the second protrusion in the front-rear direction and a distance in the up-down direction greater than a distance of the second protrusion in the up-down direction. The third recess engages with the third protrusion, has a distance in the front-rear direction greater than a distance of the third protrusion in the front-rear direction and a distance in the up-down direction greater than a distance of the third protrusion in the up-down direction. The fourth recess engages with the fourth protrusion, has a distance in the front-rear direction greater than a distance of the fourth protrusion in the front-rear direction and a distance in the up-down direction greater than a distance of the fourth protrusion in the up-down direction.

(14) The present disclosure relates to a cover attached to an ink frame. The ink frame includes: a chamber configure to store ink; a supply portion that extends from the chamber in a front-rear direction; a left surface that faces leftward in a left-right direction orthogonal to the front-rear direction; a first engagement portion that protrudes from the left surface; a right surface that faces rightward in the left-right direction; and a second engagement portion that protrudes from the right surface. The cover includes: a third engagement portion, as a recess, configured to engage with the first engagement portion, and a fourth engagement portion, as a recess, configured to engage with the second engagement portion. The cover engages with the ink frame so that the ink frame is rotatable, with respect to the cover, about a rotation axis in the left-right direction.

(15) The present disclosure relates to cover attached to an ink frame. The ink frame includes: a chamber configure to store ink; a supply portion that extends from the chamber in a front-rear direction; a left surface that faces leftward in a left-right direction orthogonal to the front-rear direction; a first engagement portion that protrudes from the left surface; a right surface that faces rightward in the left-right direction; and a second engagement portion that protrudes from the right surface. The cover includes; a third engagement portion, as a protrusion, configured to engage with the first engagement portion, and a fourth engagement portion, as a protrusion, configured to engage with the second engagement portion. The cover engages with the ink frame so that the ink frame is rotatable, with respect to the cover, about a rotation axis in the left-right direction.

According to the present disclosure, the position of the ink container determined in the up-down direction in the attachment portion is easily rotated.

Hereinafter, embodiments of the present disclosure will be described with reference to the drawings as appropriate.

In the following, an ink cartridge 30 is inserted into and removed from a cartridge case 110 in a horizontal direction (a direction orthogonal to the gravity direction). Further, whenever appropriate, a frontward direction and a rearward direction may be collectively referred to as a front-rear direction. An upward direction and a downward direction may be collectively referred to as an up-down direction. A rightward direction and a leftward direction may be collectively referred to as a right-left direction. The description will be made on the assumption that the front-rear direction and the right-left direction are horizontal directions. Further, a vertical direction orthogonal to the front-rear direction is defined as the up-down direction. A direction orthogonal to the up-down direction and the front-rear direction is defined as the right-left direction. Note that an attached state in which the ink cartridge 30 is attached to the cartridge case 110 is a state in which the ink cartridge 30 has been inserted to an attachment position in the cartridge case 110 and is ready to be used with the printer 10. The attachment position is a position at which a supply tube 102 provided in the cartridge case 110 is inserted into a supply port 34 provided in the ink cartridge 30 and is connected to the supply port 34.

Hereinafter, the posture of the ink cartridge 30 when the ink cartridge 30 is in the attached state and is ready to be used with the printer 10 is referred to as a usage posture or an upright posture. Unless otherwise specified, when the positional relations between the components of the ink cartridge 30 are described with the terms "up", "down", "left", "right", "front", and "rear" and when the orientations or directions of the components of the ink cartridge 30 are described with the terms "up", "down", "left", "right", "front", and "rear", such descriptions are made based on when the ink cartridge 30 is in the usage posture. Moreover, when the positions, orientations or directions of the ink cartridge 30 itself is described with the terms "up", "down", "left", "right", "front", and "rear", such descriptions are made based on when the ink cartridge 30 is in the usage posture. The ink cartridge 30 is inserted into the cartridge case 110 in the frontward direction, which direction may be referred to as an attachment direction. The ink cartridge 30 is removed from the cartridge case 110 in the rearward direction. When it is described that a component of the ink cartridge 30 faces a certain direction, the direction in which the component faces is not strictly limited to that certain direction only. For example, when it is described that "a front surface faces frontward", the front surface may face frontward and upward.

Figure 7:
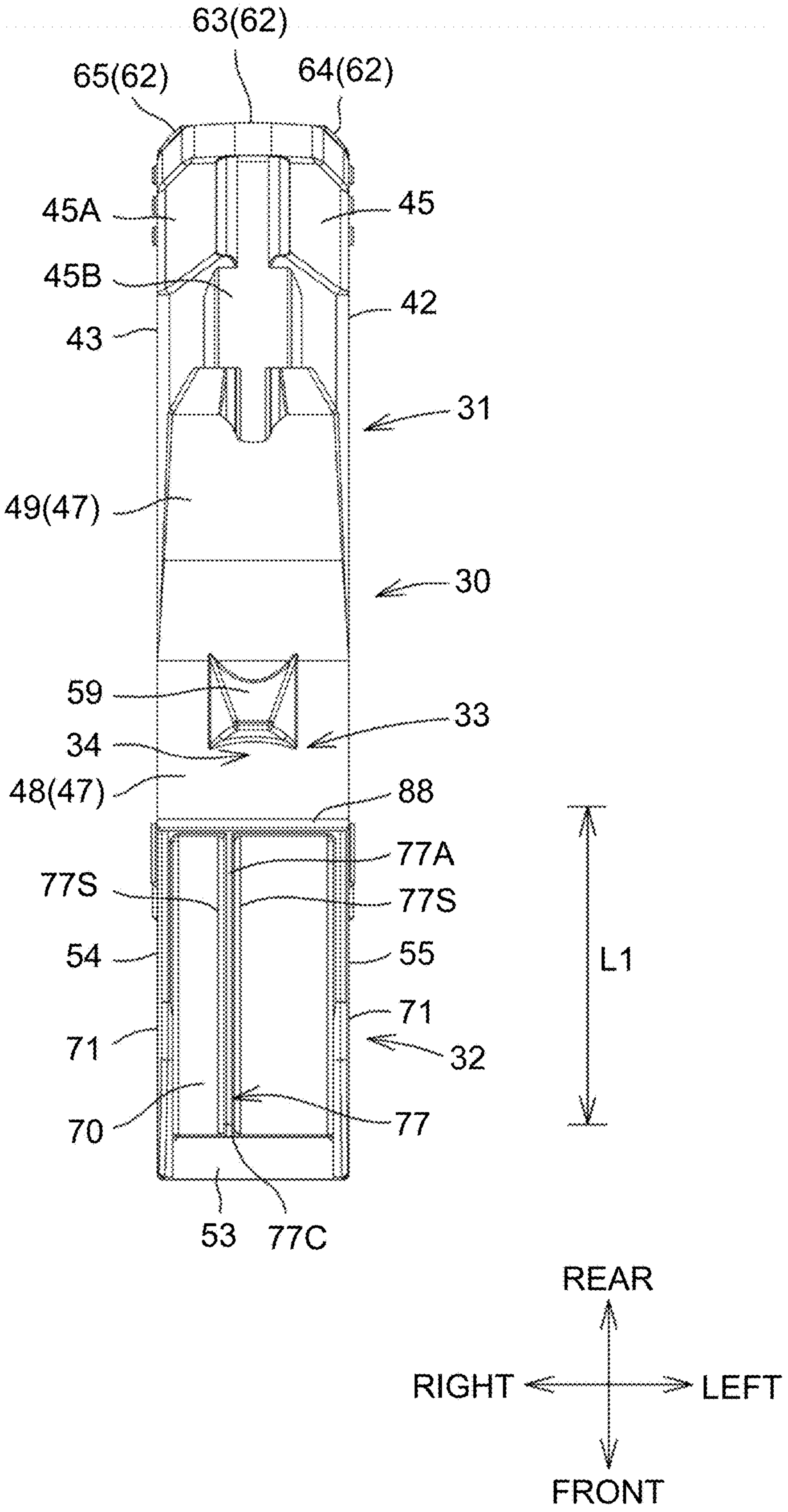
FIG. 7 is a bottom view of the ink cartridge 30.
Figure 8:
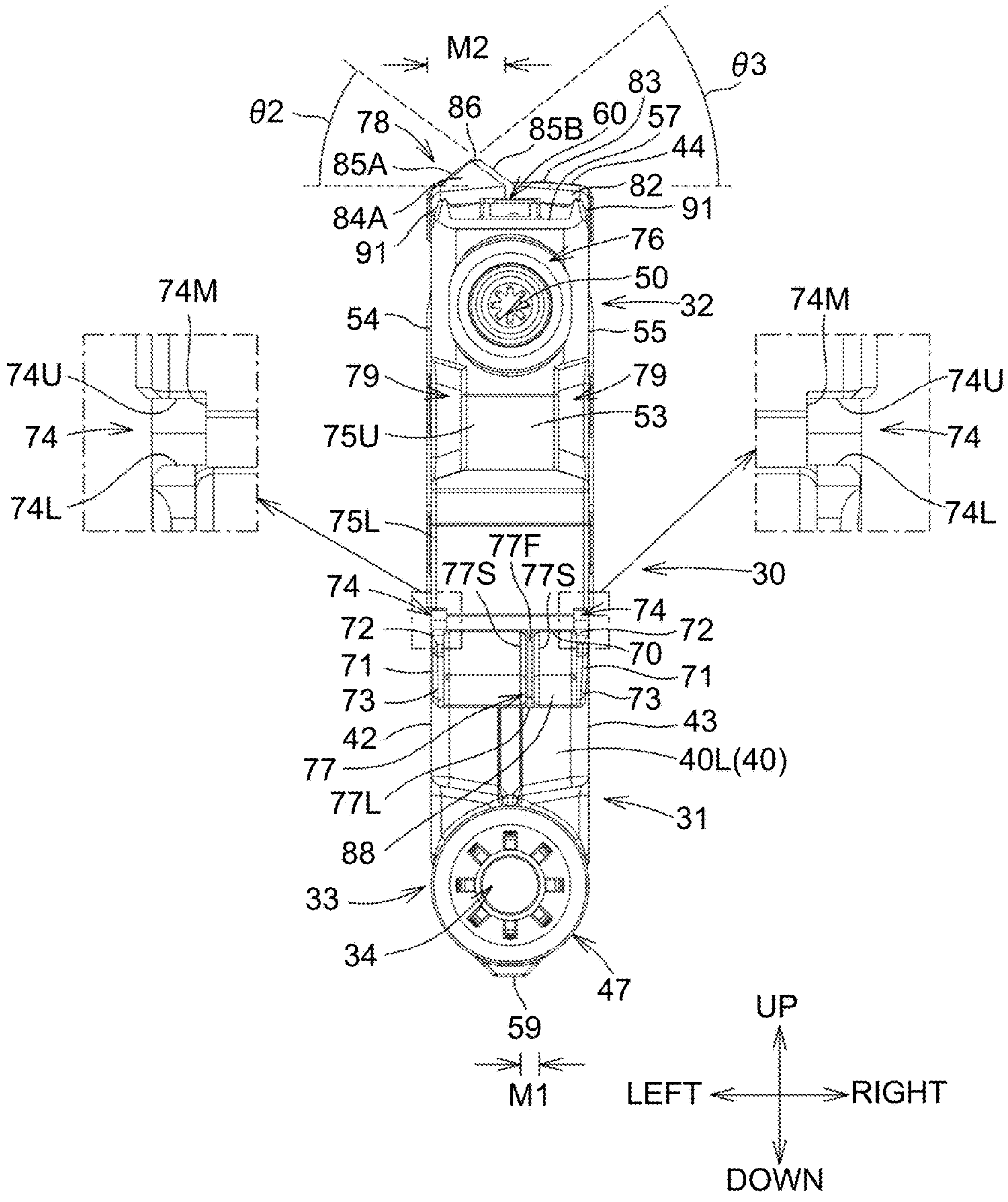
FIG. 8 is a front view of the ink cartridge 30.

A front surface of the ink cartridge 30 is a surface appearing in the front view shown in FIG. 8. A rear surface of the ink cartridge 30 is a surface appearing in the rear view shown in FIG. 9. An upper surface of the ink cartridge 30 is a surface appearing in the plan view shown in FIG. 6. A lower surface of the ink cartridge 30 is a surface appearing in the bottom view shown in FIG. 7. A left surface of the ink cartridge 30 is a surface appearing in the left side view shown FIG. 10. A right surface of the ink cartridge 30 is a surface appearing in the right side view shown in FIG. 5.

[Outline of Printer 10]

As shown in FIG. 1, the printer 10 includes the cartridge case 110, a sub-tank 120, an ink tube 20, a recording head 21, and the ink cartridge 30. The printer 10 is an inkjet recording apparatus, for example, an inkjet printer that records an image by ejecting ink droplets from the recording head 21 onto a sheet on the basis of an inkjet recording method. The printer 10 includes the cartridge case 110. The cartridge case 110 may be referred to as an attachment unit. The ink cartridge 30 is configured to be attached to the cartridge case 110. The ink cartridge 30 is an example of an ink container. The cartridge case 110 has an opening 112 at its rear end. The ink cartridge 30 is configured to be inserted frontward into the case 110 through the opening 112 and to be attached to the case 110 when the ink cartridge 30 reaches the attachment position. The ink cartridge 30 is configured to be detached and removed rearward from the case 110 through the opening 112. The opening 112 is covered by a cover 126 when the cover 126 is closed and is exposed to the outside of printer 10 when the cover 126 is opened. FIG. 1 shows a state in which the ink cartridge 30 is completely attached to the cartridge case 110. That is, FIG. 1 shows the ink cartridge 30 in the attached state. The posture of the ink cartridge 30 in the attached state is the usage posture.

The ink cartridge 30 stores ink that can be used in the printer 10. The ink may be a liquid containing a coloring material such as a pigment or a processing liquid not containing a coloring material, but containing an additive for improving the quality of image formed by the coloring material. In a state where the ink cartridge 30 is completely attached to the cartridge case 110, that is, when the ink cartridge 30 is in the attached state, the ink cartridge 30 and the recording head 21 are connected to each other via the ink tube 20. The recording head 21 discharges the ink supplied from the ink cartridge 30 from a plurality of nozzles 29. Specifically, a head control board included in the recording head 21 selectively applies a driving voltage to a plurality of piezoelectric elements 29A provided corresponding to the plurality of nozzles 29. As a result, ink is selectively ejected from the nozzles 29. That is, the recording head 21 consumes the ink stored in the ink cartridge 30 attached to the cartridge case 110.

The printer 10 includes a paper feed tray 15, a paper feed roller 23, a pair of conveyance rollers 25, a platen 26, a pair of discharge rollers 27, and a paper discharge tray 16. The paper feed roller 23 feeds a sheet on the paper feed tray 15 toward the conveyance path 24. The sheet fed to the conveyance path 24 reaches the pair of conveyance rollers 25. The pair of conveyance rollers 25 conveys the sheet that has reached the pair of conveyance rollers 25 onto the platen 26. The recording head 21 selectively ejects ink onto the sheet passing over the platen 26. Thus, an image is recorded on the sheet. The sheet having passed through the platen 26 reaches the pair of discharge rollers 27. The pair of discharge rollers 27 discharges the sheet that has reached the pair of discharge rollers 27 to the discharge tray 16 positioned at the most downstream end of the conveyance path 24.

[Cartridge Case 110]

Figure 2:
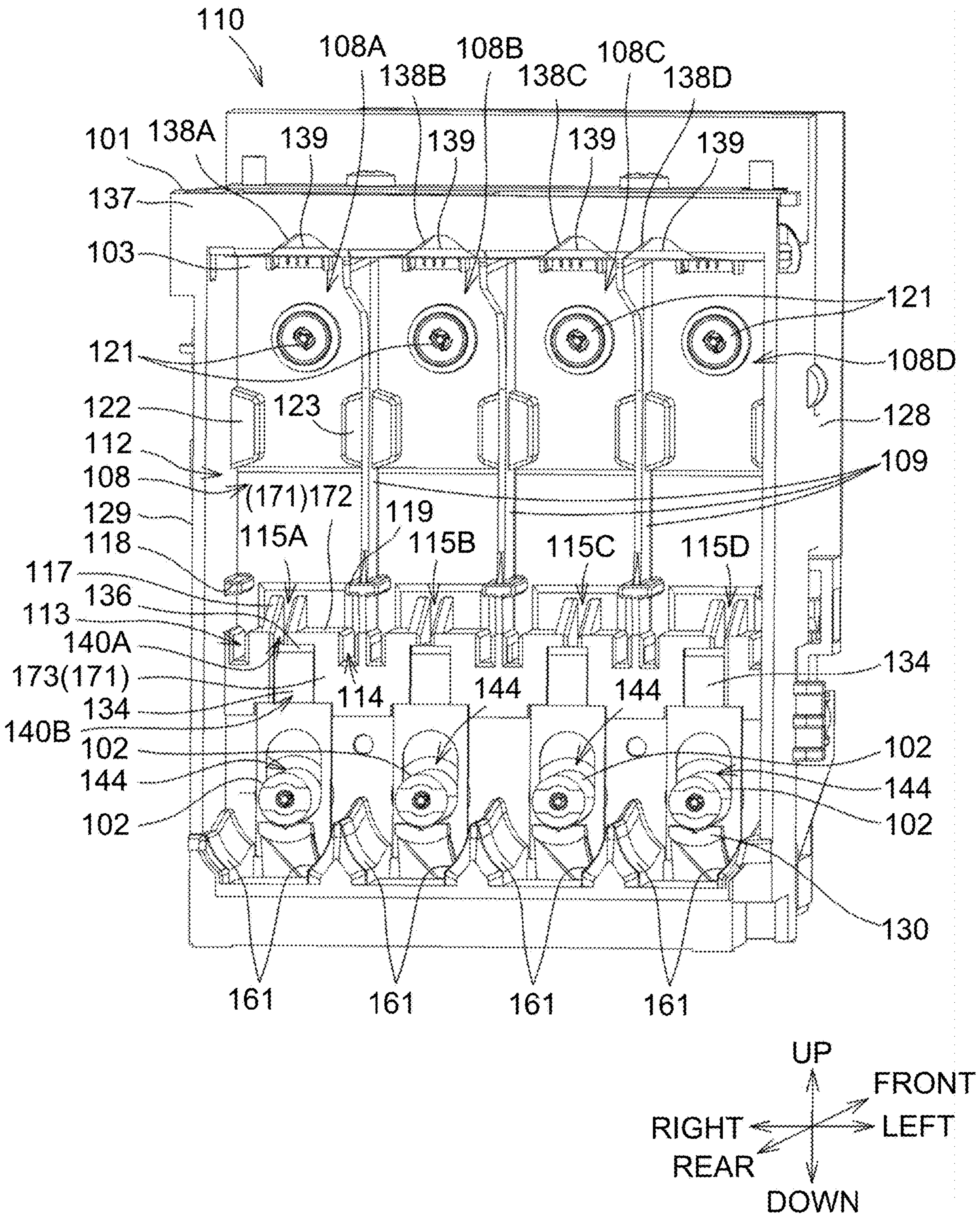
FIG. 2 is a rear perspective view of a cartridge case 110.

As shown in FIG. 2, the cartridge case 110 includes a case body 101 and a supply tube 102.

The case body 101 has a box shape. The case body 101 has an internal space to which the ink cartridge 30 is attached. The case body 101 has an end surface 103 that defines a front end in the attachment direction when the ink cartridge 30 is attached to the internal space, a left wall that defines a left end of the internal space, a right wall that defines a right end of the internal space, a lower wall, and a cover wall 171 that covers a pressing plate 134 described later. The cover wall 171 includes an upper wall 172 facing upward and a rear wall 173 extending downward from a rear end portion of the upper wall 172. The case body 101 has the opening 112 at its rear end. When the user opens the cover 126 to use the printer 10, the opening 112 is exposed.

The case body 101 has three partition walls 109 in its internal space. The three partition walls 109 are arranged at intervals in the left-right direction. The internal space of the case body 101 has four slots 108A, 108B, 108C, and 108D arranged in the left-right direction. Each of the four slots 108A, 108B, 108C, and 108D may be referred to as an attachment space. The slot 108A is positioned on the rightmost side among the four slots 108A to 108D. The slot 108B is positioned to the left of the slot 108A. The slot 108C is positioned to the left of the slot 108B. The slot 108D is positioned on the left of the slot 108C and on the leftmost side among the four slots 108A to 108D. The internal space of the case body 101 is partitioned into slots 108A, 108B, 108C, and 108D by three partition walls 109 that partition the internal space of the case body 101 and by the inner surface of the case body 101.

The partition wall 109 extends upward from the upper surface of the upper wall 172 of the cover wall 171. Three partition walls 109 are positioned at equal intervals in the left-right direction. The partition wall 109 has a flat plate shape extending in the up-down direction and the left-right direction. The partition wall 109 extends from the front end to the rear end of the upper wall 172.

Figure 13A:
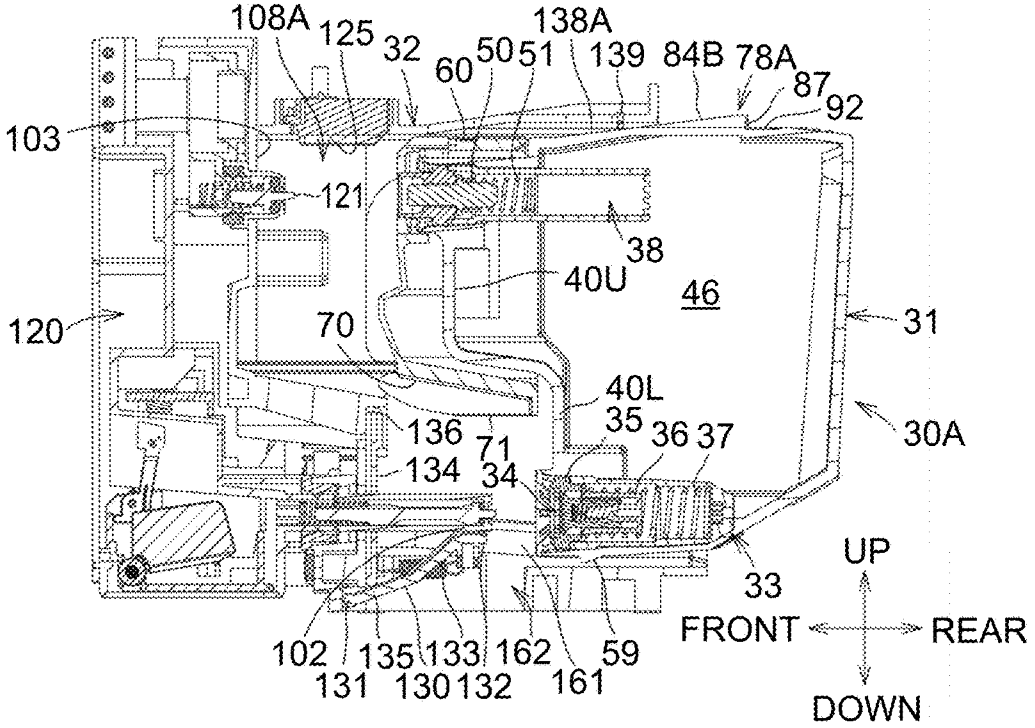
FIGS. 13A and 13B are cross-sectional views of the ink cartridge 30 and the cartridge case 110, each showing a state where the ink cartridge 30 is positioned in the cartridge case 110 and an ink receiving member 130 is positioned at a first position.
Figure 13B:
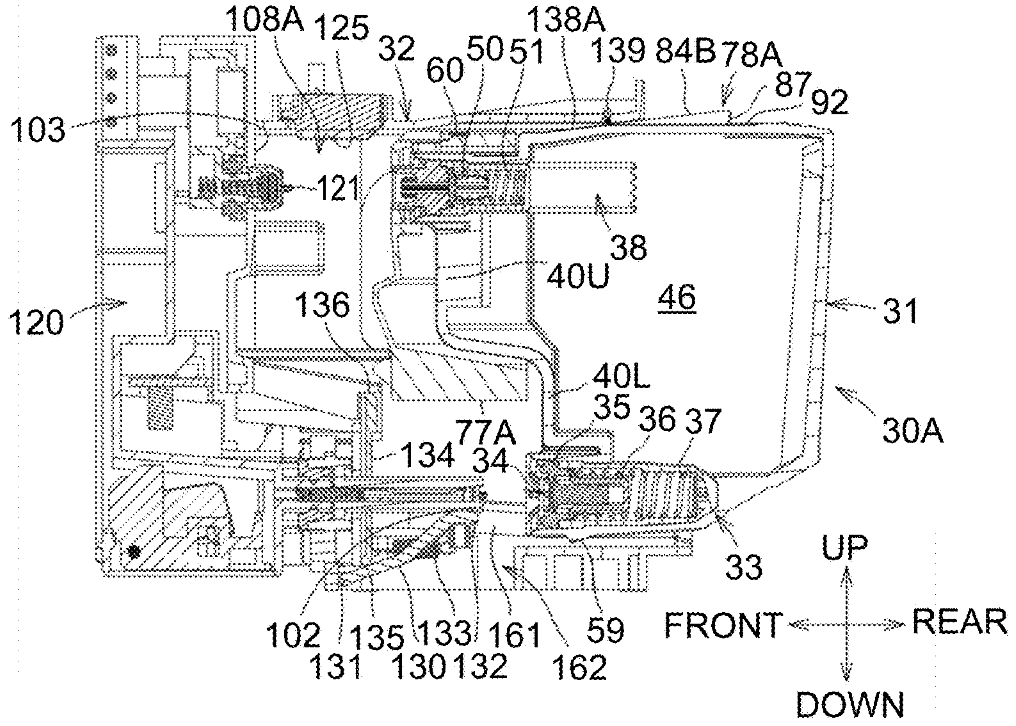

The case body 101 has a guide surface 161. The guide surface 161 is arranged in each of the slots 108A, 108B, 108C, and 108D. The guide surface 161 faces upward. The guide surface 161 is generally a semi-circumferential surface. When the ink cartridge 30 is attached to or detached from the case body 101, the guide surface 161 guides the ink cartridge 30 in the front-rear direction. The guide surface 161 supports the lower end of the ink cartridge 30 in the attached state where the ink cartridge 30 is attached to the case body 101. As shown in FIGS. 13A and 13B, a space 162 exists below the supply tube 102.

As shown in FIG. 2, the cover wall 171 is positioned below the end surface 103 of the case body 101. The upper wall 172 has a flat plate shape extending in the front-rear direction and the left-right direction. The upper wall 172 extends from the left wall to the right wall of the case body 101. The rear wall 173 has a flat plate shape extending in the up-down direction and the left-right direction. The rear wall 173 extends from the left wall to the right wall of the case body 101. In the rear wall 173, through holes 144 are positioned at equal intervals in the left-right direction in the respective slots 108A, 108B, 108C, and 108D. The guide surface 161 is positioned below the through hole 144. The supply tube 102 passes through the through hole 144 and protrudes rearward from the rear wall 173.

In each slot 108A, 108B, 108C, and 108D, the top wall 172 has a groove 113 and a groove 114. The groove 113 and the groove 114 in each of the slots 108A, 108B, 108C, and 108D have a common shape. The groove 113 is positioned at the left end of each of the slots 108A, 108B, 108C, and 108D, and the groove 114 is positioned at the right end of each of the slots 108A, 108B, 108C, and 108D. Both the groove 113 and the groove 114 are recessed downward from the upper wall 172 and extend along the front-rear direction so as to be open in the rear wall 173. The ink cartridge 30 includes a pair of walls 71 (described later) and each wall 71 is inserted into the corresponding one of the groove 113 and the groove 114.

In each of the slots 108A, 108B, 108C, and 108D, two protruding pieces 117 protruding upward from the upper wall 172 of the cover wall 171 and spaced apart from each other in the left-right direction are provided between the groove 113 and the groove 114 in the left-right direction. The upper wall 172 of the cover wall 171 has a through hole 140A that is continuous with a space between the two protruding pieces 117. The rear wall 173 of the cover wall 171 has a through hole 140B. The lower end of the through hole 140A and the upper end of the through hole 140B are continuous with each other. A first key slot 115 is positioned between the two protruding pieces 117 in each of the slots 108A, 108B, 108C, and 108D. Specifically, the slot 108A has a first key slot 115A, the slot 108B has a first key slot 115B, the slot 108C has a first key slot 115C, and the slot 108D has a first key slot 115D. The first key slot 115 opens upward and rearward. A first key portion 77 (described later) of the ink cartridge 30 is insertable into the first key slot 115.

The first key slots 115A, 115B, 115C, and 115D have different positions in the left-right direction with respect to the groove 113 and the groove 114. Specifically, the first key slot 115A is closer to the groove 113 than the center of the slot 108A between the groove 113 and the groove 114 in the left-right direction. The first key slot 115B is closer to the groove 114 in the slot 108B than the first key slot 115A is to the groove 114 in the slot 108A in the left-right direction. The first key slot 115C is closer to the groove 114 in the slot 108C than the first key slot 115B is to the groove 114 in the slot 108B in the left-right direction. The first key slot 115D is closer to the groove 114 in the slot 108D than the first key slot 115C is to the groove 114 in the slot 108C in the left-right direction.

In each slot 108A, 108B, 108C, and 108D, a rib 118 is positioned above the groove 113 and a rib 119 is positioned above the groove 114. At the slot 108A, the rib 118 protrudes from the inner surface of the right wall 129. At the slot 108B, the rib 118 protrudes from the partition wall 109 defining the right end of the slot 108B. At the slot 108C, the rib 118 protrudes from the partition wall 109 defining the right end of the slot 108C. At the slot 108D, the rib 118 protrudes from the partition wall 109 defining the right end of the slot 108C. At the slot 108A, the rib 119 protrudes from the partition wall 109 defining the left end of the slot 108A. At the slot 108B, the rib 119 protrudes from the partition wall 109 defining the left end of the slot 108B. At the slot 108C, the rib 119 protrudes from the partition wall 109 defining the left end of the slot 108C. At the slot 108D, the rib 119 protrudes from the inner surface of the left wall 128. The ribs 118 and 119 face each other in the left-right direction in each of the slots 108A, 108B, 108C, and 108D.

The supply tube 102 is positioned in the internal space of each of the slots 108A, 108B, 108C, and 108D. The supply tube 102 is positioned below each of the first key slots 115A, 115B, 115C, and 115D. The supply tube 102 has a hollow circular pipe shape. The supply tube 102 extends along the front-rear direction from a sub-tank 120 toward the internal space of each of the slots 108A, 108B, 108C, and 108D. A rear end of the supply tube 102 is opened. The rear end of the supply tube 102 is positioned in the inner space of each of the slots 108A, 108B, 108C, and 108D. Although not described in detail, a valve is disposed in the inner space of the supply tube 102. The valve opens and closes an opening of the supply tube 102. The supply tube 102 is connectable to the supply port 34 of the ink cartridge 30.

As shown in FIG. 1, a front end of the supply tube 102 is connected to the sub-tank 120. The sub-tank 120 has a space that stores the ink supplied from the ink cartridge 30 through the supply tube 102. The internal space of the sub-tank 120 communicates with the outside at the upper portion thereof and is open to the atmosphere. The ink in the sub-tank 120 is supplied to the recording head 21 through the ink tube 20.

As shown in FIG. 2, a rod 121 is positioned above each of the first key slots 115A, 115B, 115C, and 115D. The rod 121 protrudes rearward from the end surface 103. The rod 121 is connectable to an atmosphere opening passage 38 of the ink cartridge 30, which will be described later.

A fitting piece 122 and a fitting piece 123 are positioned above each of the first key slots 115A, 115B, 115C, and 115D and below the rod 121. The fitting piece 122 is a plate-like member. The fitting piece 122 protrudes leftward from the inner surface of the right wall 129 in the slot 108A. The fitting piece 122 protrudes leftward from the partition wall 109 defining the right end of the slot 108B. The fitting piece 122 protrudes leftward from the partition wall 109 defining the right end of the slot 108C. The fitting piece 122 protrudes leftward from the partition wall 109 defining the right end of the slot 108D. The fitting piece 123 is a plate-like member. The fitting piece 123 protrudes rightward from the partition wall 109 defining the left end of the slot 108A. The fitting piece 123 protrudes rightward from the partition wall 109 defining the left end of the slot 108B. The fitting piece 123 protrudes rightward from the partition wall 109 defining the left end of the slot 108C. The fitting piece 123 protrudes rightward from the inner surface of the left wall 128 in the slot 108D. The fitting piece 122 and the fitting piece 123 face each other in the left-right direction in the slot 108.

As shown in FIG. 13, in each of the slots 108A, 108B, 108C, and 108D, contacts 125 are positioned on the upper inner surface of the case body 101. The contacts 125 are electrically connectable to the IC board 60 of the ink cartridge 30. Through the contacts 125, a controller of the printer 10 reads information stored in the IC board 60 of the ink cartridge 30 and records information in the IC board 60.

As shown in FIGS. 13A and 13B, an ink receiving member 130 is positioned in the space 162 of the case body 101. The ink receiving member 130 is provided for each of the slots 108A, 108B, 108C, and 108D. The ink receiving member 130 has a front end portion 131 extending in the left-right direction. The front end portion 131 is supported by the case body 101. The ink receiving member 130 has a substantially flat plate shape extending rearward and upward from the front end portion 131, and a rear end portion 132 of the ink receiving member 130 is positioned in the vicinity of the rear end of the supply tube 102. The ink receiving member 130 rotates about the front end portion 131 so that the rear end portion 132 moves substantially in the up-down direction. A coil spring 133 extending along the front-rear direction is positioned between the ink receiving member 130 and the case body 101. The coil spring 133 urges, i.e., pulls the rear end portion 132 of the ink receiving member 130 frontward.

As shown in FIGS. 13A and 13B, the ink receiving member 130 urged, i.e., pulled by the coil spring 133 is held in a state where the rear end portion 132 is the closest to the lower surface of the supply tube 102. In this state, the rear end portion 132 is not in contact with the lower surface of the supply tube 102. The state where the rear end portion 132 of the ink receiving member 130 is the closest to the lower surface of the supply tube 102 is referred to as a closest state of the ink receiving member 130. In the state where the rear end portion 132 of the ink receiving member 130 is the closest to the lower surface of the supply tube 102, the ink receiving member 130 is positioned at a first position. In a state where the ink cartridge 30 is not attached to the supply tube 102, the ink receiving member 130 is in the closest state but not in contact with the lower surface of the supply tube 102. After the ink cartridge 30 is removed from the case body 101, ink may remain on the rear end of the supply tube 102. Such ink moves to a lower portion of the rear end of the supply tube 102 due to gravity and thereafter drips to the rear end portion 132 of the ink receiving member 130 which is in the closest state to the lower surface of the supply tube 102. The received ink moves along the ink receiving member 130 from the rear end portion 132 toward the front end portion 131 away from the ink cartridge 30. Since the ink that remains on the rear end of the supply tube 102 is received by the rear end portion 132 of the ink receiving member 130, it is possible to reduce the possibility that the ink adheres to the lower wall of the case body 101.

Figure 14A:
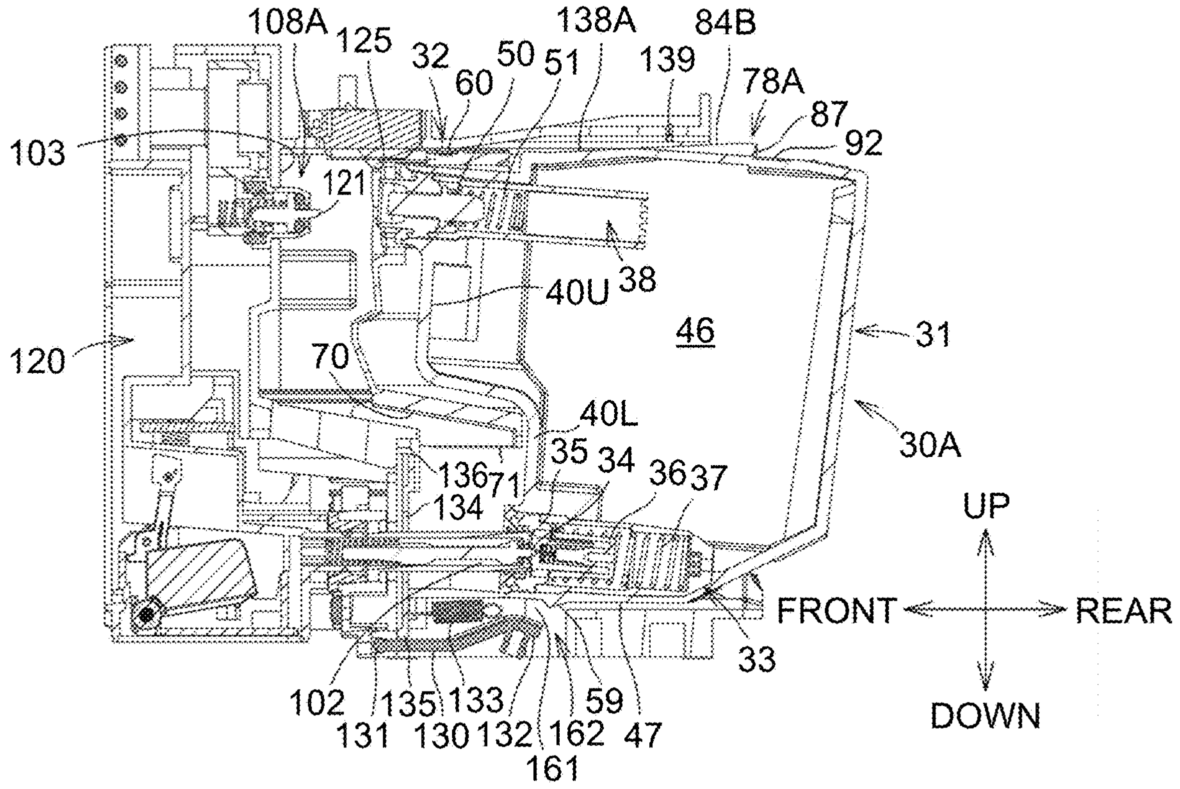
FIGS. 14A and 14B are cross-sectional views of the ink cartridge 30 and the cartridge case 110, each showing a state in which the ink cartridge 30 is positioned in the cartridge case 110 and the ink receiving member 130 is in a second position.
Figure 14B:
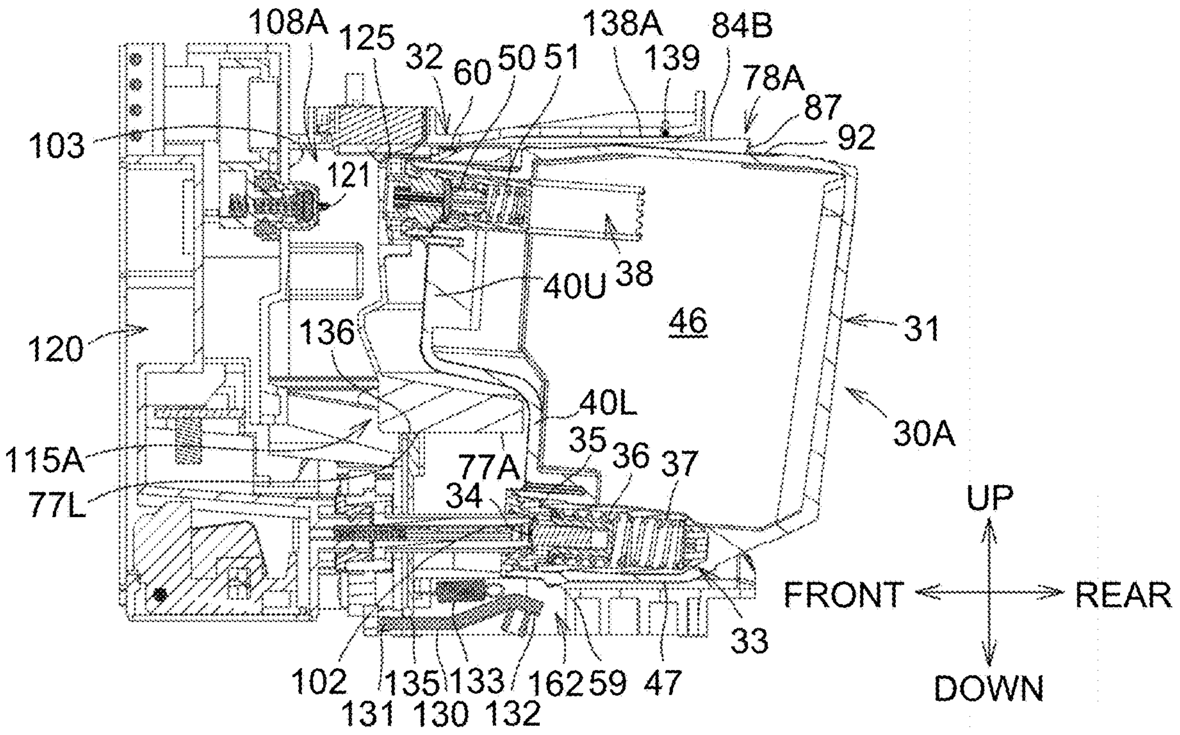

As shown in FIGS. 14A and 14B, in a state where the ink receiving member 130 has moved downward against the pulling force of the coil spring 133, the ink receiving member 130 is in a second position. A space is provided between the ink receiving member 130 at the second position and the supply tube 102 to such an extent that a lower portion of a supply portion 33 of the ink cartridge 30 can be positioned in the space and the supply tube 102 can be received by the supply portion 33. That is, when the supply tube 102 is received in the supply port 34 of the ink cartridge 30 inserted into each of the slots 108A, 108B, 108C, and 108D in the frontward direction, the ink receiving member 130 does not restrict the frontward movement of the ink cartridge 30.

As shown in FIG. 2, the pressing plate 134 is positioned below the cover wall 171 of each of the slots 108A, 108B, 108C, and 108D and in front of the rear wall 173. The pressing plate 134 is supported by the case body 101 so as to be movable in the up-down direction. A lower end 135 of the pressing plate 134 is in contact with the ink receiving member 130 at a portion between the front end portion 131 and the rear end portion 132 of the ink receiving member 130. An upper end 136 of the pressing plate 134 is positioned below the first key slot 115 when the ink cartridge 30 is attached to the cartridge case 110 in the attached state. The pressing plate 134 is positioned below the through hole 140A of the cover wall 171. The pressing plate 134 is positioned in front of the through hole 140B of the rear wall 173. With this configuration, the pressing plate 134 can come into contact with a first key portion 77 of the ink cartridge 30, which will be described later, through the first key slot 115, the through hole 140A, and the through hole 140B. The pressing plate 134 is held at a lifted position by the ink receiving member 130 urged, i.e., pulled by the coil spring 133.

Although details will be described later, when the first key portion 77 of the ink cartridge 30 enters the first key slot 115, the pressing plate 134 is pressed down by the first key portion 77 against the urging, i.e., pulling force of the coil spring 133. When the pressing plate 134 moves downward, the ink receiving member 130 is movable between the first position and the second position.

As shown in FIG. 2, second key slots 138 are arranged at positions corresponding to the respective slots 108A, 108B, 108C, and 108D in a surface 137 positioned on the upper side of the peripheral edge of the case body 101, which defines the opening 112. Specifically, in the case body 101, the slot 108A has a second key slot 138A, the slot 108B has a second key slot 138B, the slot 108C has a second key slot 138C, and the slot 108D has a second key slot 138D. The second key slot 138 is a recess formed in a rear end of a top surface of the case body 101 defining an upper end of the internal space of the case body 101. The second key slot 138 is recessed upward from the top surface. The lower end of the second key slot 138 is continuous with the internal space of the case body 101. A rear end of the second key slot 138 is open toward the outside of the case body 101. A distance between a lower end and an upper end of the opening at the rear end of the second key slot 138 is greater than a distance between a lower end and an upper end of the opening at the front end of the second key slot 138. In the present embodiment, a distance between the lower end and the upper end of the opening of the second key slot 138 gradually decreases from the rear end of the opening toward the front end of the opening. Alternatively, the distance between the lower end and the upper end of the opening of the second key slot 138 may gradually increase and then gradually decrease from the rear end of the opening toward the front end of the opening. The second key slots 138A, 138B, and 138C are respectively positioned to the left of the center of the slots 108A, 108B, and 108C in the left-right direction. The second key slot 138D is positioned to the right of the center of the slot 108D in the left-right direction. A second key portion 78 of the ink cartridge 30 may enter in at least one of the second key slots 138A, 138B, 138C, and 138D.

A locking portion 139 is positioned in a space that defines the opening of each of the second key slots 138A, 138B, 138C, and 138D. The locking portion 139 is a rod-shaped member extending in the left-right direction. The locking portion 139 comes into contact with a locking surface 87 of the ink cartridge 30 when the ink cartridge 30 is attached to the cartridge case 110 in the attached state.

[Ink Cartridge 30]

The ink cartridge 30 is a container in which ink as a liquid is stored. As shown in FIGS. 3 to 10, the ink cartridge 30 includes a container body 31, a cover 32, and an IC board 60. The container body 31 is an example of a first member or an ink frame. The cover 32 is an example of a second member. The cover 32 covers a front portion of the container body 31. The ink cartridge 30 is inserted frontward into a corresponding one of the slots 108A, 108B, 108C, and 108D with the cover 32 facing the end surface 103 of the case body 101.

The container body 31 has a substantially thin flat cubic shape in which the distance in the left-right direction is smaller than the distance in the up-down direction and the distance in the front-rear direction. The container body 31 includes a supply portion 33, a first key portion 77, and a second key portion 78.

The container body 31 includes a front wall 40, a rear wall 41 opposed to the front wall 40 in the front-rear direction, a left wall 42 connecting the front wall 40 and the rear wall 41, a right wall 43 opposed to the left wall 42 in the left-right direction, an upper wall 44 connecting the front wall 40 and the rear wall 41, and a lower wall 45 opposed to the upper wall 44 in the up-down direction. The container body 31 has an upper surface 80 which is an outer surface of the upper wall 44. The outer surface of the front wall 40 faces frontward. The rear wall 41 has a rear surface 62 facing rearward. The outer surface of the left wall 42 faces leftward. The outer surface of the right wall 43 faces rightward. The outer surface of the upper wall 44, i.e., the upper surface 80 faces upward. The outer surface of the lower wall 45 faces downward.

As shown in FIG. 13, the front wall 40, the rear wall 41, the left wall 42, the right wall 43, the upper wall 44, and the lower wall 45 define a chamber 46 in the internal space of the container body 31. The front wall 40, the rear wall 41, the left wall 42, the right wall 43, the upper wall 44, and the lower wall 45 have translucency to the extent that the liquid level of the ink stored in the chamber 46 can be visually recognized from the outside. The container body 31 is, for example, an integrally molded product made of a synthetic resin.

The front wall 40 has an upper front wall 40U positioned on the upper side and a lower front wall 40L positioned on the lower side. The upper front wall 40U is positioned frontward of the lower front wall 40L in the front-rear direction. A space behind the upper front wall 40U in the front-rear direction is also a part of the chamber 46. In other words, the upper portion of the chamber 46 extends further frontward than the lower portion of the chamber 46. The lower front wall 40L is continuous with the supply portion 33.

Figure 5:
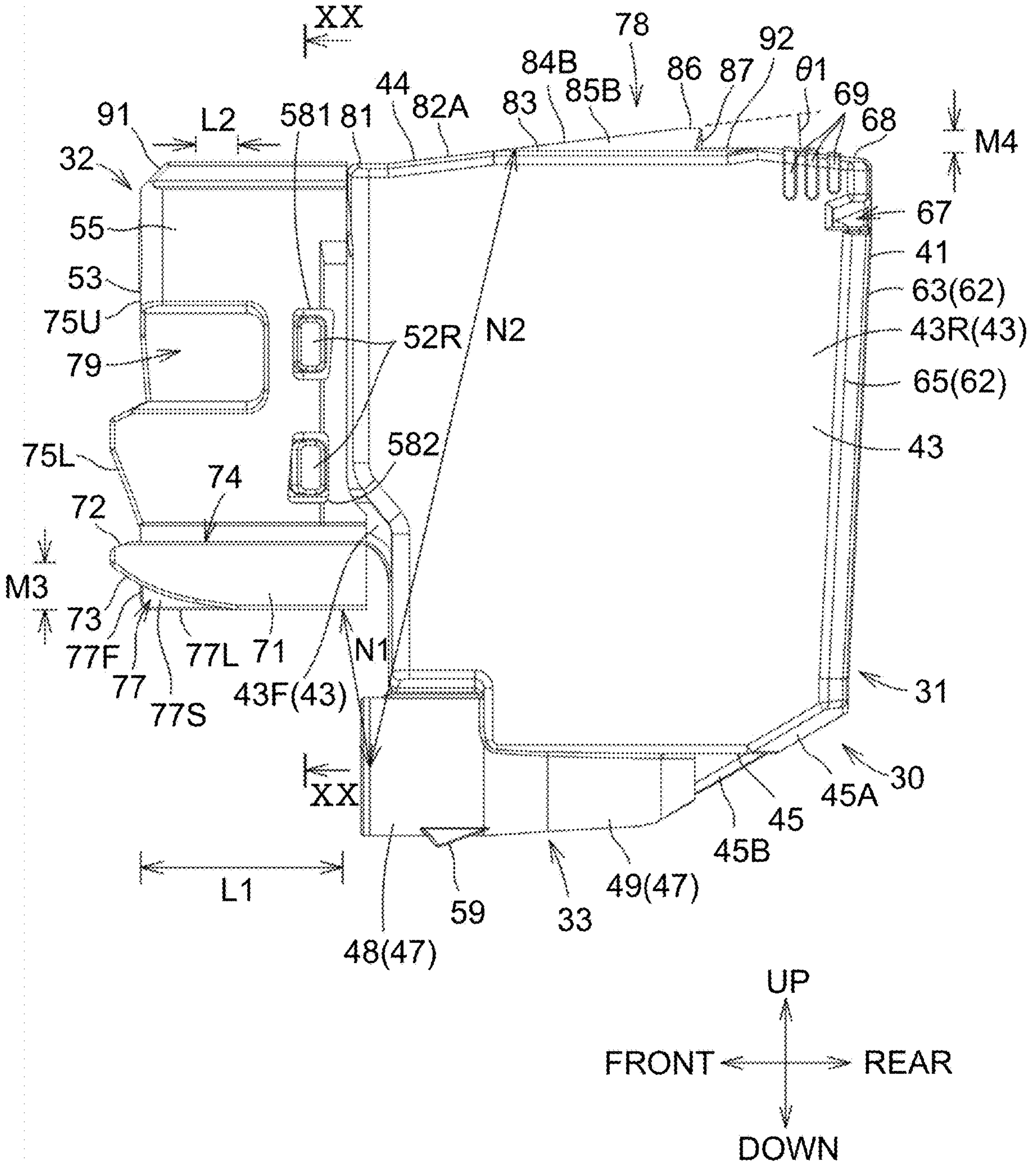
FIG. 5 is a right side view of the ink cartridge 30.
Figure 18:
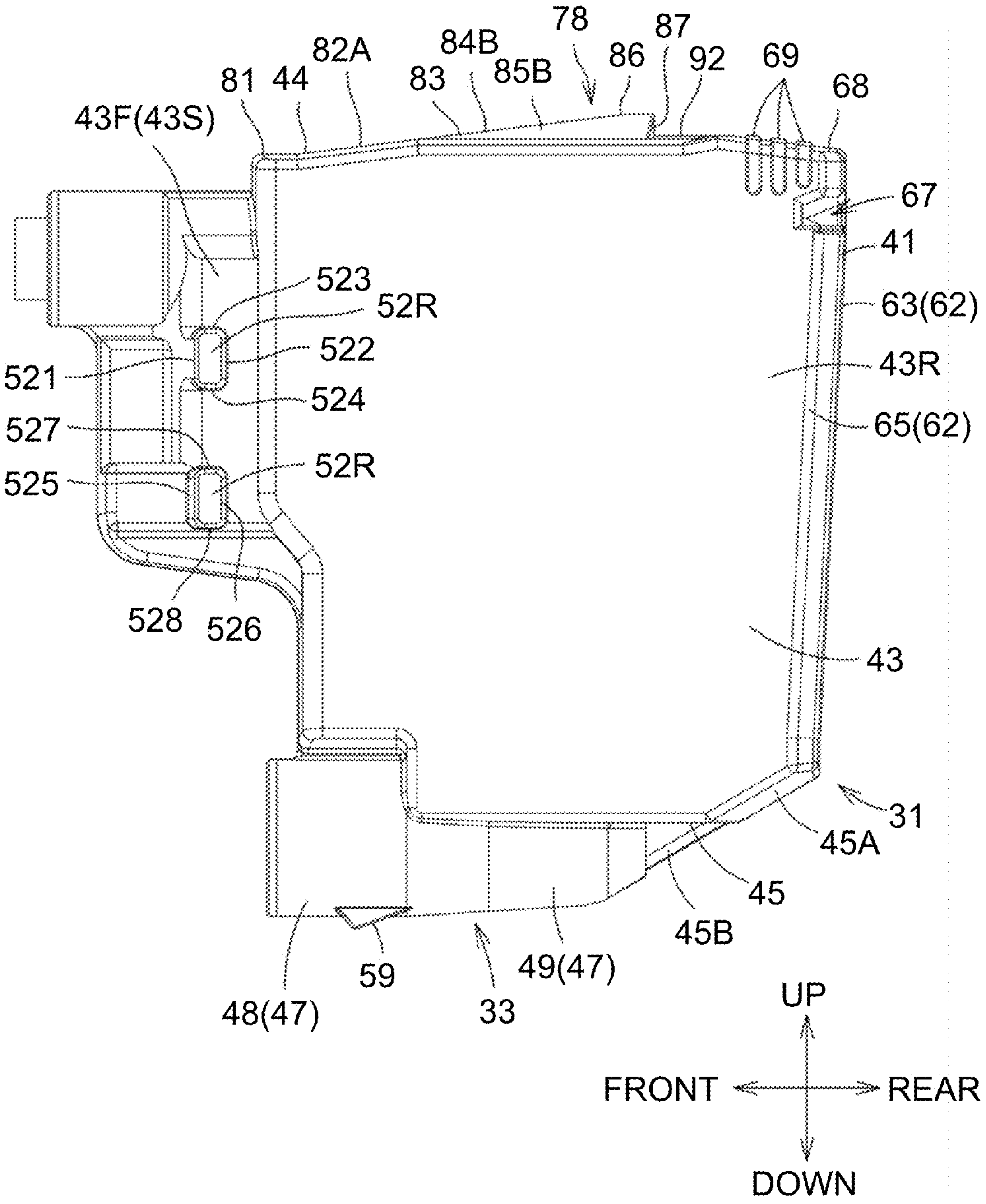
FIG. 18 is a right side view of a container body 31.
Figure 19:
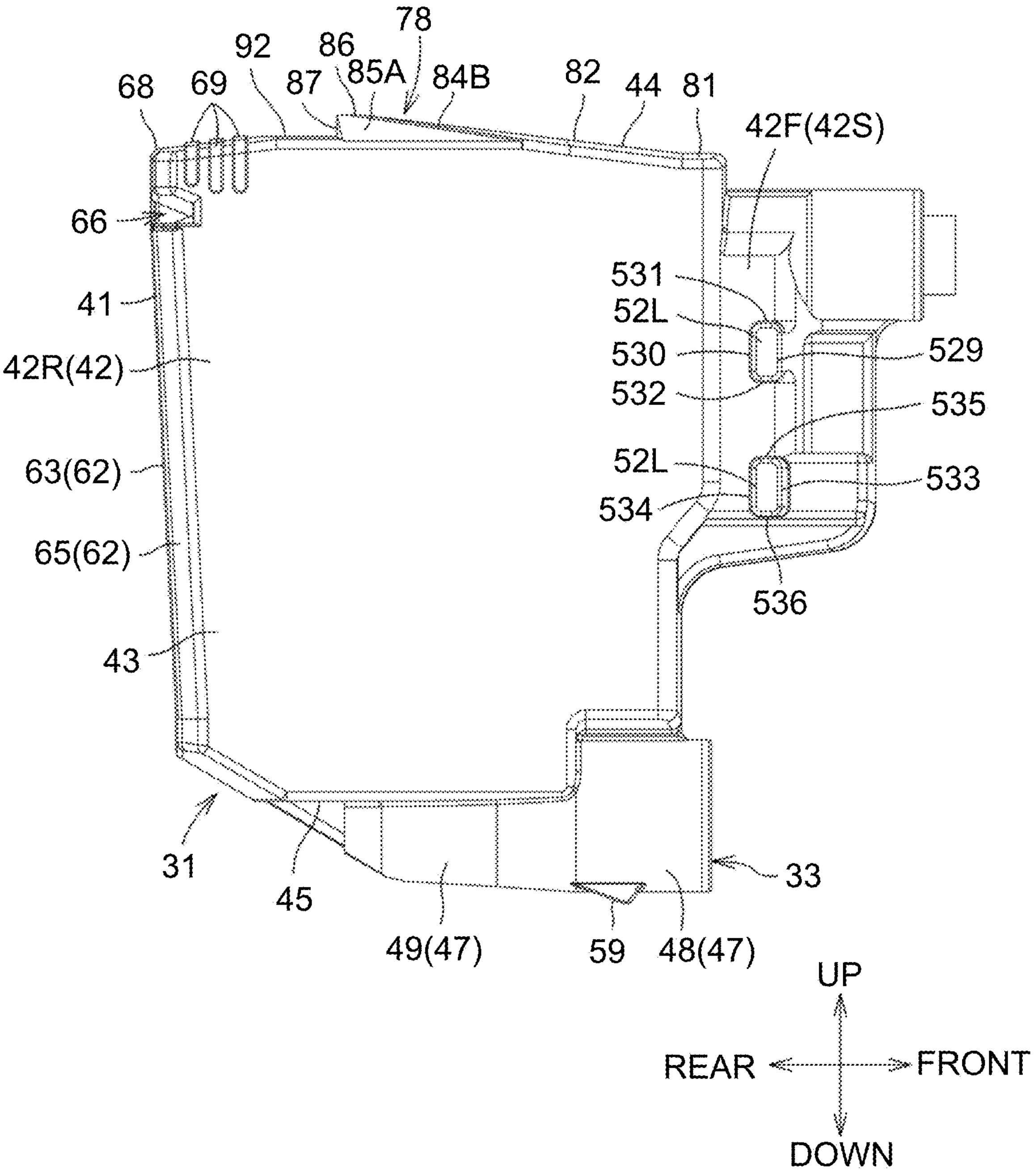
FIG. 19 is a left side view of the container body 31.

As shown in FIGS. 18 and 19, the left wall 42 includes a front left wall 42F positioned on the front side in the front-rear direction and a rear left wall 42R positioned on the rear side in the front-rear direction. As shown in FIG. 5, the right wall 43 includes a front right wall 43F positioned on the front side in the front-rear direction and a rear right wall 43R positioned on the rear side in the front-rear direction. The front left wall 42F and the front right wall 43F are continuous with the upper front wall 40U. The rear left wall 42R and the rear right wall 43R are continuous with the rear wall 41. A space between the front left wall 42F and the front right wall 43F is a part of the chamber 46. A distance in the left-right direction between an outer surface of the front left wall 42F and an outer surface of the front right wall 43F is smaller than a distance in the left-right direction between an outer surface of the rear left wall 42R and an outer surface of the rear right wall 43R.

As shown in FIG. 19, the outer surface of the front left wall 42F is a left surface 42S that faces leftward. As shown in FIG. 18, the outer surface of the front right wall 43F is a right surface 43S that faces rightward. Two protrusions 52R are located on the right surface 43S. The protrusion 52R protrudes rightward from the right surface 43S. On the right surface 43S, the two protrusions 52R are arranged in the up-down direction. The protrusion 52R has a quadrangular shape longer in the up-down direction than in the front-rear direction in a side view. The protrusion 52R is a quadrangular pole. The protrusion 52R engages with a through-hole 76R of the cover 32 described later. The protrusion 52R is an example of a first engagement portion, a first protrusion, or a second protrusion.

The protrusion 52R located at the upper side in the up-down direction has a front surface 521 facing forward, a rear surface 522 facing rearward, an upper surface 523 facing upward, and a lower surface 524 facing downward. The front surface 521 and the rear surface 522 extend in the up-down direction. The front surface 521 is an example of a first front surface. The rear surface 522 is an example of a first rear surface.

The protrusion 52R located at the lower side in the up-down direction has a front surface 525 facing forward, a rear surface 526 facing rearward, an upper surface 527 facing upward, and a lower surface 528 facing downward. The front surface 525 and the rear surface 526 extend in the up-down direction. The front surface 525 is an example of a second front surface. The rear surface 526 is an example of a second rear surface.

The left surface 42S has two protrusions 52L. The protrusion 52L protrudes leftward from the left surface 42S. On the left surface 42S, the two protrusions 52L are arranged in the up-down direction. The protrusion 52L has a quadrangular shape longer in the up-down direction than in the front-rear direction in a side view. The protrusion 52L is a quadrangular pole. The protrusion 52L engages with a through-hole 76L of the cover 32 described later. The protrusion 52L is an example of a second engagement portion, a third protrusion, and a fourth protrusion.

The protrusion 52L located at the upper side in the up-down direction has a front surface 529 facing forward, a rear surface 530 facing rearward, an upper surface 531 facing upward, and a lower surface 532 facing downward. The front surface 529 and the rear surface 530 extend in the up-down direction. The front surface 529 is an example of a third front surface. The rear surface 530 is an example of a third rear surface.

The protrusion 52L located at the lower side in the up-down direction has a front surface 533 facing forward, a rear surface 534 facing rearward, an upper surface 535 facing upward, and a lower surface 536 facing downward. The front surface 533 and the rear surface 534 extend along the up-down direction. The front surface 533 is an example of a fourth front surface. The rear surface 534 is an example of a fourth rear surface.

Figure 3:
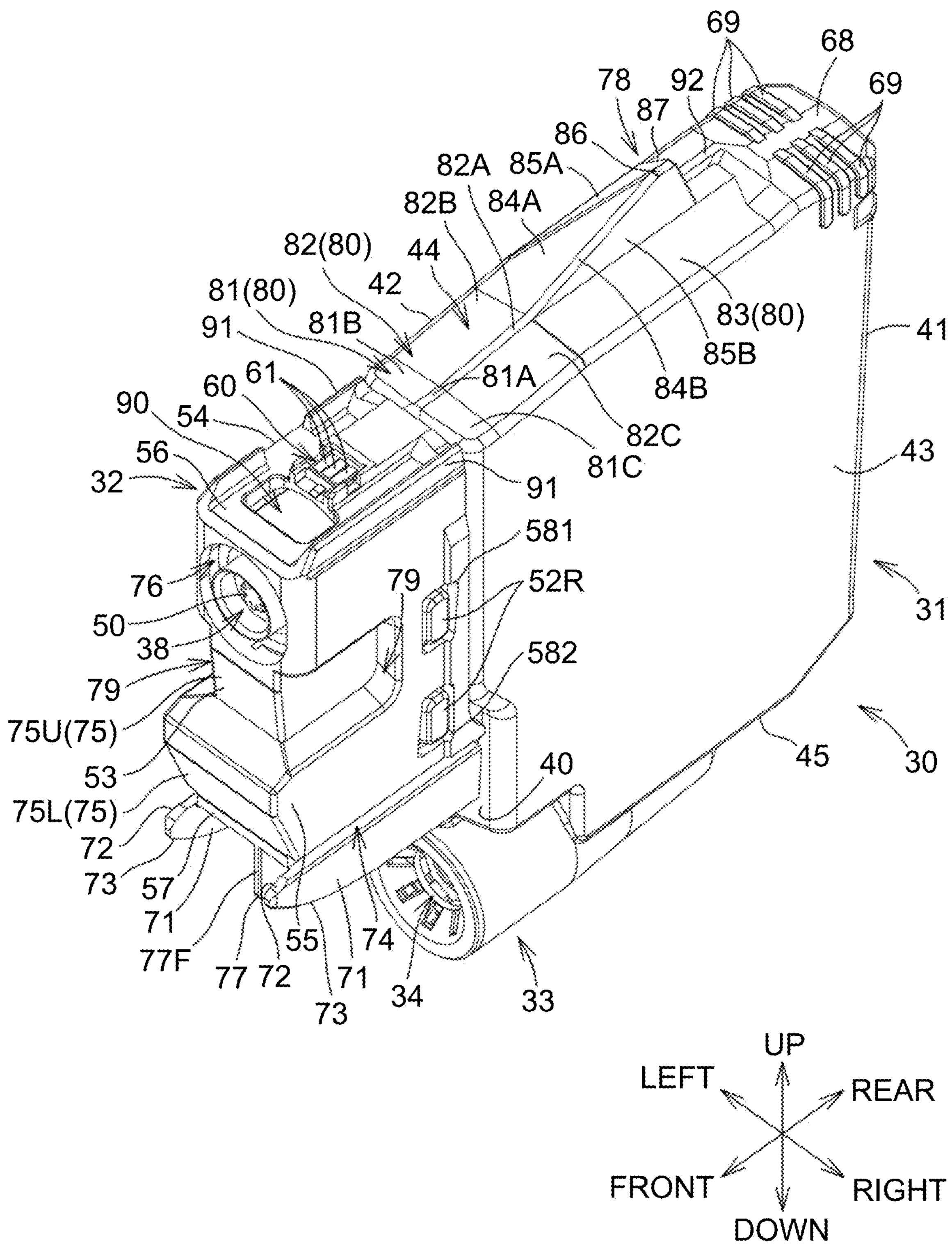
FIG. 3 is a perspective view of an ink cartridge 30 as viewed from the front and above.
Figure 4:
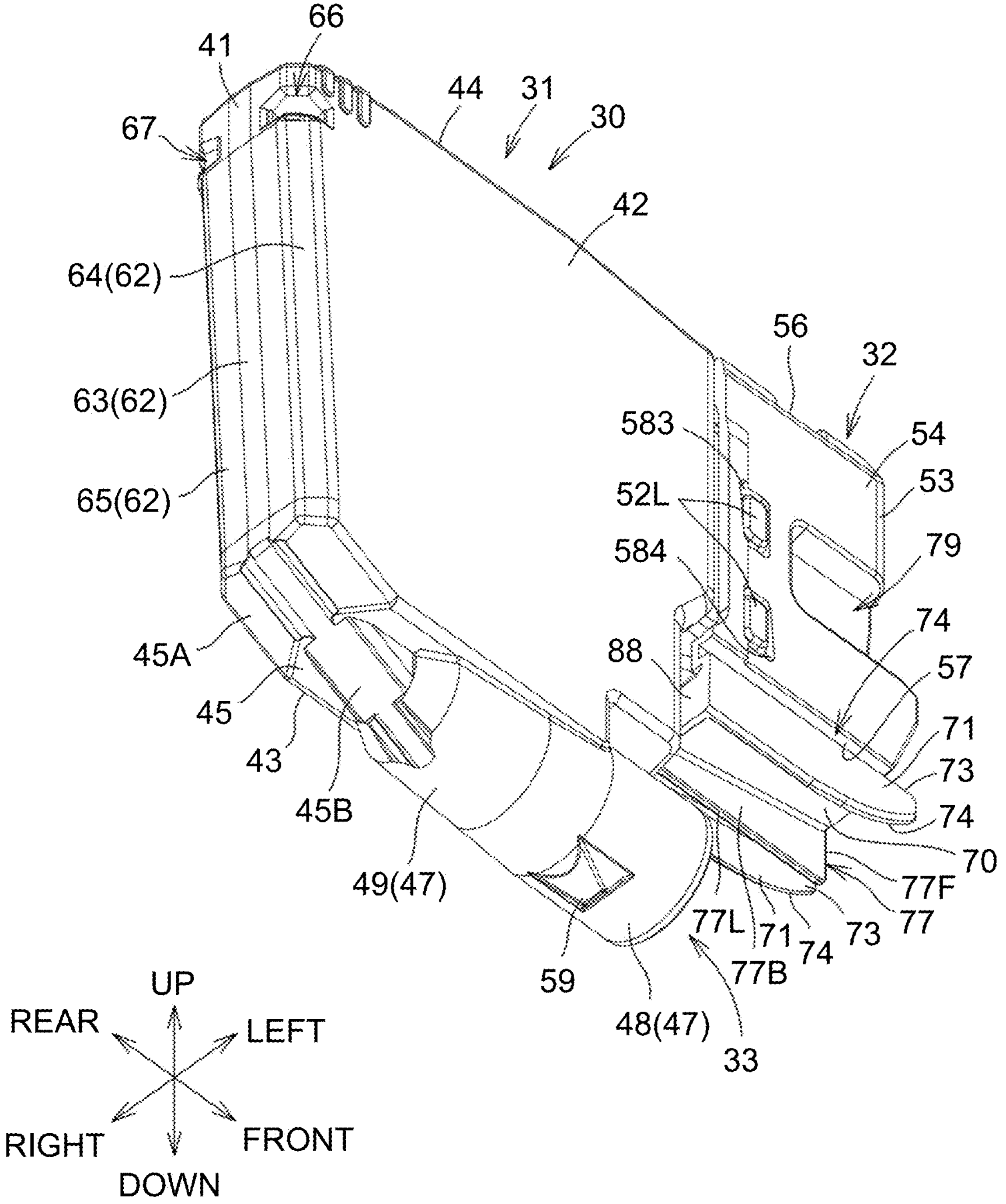
FIG. 4 is a perspective view of the ink cartridge 30 as viewed from the rear and below.

As shown in FIGS. 3 and 4, the supply portion 33 is a cylindrical member. The supply portion 33 has an outer peripheral surface extending in the front-rear direction. The outer peripheral surface is a curved surface curved in a circumferential direction with the front-rear direction as an axis. The supply portion 33 is positioned at a lower end of the container body 31, and a part of an outer surface of the supply portion 33 constitutes a lower surface 47 of the container body 31. The supply portion 33 has a supply port 34 through which the ink flows out of the ink cartridge 30. The supply port is positioned at the front end of the supply portion 33. The supply port 34 is circular when viewed from the front.

The lower surface 47 includes a lower half of a circumferential surface having an axis in the front-rear direction. The lower surface 47 includes a first surface 48 having a cylindrical shape in the front-rear direction and a second surface 49 positioned rearward of the first surface 48 in the front-rear direction. The outer diameter of the supply portion 33 decreases from the first surface 48 toward the second surface 49.

As shown in FIG. 13, the supply portion 33 has a cylindrical shape and has an internal space. The internal space of the supply portion 33 communicates with the supply port 34 at the front in the front-rear direction and communicates with the chamber 46 at the rear in the front-rear direction. A seal member 35, a valve 36, and a coil spring 37 are located in the internal space of the supply portion 33. The seal member 35 is an annular member made of an elastic member, for example, rubber, and is located around the supply port 34 in the internal space of the supply portion 33. The valve 36 is movable in the front-rear direction in the internal space of the supply portion 33. The supply port 34 is sealed by the valve 36 coming into contact with the seal member 35. The coil spring 37 biases the valve 36 toward the seal member 35.

When the supply tube 102 is received in the supply port 34, the supply tube 102 moves the valve 36 rearward against the urging force of the coil spring 37. When the valve 36 moves rearward, the internal space of the supply portion 33 and the internal space of the supply tube 102 communicate with each other, and the ink in the chamber 46 flows into the internal space of the supply tube 102 through the internal space of the supply portion 33. The seal member 35 is in liquid-tight contact with the outer surface of the supply tube 102.

As shown in FIG. 4, a protrusion 59 protruding downward is positioned on the first surface 48 of the supply portion 33. As shown in FIG. 7, an outline of a portion where the protrusion 59 is continuous with the first surface 48 has a substantially square shape when viewed upward from below in the up-down direction, and a distance of the outline in the front-rear direction is substantially equal to a distance of the outline in the left-right direction. Both side surfaces of the protrusion 59 in the left-right direction are downward triangles. Each side surface of the protrusion 59 in the left-right direction is a tapered surface that is inclined toward the center of the protrusion 59 in the left-right direction as the side surface extends downward. In other words, the protrusion 59 has a tapered shape in which the distance in the left-right direction gradually decreases as the side surface extends downward.

As shown in FIG. 13, an atmosphere opening path 38 is positioned at the upper front wall 40U of the container body 31 to connect the vicinity of the upper end of the chamber 46 to the outside. The atmosphere opening path 38 is opened forward in the upper front wall 40U. A valve 50 and a coil spring 51 are positioned in the atmosphere opening path 38. The front end of the coil spring 51 is positioned upward and frontward of the supply port 34 of the supply portion 33. The front end of the coil spring 51 is positioned forward of the second key portion 78. The valve 50 is movable in the front-rear direction in the atmosphere opening passage 38. The coil spring 51 biases the valve 50 forward. The valve 50 urged by the coil spring 51 seals the opening of the atmosphere opening path 38. As will be described in detail later, when the valve 50 moves rearward against the urging force of the coil spring 51, the atmosphere opening path 38 is opened, and air can flow between the outside and the chamber 46.

The cover 32 has a substantially quadrangular parallelepiped shape whose distance in the up-down direction and distance in the front-rear direction are smaller than a distance in the up-down direction and a distance in the front-rear direction of the container body 31. The cover 32 has a box shape having an opening facing rearward. The cover 32 is attached to the container body 31 so as to substantially cover the upper front wall 40U, the front left wall 42F, and the front right wall 43F.

The cover 32 includes a front wall 53, a left wall 54 extending rearward from a left end of the front wall 53, a right wall 55 opposed to the left wall 54 in the left-right direction, an upper wall 56 extending rearward from an upper end of the front wall 53, and a lower wall 57 opposed to the upper wall 56 in the up-down direction. The front wall 53, the left wall 54, the right wall 55, the upper wall 56, and the lower wall 57 define an internal space of the cover 32. The opening of the cover 32 is defined by rear ends of the front wall 53, the left wall 54, the right wall 55, the upper wall 56, and the lower wall 57.

The front wall 53 is a part of the front wall of the ink cartridge 30. The left wall 54 is a part of a left wall of the ink cartridge 30. The right wall 55 is a part of the right wall of the ink cartridge 30. The upper wall 56 is a part of an upper wall of the ink cartridge 30. The upper wall 56 is a part of an upper wall of the ink cartridge 30.

The distance of the cover 32 in the up-down direction is smaller than the distance of the container body 31 in the up-down direction. The distance of the cover 32 in the front-rear direction is smaller than the distance of the container body 31 in the front-rear direction. The distance of the cover 32 in the left-right direction is slightly greater than the distance between the outer surface of the front left wall 42F and the outer surface of the front right wall 43F of the container body 31 in the left-right direction, and is substantially the same as the distance between the outer surface of the rear left wall 42R and the outer surface of the rear right wall 43R in the left-right direction.

Figure 21:
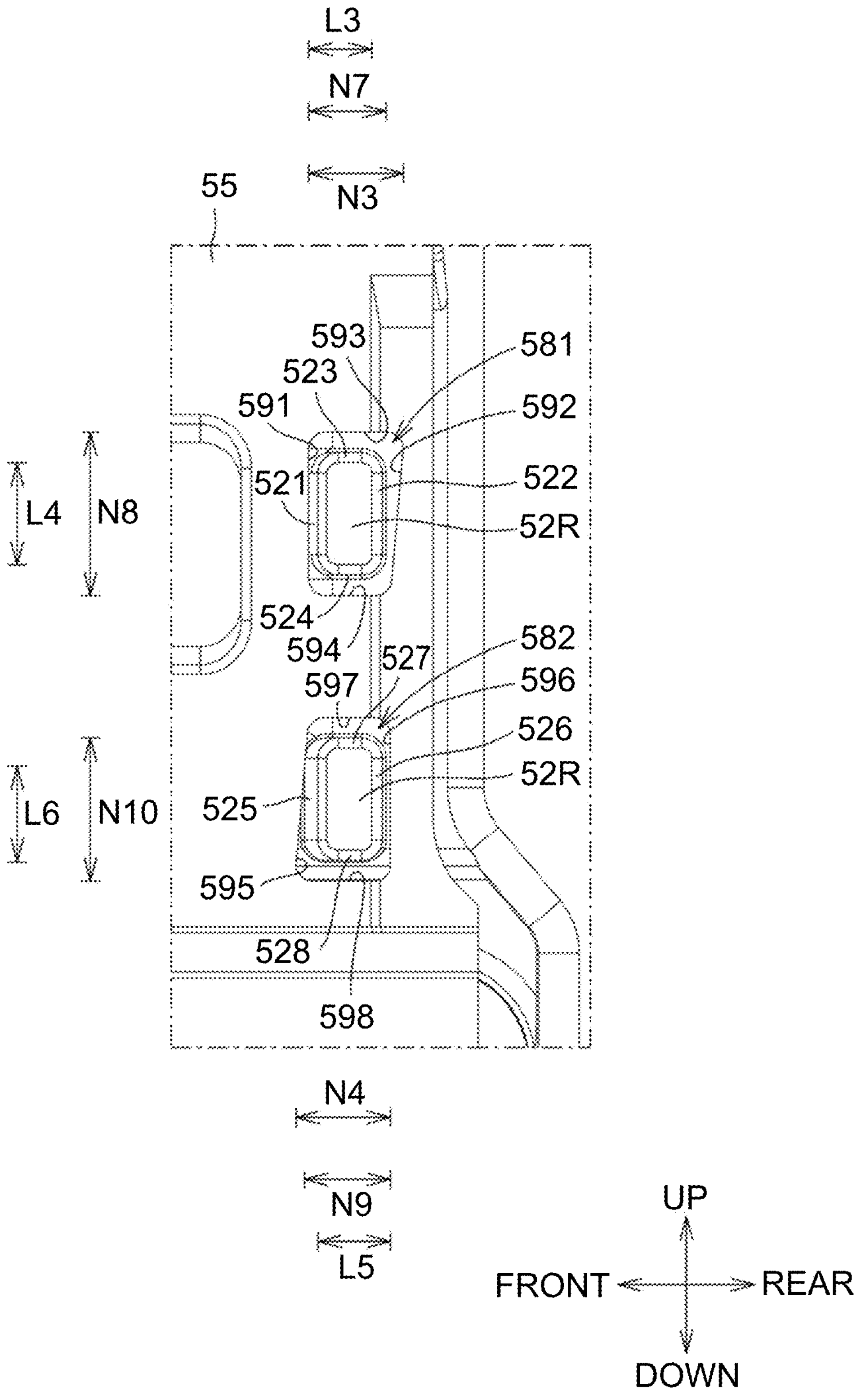
FIG. 21 is an enlarged view of the vicinity of a protrusion 52R.

As shown in FIG. 21, the right wall 55 has two through holes 581 and 582 arranged in the up-down direction. The left wall 54 has two through holes 583 and 584 arranged in the up-down direction. The protrusions 52R of the container body 31 are positioned in the through holes 581 and 582. The protrusions 52L of the container body 31 are positioned in the through holes 583 and 584. Each of the through holes 581,582,583, and 584 has a quadrangular shape. The through hole 581 is an example of a third engagement portion, a recess, or a first through hole. The through hole 582 is an example of the third engagement portion, the recess, or a second through hole. The through hole 583 is an example of a fourth engagement portion, the recess, and a third through hole. The through hole 584 is an example of the fourth engagement portion, the recess, and a fourth through hole.

The through hole 581 has a surface 591 facing the front surface 521 of the protrusion 52R, a surface 592 facing the rear surface 522, and surfaces 593 and 594 respectively connecting the surfaces 591 and 592. The surface 591 faces rearward. The surface 592 faces forward and upward. The surface 592 is inclined with respect to the rear surface 522 so as to extend rearward as it extends upward. The surface 591 is an example of a first surface. The surface 592 is an example of a second surface.

The through hole 582 has a surface 595 facing the front surface 525 of the protrusion 52R, a surface 596 facing the rear surface 526, and a surfaces 597 and 598 respectively connecting the surface 595 and 596. The surface 595 faces rearward and downward. The surface 596 faces forward. The surface 595 is an example of a third surface, and the surface 596 is an example of a fourth surface.

Figure 22:
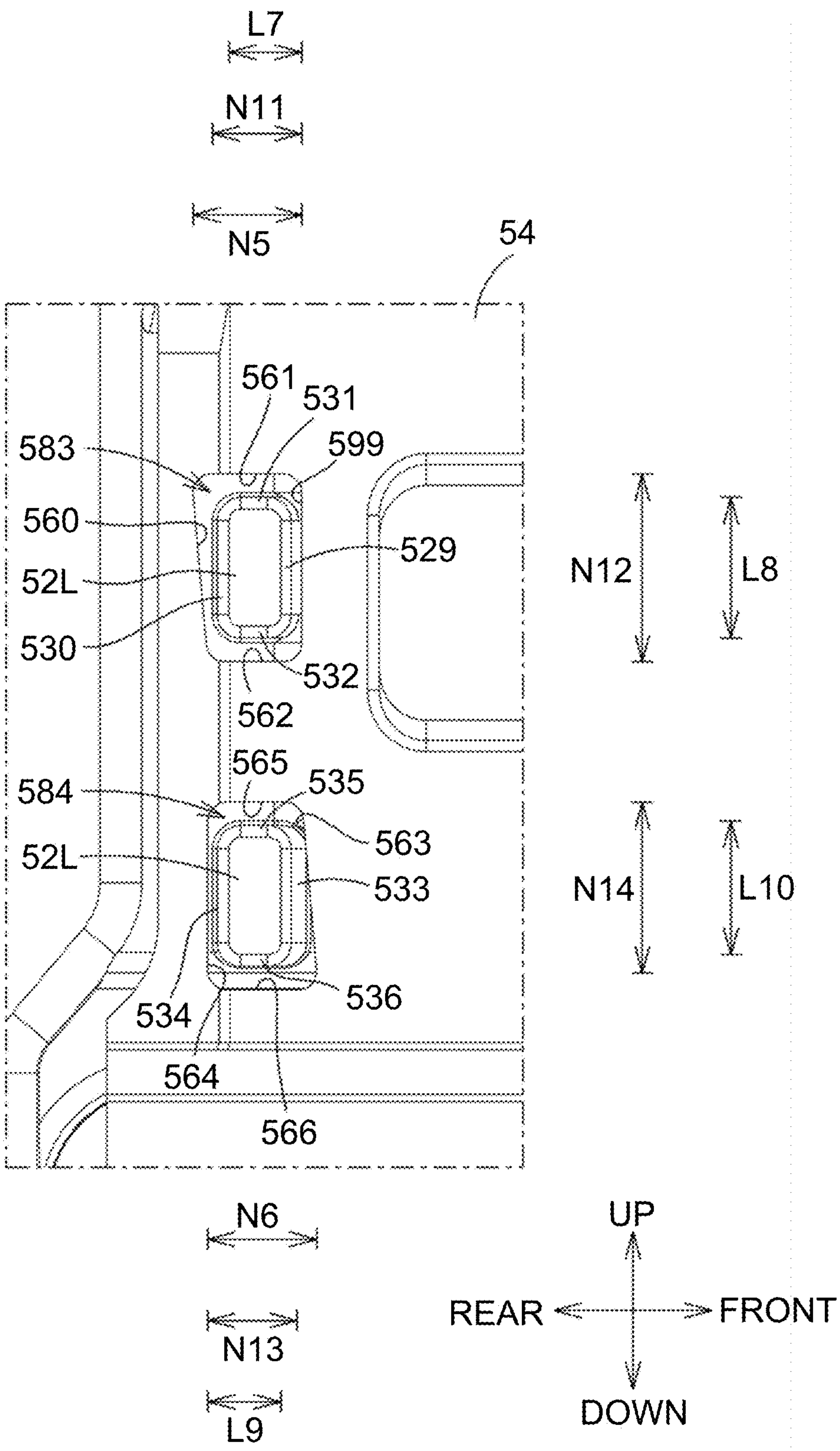
FIG. 22 is an enlarged view of the vicinity of a protrusion 52L.

As shown in FIG. 22, the through hole 583 has a surface 599 facing the front surface 529 of the protrusion 52L, a surface 560 facing the rear surface 530, and surfaces 561 and 562 respectively connecting the surfaces 599 and 560. The surface 599 faces rearward. The surface 560 faces forward and upward. The surface 560 is inclined with respect to the rear surface 530 so as to extend rearward as it extends upward. The surface 599 is an example of a fifth surface. The surface 560 is an example of a sixth surface.

The through hole 584 has a surface 563 facing the front surface 533 of the protrusion 52L, a surface 564 facing the rear surface 534, and surfaces 565 and 566 respectively connecting the surfaces 563 and 564. The surface 563 faces rearward and downward. The surface 564 faces forward. The surface 563 is an example of a seventh surface. The surface 564 is an example of an eighth surface.

A distance N3 in the front-rear direction between the upper end of the surface 591 and the upper end of the surface 592 of the through hole 581 is equal to a distance N4 in the front-rear direction between the lower end of the surface 595 and the lower end of the surface 596 of the through hole 582. A distance N5 in the front-rear direction between the upper end of the surface 599 and the upper end of the surface 560 of the through hole 583 is equal to a distance N6 in the front-rear direction between the lower end of the surface 563 and the lower end of the surface 564 of the through hole 584. The lower end of the surface 591 is located rearward of the lower end of the surface 595. The lower end of the surface 599 is located rearward of the lower end of the surface 563. The distance N3 may be greater than the distance N4. The distance N5 may be greater than the distance N6.

The distance N7 between the lower end of the surface 591 and the lower end of the surface 592 of the through hole 581 is greater than the distance L3 between the front surface 521 and the rear surface 522 of the protrusion 52R in the front-rear direction. The distance N8 between the surfaces 593 and 594 of the through hole 581 in the up-down direction is greater than the distance L4 between the upper surface 523 and the lower surface 524 of the protrusion 52R in the up-down direction. The protrusion 52R engages with the through hole 581. In other words, the protrusion 52R is engaged with the through hole 581, and thus the movement of the protrusion 52R in the front-rear direction and the movement of the protrusion 52R in the up-down direction are limited to a predetermined range by the through hole 581.

The distance N9 between the upper end of the surface 595 and the upper end of the surface 596 of the through hole 582 is greater than the distance L5 between the front surface 525 and the rear surface 526 of the protrusion 52R in the front-rear direction. The distance N10 between the surfaces 597 and 598 of the through hole 582 is greater than the distance L6 between the upper surface 527 and the lower surface 528 of the protrusion 52R. The protrusion 52R engages with the through hole 582. In other words, the protrusion 52R is engaged with the through hole 582, and thus the movement of the protrusion 52R in the front-rear direction and the movement of the protrusion 52R in the up-down direction are limited to a predetermined range by the through hole 582.

The distance N11 between the lower end of the surface 599 and the lower end of the surface 560 of the through hole 583 is greater than the distance L7 between the front surface 529 and the rear surface 530 of the protrusion 52L in the front-rear direction. The distance N12 between the surfaces 561 and 562 of the through hole 583 is greater than the distance L8 between the upper surface 531 and the lower surface 532 of the protrusion 52L in the up-down direction. The protrusion 52L engages with the through hole 583. In other words, the protrusion 52L is engaged with the through hole 583, and thus the movement of the protrusion 52L in the front-rear direction and the movement of the protrusion 52L in the up-down direction are limited to a predetermined range by the through hole 583.

The distance N13 between the upper end of the surface 563 and the upper end of the surface 564 of the through hole 584 in the front-rear direction is greater than the distance L9 between the front surface 533 and the rear surface 534 of the protrusion 52L in the front-rear direction. The distance N14 between the surfaces 565 and 566 of the through hole 584 is greater than the distance L10 between the upper surface 535 and the lower surface 536 of the protrusion 52L in the up-down direction. The protrusion 52L engages with the through hole 584. In other words, the protrusion 52L is engaged with the through hole 584, and thus the movement of the protrusion 52L in the front-rear direction and the movement of the protrusion 52L in the up-down direction are limited to a predetermined range by the through hole 584.

Figure 20:
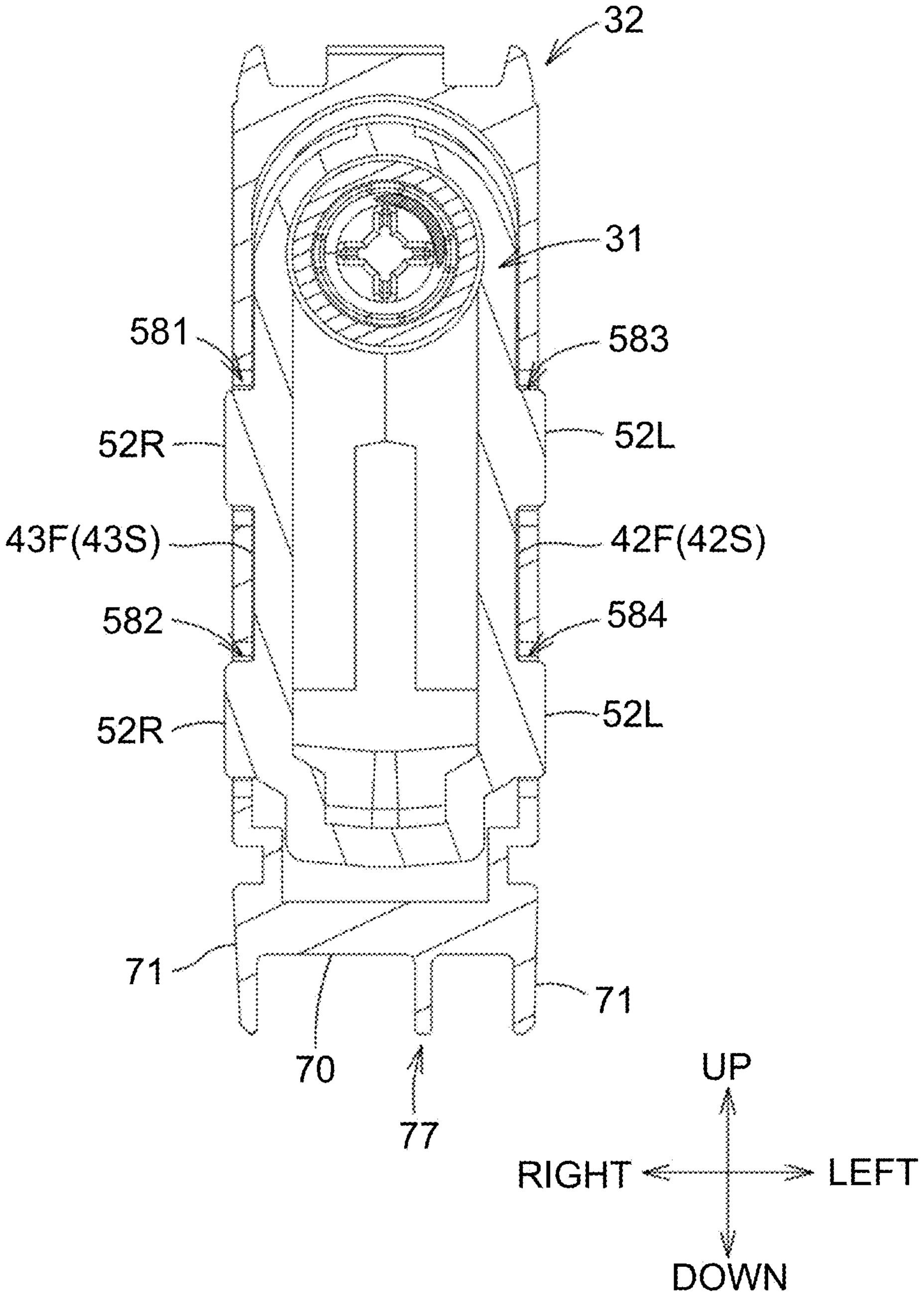
FIG. 20 is a cross-sectional view taken along line XX-XX in FIG. 5.
Figure 23:
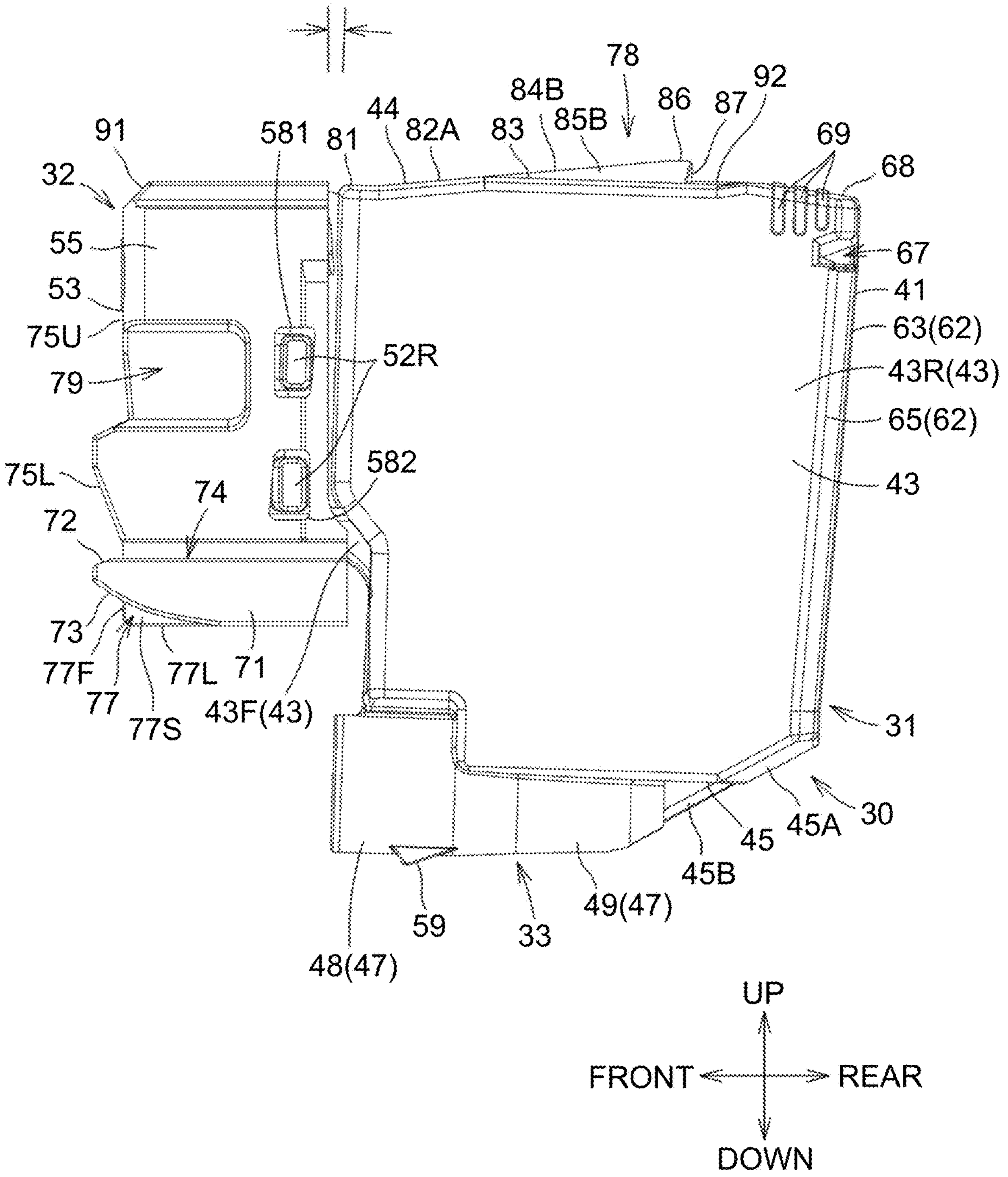
FIG. 23 is a right side view showing a state in which the container body 31 is rotated with respect to a cover 32.

As shown in FIG. 20, in a state where the cover 32 is attached to the container body 31, the protrusions 52R are engaged with the through holes 581 and 582, and the protrusions 52L are engaged with the through holes 583 and 584. The cover 32 is movable relative to the container body 31 in the up-down direction and the front-rear direction. As shown in FIG. 23, the upper protrusion 52R moves rearward between the surfaces 591 and 592 of the through hole 581, and the lower protrusion 52R moves forward between the surfaces 595 and 596 of the through hole 582, whereby the cover 32 can move relative to the container body 31 not only in the up-down direction and the front-rear direction but also in a direction in which the cover 32 rotates relative to the container body 31. The cover 32 rotates with respect to the container body 31, and thereby, a distance between the rear end of the cover 32 and the first upper surface 81 indicated by an arrow in FIG. 23 changes.

The cover 32 covers the upper front wall 40U of the container body 31 in the state in which the cover 32 is attached to the container body 31. The front wall 53 of the cover 32 is positioned frontward of the supply port 34. The supply port 34 is positioned below the lower wall 57 of the cover 32.

The IC board 60 is positioned on the upper wall 56 of the cover 32. The IC board 60 is an example of an electrical interface. The IC board 60 extends in the front-rear direction and the left-right direction. The IC board 60 is positioned above the supply port 34. The IC board 60 includes a board formed of, for example, silicone or glass epoxy, an IC mounted on the board and three electrodes 61 mounted on the board. Note that the IC does not appear in the drawings.

The IC board 60 is bonded to the upper wall 56 of the cover 32 by, for example, a photocurable resin. The IC board 60 may be bonded to the cover 32 by an adhesive other than the photocurable resin, or may be attached to the cover 32 by fitting or the like other than bonding.

The electrodes 61 of the IC board 60 come into contact with the contacts 125 in the process in which the ink cartridge 30 is inserted into the cartridge case 110. In the attached state where the ink cartridge 30 is attached to the cartridge case 110, the IC board 60 is in contact with and electrically connected to the contacts 125.

The IC is a semiconductor integrated circuit. Information related to the ink cartridge 30 is readably stored in the IC. The information related to the ink cartridge 30 is, for example, data indicating information such as a lot number, a manufacturing date, and an ink color.

The electrode 61 is electrically connected to the IC. The electrode 61 extends in the front-rear direction. The electrodes 61 are arranged on the upper surface of the IC board 60 so as to be spaced apart from each other in the left-right direction. The electrode 61 is exposed on the upper surface of the IC board 60 so as to be electrically accessible.

As shown in FIG. 3, the upper wall 56 of the cover 32 has a through hole 90 in front of the IC board 60. The atmosphere opening path 38 is positioned below the through hole 90. Guide pieces 91 extending in the front-rear direction protrude upward near both ends of the upper wall 56 of the cover 32 in the left-right direction. The IC board 60 is positioned between the one guide piece 91 and the other guide piece 91 in the left-right direction. The guide piece 91 functions as a guide for the cover 32 to move in the front-rear direction when the cover 32 is inserted into the cartridge case 110.

As shown in FIG. 7, a lower surface 70 which is an outer surface of the lower wall 57 of the cover 32 is positioned above and frontward of the supply port 34. The lower surface 70 is a flat surface extending rearward from the lower end of the front wall 53, and is inclined so as to extend downward toward the rear.

The cover 32 has walls 71 extending downward from both ends of the lower surface 70 in the left-right direction. The one wall 71 and the other wall 71 are spaced apart from each other in the left-right direction. The wall 71 is a plate-like member extending in the up-down direction and the front-rear direction and having a thickness in the left-right direction. The distance of the wall 71 in the front-rear direction is greater than the distance of the wall 71 in the left-right direction and the distance of the wall 71 in the up-down direction. The distance of the wall 71 in the up-down direction is greater than the distance thereof in the left-right direction. As shown in FIG. 5, the front surface of the wall 71 has a first front surface 72 positioned at an upper portion thereof and a second front surface 73 positioned at a lower portion thereof. A front end of the first front surface 72 is inclined so as to extend upward as the front end of the first front surface 72 extends toward the rear. The second front surface 73 is inclined so as to extend downward as the front end of the second front surface 73 extends toward the rear.

As shown in FIG. 7, the rear ends of the two walls 71 contact with a sub-front wall 88 (also referred to as a wall), and the two walls 71 extend frontward from the sub-front wall 88. The sub-front wall 88 extends downward from the rear end of the lower surface 70. The sub-front wall 88 has a plate shape extending in the up-down direction and the left-right direction and having a thickness in the front-rear direction. The distance of the sub-front wall 88 in the left-right direction is greater than the distance thereof in the up-down direction. The outer surface of the sub-front wall 88 facing frontward is a part of the front surface of the cover 32.

In the left wall 54 of the cover 32, a groove 74 (also referred to as a first groove 74) extending in the front-rear direction is positioned above the wall 71. The first groove 74 is positioned leftward and upward of the first key portion 77 and extends in the front-rear direction. In the right wall 55 of the cover 32, a groove 74 (also referred to as a second groove 74) extending in the front-rear direction is positioned above the wall 71. The second groove 74 is positioned rightward and upward of the first key portion 77 and extends in the front-rear direction. A longitudinal direction of the groove 74 is the front-rear direction. As shown in FIG. 8, the groove 74 is defined by a surface 74L facing upward, a surface 74U facing the surface 74L in the up-down direction, and a surface 74M connecting the surface 74L and the surface 74U. The surface 74L is also referred to as a second contact surface. The surface 74U is also referred to as a third contact surface. The front end of the groove 74 is open frontward in the front wall 53 of the cover 32. That is, the first groove 74 has an opening at a front end and a left end, and the second groove has an opening at a front end and a right end. As shown in FIGS. 3 to 10, the first front surface 72 of the one wall 71 serves as a guide for guiding the rib 118 of the cartridge case 110 into the one groove 74. The first front surface 72 of the other wall 71 serves as a guide for guiding the rib 119 of the cartridge case 110 into the first groove 74. One of the grooves 74 has a distance capable of receiving the rib 118 of the case body 101 in the front-rear direction, and the other groove 74 has a distance capable of receiving the rib 119 of the case body 101 in the front-rear direction. Specifically, the distance between the surface 74L and the surface 74U of the groove 74 in the up-down direction is greater than each of the distances of the rib 118 and the rib 119 of the case body 101 in the up-down direction. The position of the cover 32 with respect to the case body 101 in the up-down direction is determined by the contact of the surface 74U and the surface 74L of one of the grooves 74 with the rib 118 and by the contact of the surface 74U and the surface 74L of one of the grooves 74 with the rib 119.

The outer surface of the front wall 53 of the cover 32 is a front surface 75. The front surface 75 is positioned frontward of the supply port 34. The front surface 75 has an upper front surface 75U positioned at an upper portion thereof and a lower front surface 75L positioned at a lower portion thereof. The upper end of the lower front surface 75L is continuous with the upper front surface 75U. The lower end of the lower front surface 75L is positioned rearward of the upper end of the lower front surface 75L, and the lower front surface 75L is inclined upward as the lower front surface 75L extends toward the front. The lower front surface 75L is a guide for guiding the rib 118 and the rib 119 into the groove 74. Specifically, in the process in which the ink cartridge 30 is inserted into the case 110, the lower front surface 75L comes into contact with the front end of the rib 118 and the front end of the rib 119. In this configuration, the lower front surface 75L guides each of the rib 118 and the rib 119 to the groove 74.

The upper front surface 75U of the front wall 53 of the cover 32 has a through hole 76. The valve 50 of the container body 31 is exposed to the outside through the through hole 76. The front end of the through hole 76 is positioned frontward of the supply port 34 of the supply portion 33.

The lower surface 70 of the cover 32 has a first key portion 77. The first key portion 77 is positioned above the supply port 34 and below the upper surface of the electrode 61 of the IC board 60. The front end of the first key portion 77 is positioned frontward of the front end of the electrode 61. The first key portion 77 is positioned below the through hole 76. In other words, the opening of the atmosphere opening path 38 is positioned between the first key portion 77 and the electrode 61 in the up-down direction. The first key portion 77 is positioned at a front part of the ink cartridge 30.

As shown in FIG. 8, the first key portion 77 is positioned between the pair of walls 71 in the left-right direction and extends downward from the lower surface 70. A rear end of the wall 71 is continuous with the sub-front wall 88. A rear end of the first key portion 77 is continuous with the sub-front wall 88. The first key portion 77 has a lower surface 77L defining a lower end of the first key portion 77, side surfaces 77S, and a front surface 77F defining a front end of the first key portion 77. Each of the side surfaces 77S of the first key portion 77 extends along the up-down direction and the front-rear direction.

The lower surface 77L of the first key portion 77 extends along the front-rear direction and left-right direction. The lower surface 77L defines the width of the first key portion 77 in the left-right direction. In the present embodiment, the first key portion 77 has a plate shape in which the distance in the front-rear direction is greater than the distance in each of the left-right direction and the distance in the up-down direction, however the shape of the first key portion 77 is not limited thereto. For example, the distance of the first key portion 77 in the front-rear direction may be smaller than the distance thereof in the up-down direction. The lower surface 77L is a position overlapping at least one of the electrodes 61 in the up-down direction. In other words, the lower surface 77L is positioned directly below at least one of the electrodes 61 in the up-down direction. As shown in FIG. 5, the distance L1 of the lower surfaces 77L in the front-rear direction is greater than the distance L2 of the upper surface of the electrodes 61 in the front-rear direction. The front surface 77F of the first key portion 77 faces frontward. The front surface 77F is positioned rearward of the front end of the first front surface 72 of the wall 71. The first front surface 72 is positioned rearward of the front end of the second front surface 73. Further, the front surface 77F of the first key portion 77 is positioned rearward of the front end of the front wall 53 of the cover 32. Thus, in a case where the ink cartridge 30 is dropped with the front wall 53 of the cover 32 facing downward, even when the first front surface 72 or the second front surface 73 of the wall 71 or the front end of the front wall 53 of the cover 32 collides with a floor or the like, the front surface 77F of the first key portion 77 does not collide with the floor or the like. Therefore, the first key portion 77 is less likely to be deformed by a direct impact. On a related note, as will be described later, the first key portion 77 functions as a key to ensure that the ink cartridge 30 is attached to the right slot 108. When the first key portion 77 is deformed, the first key portion 77 may not correctly function as a key.

Figure 11:
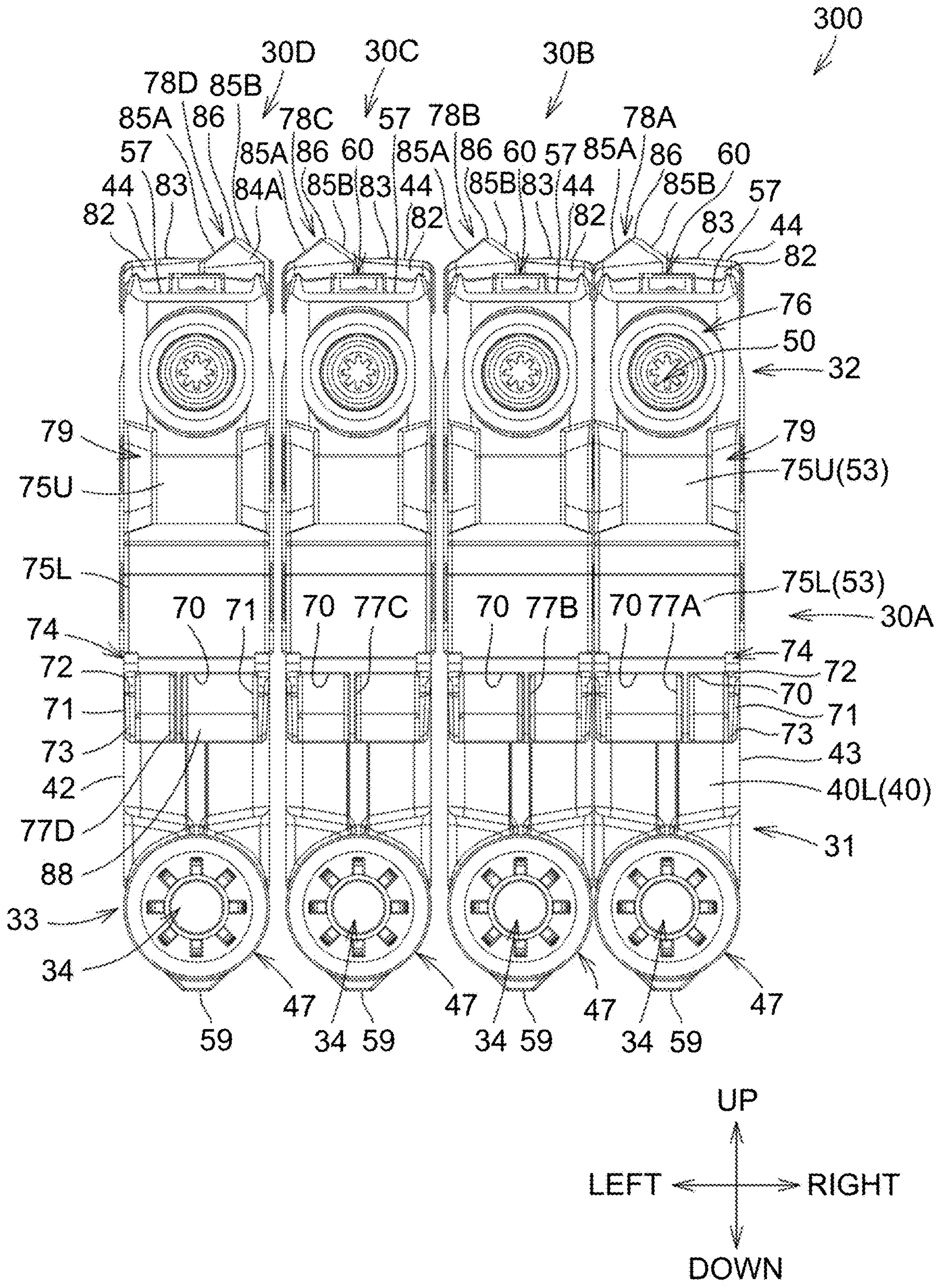
FIG. 11 is a front view of four ink cartridges 30.

As shown in FIG. 11, the first key portions 77 are assigned to the respective slots 108A, 108B, 108C, and 108D in accordance with the characteristics of the ink cartridges 30 to be mounted. The mechanical characteristics of the first key portion 77 such as the arrangement and the shape are different. The position of the first key portion 77 in the left-right direction varies depending on the characteristics of the ink stored in the chamber 46. The characteristics of the ink are, for example, the color and composition of the ink.

The cover 32 includes a third key portion 79. The third key portion 79 is defined by a recess recessed from the left wall 54 of the cover 32, a recess recessed from the right wall 55, a protrusion protruding leftward from the left wall 54, or a protrusion protruding rightward from the right wall 55. In the present embodiment, the third key portion 79 includes a recess that is recessed from the left wall 54 of the cover 32 and a recess that is recessed from the right wall 55. As shown in FIG. 8, the third key portion 79 is a combination of the recess of the left wall 54 and the recess of the right wall 55. The third key portion 79 is positioned above the first key portion 77 and below the upper surface of the electrode 61 of the IC board 60. In this embodiment, the third key portion 79 is positioned below the through hole 76. The third key portion 79 is positioned at both ends of the upper front surface 75U in the left-right direction. The front end of the third key portion 79 is opened frontward in the upper front surface 75U of the cover 32. That is, both of the recess of the left wall 54 and the recess of the right wall 55 are opened frontward in the upper front surface 75U of the cover 32.

Depending on the characteristic of each ink cartridge 30, the mechanical characteristic such as the position and shape of the third key portion 79 is different. The characteristic of the ink cartridge 30 indicated by the third key portion 79 may be the same as or different from the characteristic of the ink cartridge 30 indicated by the first key portion 77. In the present embodiment, the characteristic of the ink cartridge 30 indicated by the first key portion 77 is the color of the ink, and the characteristic of the ink cartridge 30 indicated by the third key portion 79 is the type of contract that a user will enter into when using a printer in which the ink cartridge 30 is used. The type of contract may include a contract in which a user is charged in accordance with the number of pages on which image recording is performed regardless of the amount of ink used. As long as this contract is concluded, a new ink cartridge 30 is delivered when the ink in the chamber 46 of the ink cartridge 30 is consumed, but the user does not have to pay for the ink cartridge 30 itself. Alternatively, the characteristic of the ink cartridge 30 indicated by the third key portion 79 is a sales area of the printer in which the ink cartridge 30 is used. The shape of the third key portion 79 of the ink cartridge 30 used in a certain sales area is different from the shape of the third key portion 79 of the ink cartridge 30 used in another sales area. For example, the third key portion 79 may be disposed only on one of the left and right sides, or the shape of the third key portion 79 opening frontward may be different depending on the contract type or the sales area. The presence or absence and the shape of the fitting piece 122 and the fitting piece 123 of the cartridge case 110 are different in accordance with the presence or absence and the shape of the third key portion 79.

Figure 9:
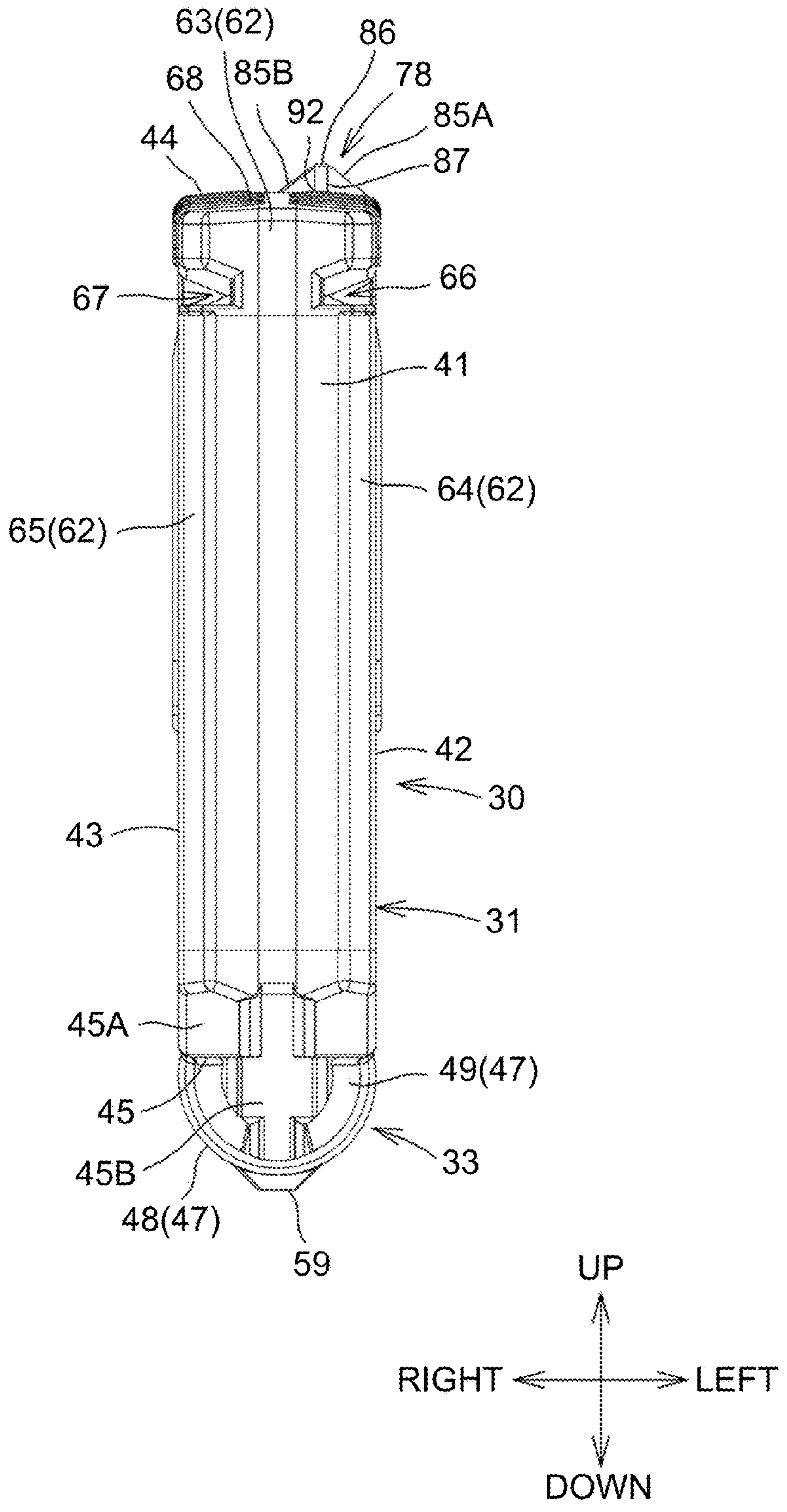
FIG. 9 is a rear view of the ink cartridge 30.

As shown in FIG. 9, the container body 31 has a rear surface 62 as an outer surface of the rear wall 41 of the container body 31. The rear surface 62 includes a first rear surface 63, a second rear surface 64, and a third rear surface 65. The second rear surface 64 is positioned on the left of the first rear surface 63. The third rear surface 65 is positioned on the right of the first rear surface 63. The first rear surface 63 is a flat surface orthogonal to the front-rear direction. The second rear surface 64 is a plane intersecting with the front-rear direction and the right-left direction. The right end of the second rear surface 64 is continuous with the first rear surface 63. The left end of the second rear surface 64 is positioned leftward and rearward of the first rear surface 63. The third rear surface 65 is a plane intersecting with the front-rear direction and the left-right direction. The left end of the third rear surface 65 is continuous with the first rear surface 63. The right end of the third rear surface 65 is positioned rightward and rearward of the first rear surface 63. The distance of the first rear surface 63 in the left-right direction is constant in the up-down direction.

As shown in FIGS. 4, 5 and 9, the lower wall 45 of the container body 31 includes a first lower wall 45A and a second lower wall 45B. A rear end of the first lower wall 45A is continuous with a lower end of the rear wall 41. A front portion of the first lower wall 45A extends in the front-rear direction. A front end of the first lower wall 45A is continuous with the front wall 40. The supply portion 33 is positioned on the first lower wall 45A. The curved front surface of the supply portion 33 including the rear end of the supply portion 33 protrudes downward from the first lower wall 45A.

The second lower wall 45B is continuous with the lower end of the rear wall 41. The second lower wall 45B is an inclined wall inclined with respect to the front-rear direction. The second lower wall 45B is inclined with respect to the front-rear direction and the up-down direction such that an upper end of the second lower wall 45B is positioned rearward and upward of a lower end thereof. The lower end of the second lower wall 45B is continuous with the rear end of the lower surface 47 of the supply portion 33. The lower end of the second lower wall 45B is continuous with the rear end of the supply portion 33 in a position below the first lower wall 45A. The second lower wall 45B is shorter than the first lower wall 45A in the left-right direction.

Since the supply portion 33 is positioned below the first lower wall 45A, as shown in FIG. 9, the lower surface 47 of the supply portion 33 is visible when the ink cartridge 30 is viewed from the rear. Therefore, it is possible for the user to recognize where the supply portion 33 is when viewed from the rear, and it is easy to attach the ink cartridge 30 in the correct orientation when the ink cartridge 30 is attached to the slot 108. In addition, since the lower wall 45 is continuous with the rear end of the supply portion 33, the rear end of the supply portion 33 is reinforced. As a result, even if the lower end of the ink cartridge 30 receives an impact, the supply portion 33 is less likely to be deformed. Note that the lower wall 45 may have only the first lower wall 45A without the second lower wall 45B.

The second rear surface 64 has a recess 66 near the upper end. The recess 66 is constituted by a space recessed frontward from the second rear surface 64 and a surface defining the space. The third rear surface 65 has a recess 67 near the upper end. The recess 67 is constituted by a space recessed frontward from the third rear surface 65 and a surface defining the space. As shown in FIG. 1, a protrusion 127 protruding from the cover 126 is accommodated in each of the recesses 66 and 67 when the cover 126 is closed. The protrusion 127 of the cover 126 in the closed state is in contact with the surface forming the upper end of the recesses 66 and 67. With this configuration, the ink cartridge 30 attached to the cartridge case 110 is less likely to be detached from the cartridge case 110 due to an impact or the like. Further, as shown in FIG. 9, a distance in the left-right direction of the first rear surface 63 sandwiched between the recess 66 and the recess 67 is greater than a distance in the left-right direction of the recess 66 and greater than a distance in the left-right direction of the recess 67. Thus, since the first rear surface 63 is easily visible from the rear of the ink cartridge 30, the user is more likely to press an upper portion of the first rear surface 63 when attaching the ink cartridge 30 to the cartridge case 110.

Figure 10:
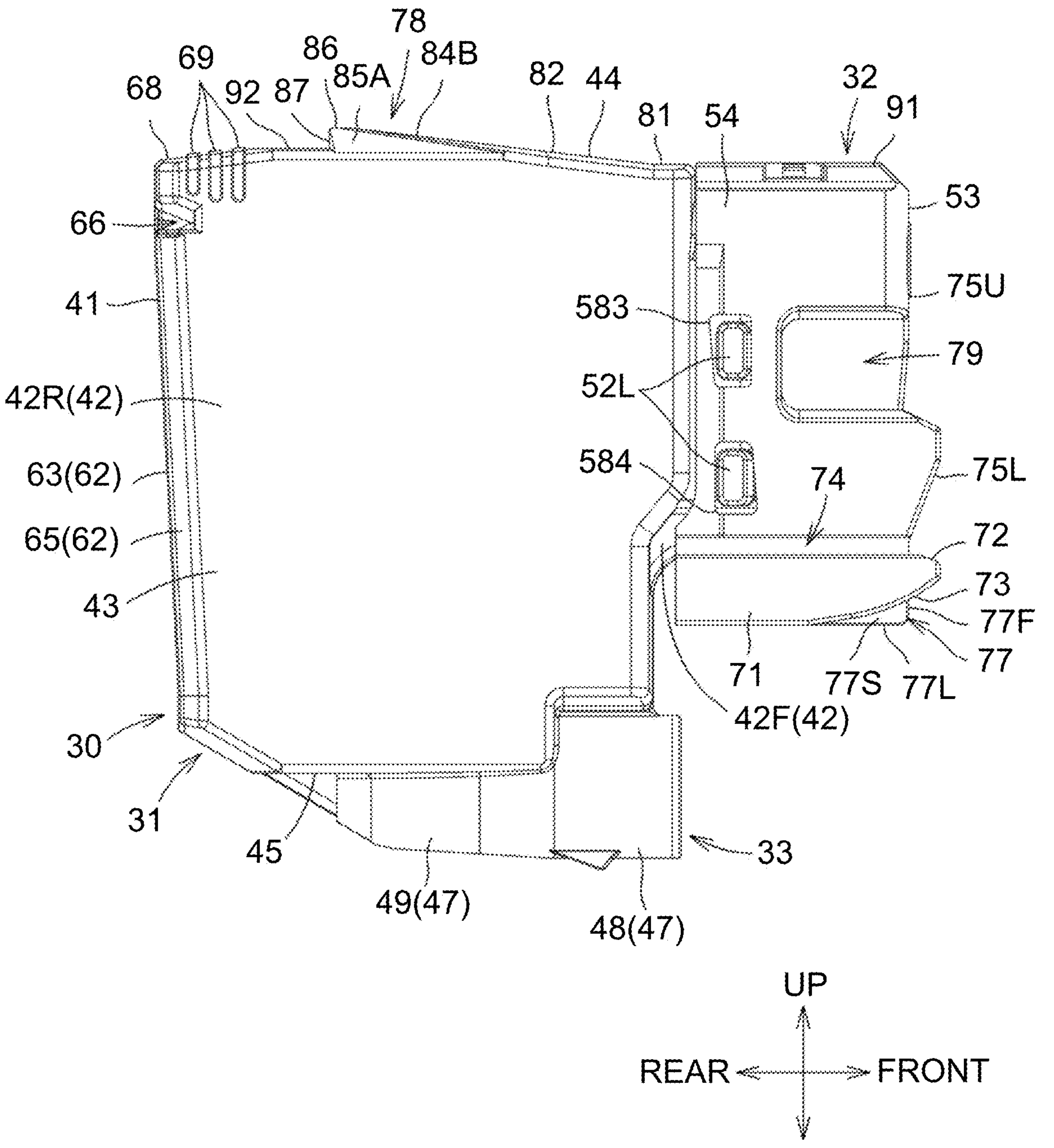
FIG. 10 is a left side view of the ink cartridge 30.
Figure 12:
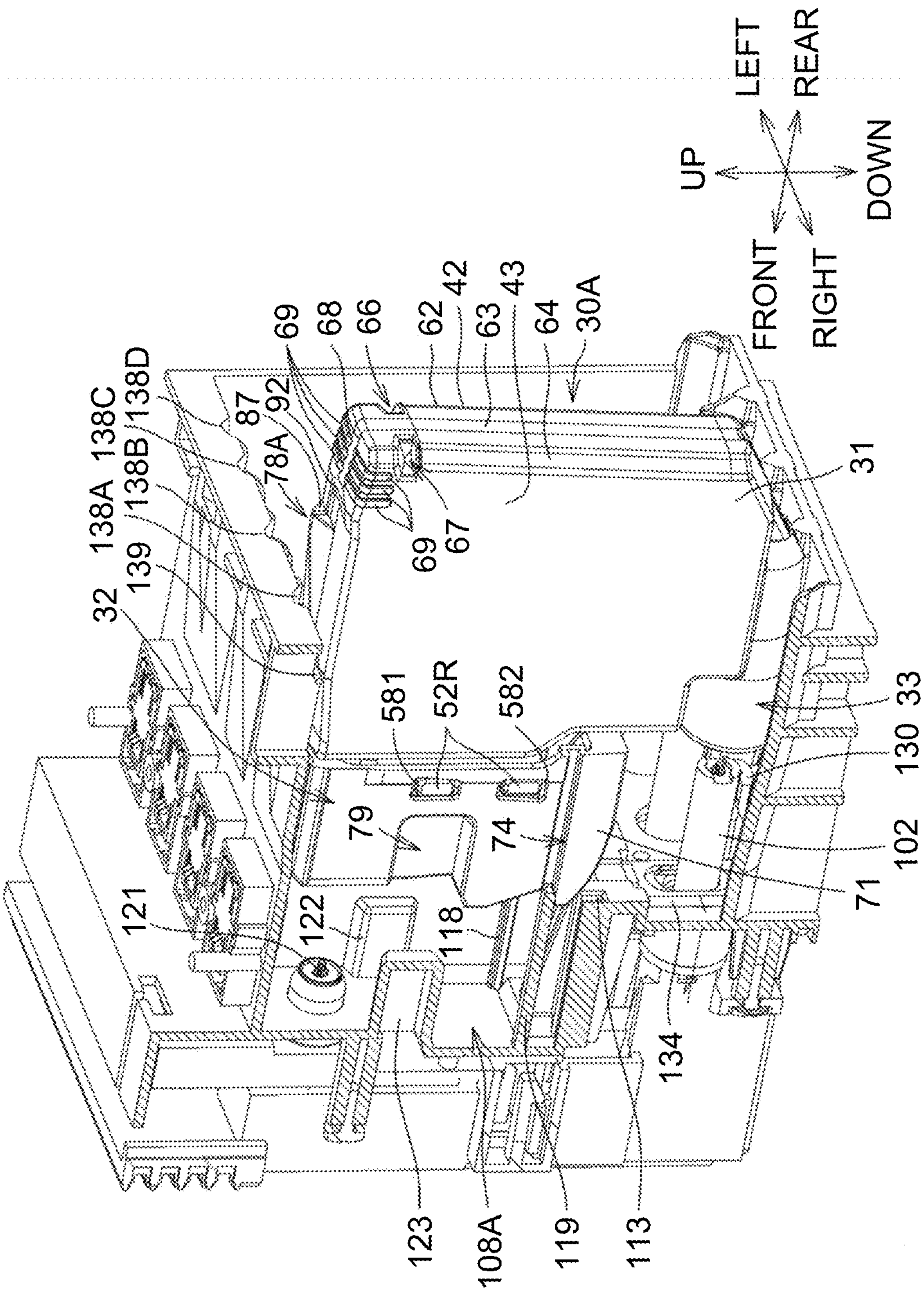
FIG. 12 is a partial cross-sectional perspective view of the ink cartridge 30 and the cartridge case 110, showing a state where the ink cartridge 30 is being inserted into the cartridge case 110.

As shown in FIGS. 9 and 10, the rear end of the upper surface 80 of the upper wall 44 of the container body 31 includes an operation surface 68. The operation surface 68 is an inclined surface inclined so as to face upward and rearward. The operation surface 68 is continuous with the upper end of the rear surface 62. The operation surface 68 has a plurality of protrusions 69 that protrude upward and extend along the left-right direction. As shown in FIG. 12, the protrusions 69 extend downward from both ends of the operation surface 68 in the left-right direction so as to reach the outer surfaces of the left wall 42 and the right wall 43. Three protrusions 69 extend from the left end of the operation surface 68 to the left wall 42 so as to be spaced apart in the front-rear direction. Three protrusions 69 extend from the right end of the operation surface 68 to the right wall 43 so as to be spaced apart in the front-rear direction. The protrusions 69 function as a slip stopper when the user operates the operation surface 68. Note that the slip stopper may be, for example, a recess recessed downward from the operation surface 68 instead of the protrusion 69.

The upper surface 80 of the container body 31 includes a first upper surface 81, a second upper surface 82, a third upper surface 83, an upper end surface 86, and the operation surface 68.

Figure 6:
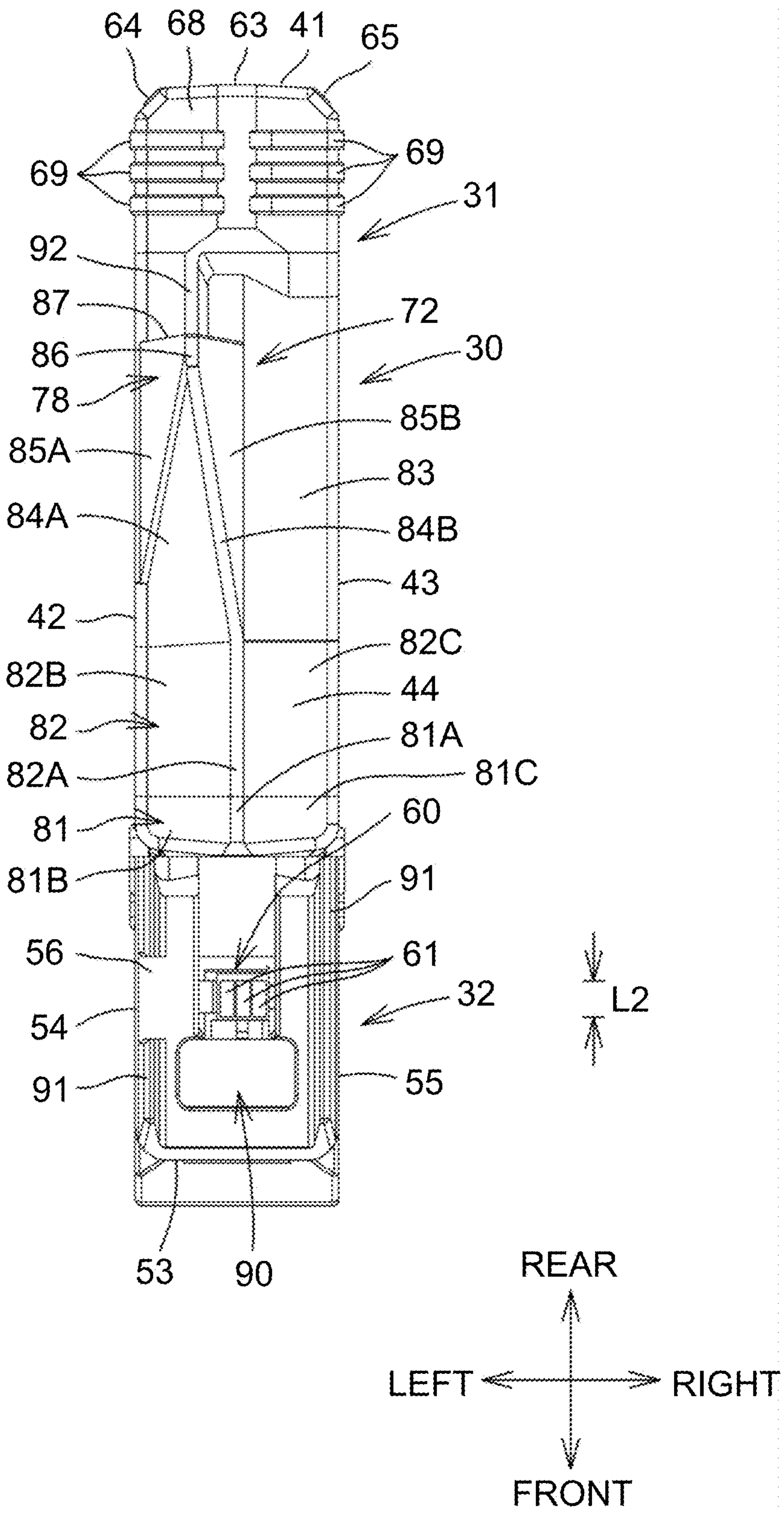
FIG. 6 is a plan view of the ink cartridge 30.

The first upper surface 81 is positioned at a front end of the upper surface 80. As shown in FIGS. 3 and 6, the first upper surface 81 has a surface 81A positioned at the center in the left-right direction, a surface 81B positioned on the left, and a surface 81C positioned on the right. The surface 81A is a plane orthogonal to the up-down direction. The surface 81B is continuous with the left end of the surface 81A. The surface 81C is continuous with the right end of the surface 81A. The surface 81B is a surface facing upward and leftward. The surface 81C is a surface facing upward and rightward. The distance of the surface 81A in the left-right direction is smaller than the distance of the surface 81B in the left-right direction. The distance of the surface 81A in the left-right direction is smaller than the distance of the surface 81C in the left-right direction.

The second upper surface 82 is continuous with the rear end of the first upper surface 81. The rear end of the second upper surface 82 is positioned higher than the front end thereof. The second upper surface 82 has a surface 82A positioned at the center in the left-right direction, a surface 82B positioned on the left of the surface 82A, and a surface 82C positioned on the right of the surface 82A. As shown in FIGS. 5 and 10, the surface 82A is inclined with respect to the front-rear direction so as to face frontward and upward. The surface 82A is a flat surface extending in the front-rear direction and the left-right direction. The surface 82A faces upward and frontward. The surface 82B is continuous with the left end of the surface 82A and faces leftward. The surface 82C is continuous with the right end of the surface 82A and faces rightward. The distance of the surface 82A in the left-right direction is smaller than the distance of the surface 82B in the left-right direction. The distance of the surface 82A in the left-right direction is smaller than the distance of the surface 82C in the left-right direction. The distance of the surface 82A in the left-right direction is equal to the distance of the surface 81A in the left-right direction. The distance of the surface 82A in the front-rear direction is greater than the distance of the surface 81A in the front-rear direction.

The third upper surface 83 is continuous with the rear end of the surface 82C of the second upper surface 82. The third upper surface 83 is a plane orthogonal to the up-down direction. The third upper surface 83 is positioned above the first upper surface 81. A rear end of the third upper surface 83 is continuous with the operation surface 68. The third upper surface 83 has a contact surface 92. The contact surface 92 extends rearward from a lower end of a locking surface 87 of a second key portion 78 described later.

As shown in FIGS. 5 and 6, the second key portion 78 is positioned on the third upper surface 83 of the container body 31. The second key portion 78 protrudes upward from the third upper surface 83. The second key portion 78 is positioned above the supply port 34. An upper end of the second key portion 78 is positioned above the upper surface of the electrode 61 of the IC board 60. The second key portion 78 is positioned rearward of the IC board 60 in the front-rear direction. The second key portion 78 is positioned frontward of the operation surface 68. When the protrusion 52 of the container body 31 is in contact with the upper end of the through hole 58 of the cover 32, the cover 32 is positioned at the lowest position with respect to the container body 31. In a state where the cover 32 is positioned at the lowest position with respect to the container body 31, the upper end of the second key portion 78 is positioned above the IC board 60.

The second key portion 78 has a first frontward inclined surface 84A, a second frontward inclined surface 84B, a left inclined surface 85A, a right inclined surface 85B, an upper end surface 86, and a locking surface 87. The first frontward inclined surface 84A is a flat surface and is inclined such that a distance with regard to the supply port 34 in the up-down direction gradually increases from a front end of the second key portion 78 toward a rear end of the second key portion 78. The first frontward inclined surface 84A is continuous with the rear end of the surface 82B of the second upper surface 82. The second frontward inclined surface 84B is a flat surface inclined with respect to the front-rear direction so as to face upward and frontward. The second frontward inclined surface 84B extends leftward as the second frontward inclined surface 84B extends rearward from the front end thereof. The rear end of the second frontward inclined surface 84B is continuous with the upper end surface 86. The front end of the second frontward inclined surface 84B is continuous with the rear end of the surface 82A of the second upper surface 82. The lower end of the second frontward inclined surface 84B is continuous with the third upper surface 83. The left end of the second frontward inclined surface 84B is continuous with the right end of the first frontward inclined surface 84A. A boundary between the first frontward inclined surface 84A and the second frontward inclined surface 84B extends leftward from the front end toward the rear. An upper end of the boundary between the first frontward inclined surface 84A and the second frontward inclined surface 84B is continuous with the upper end surface 86.

The upper end surface 86 is a flat surface facing upward. An upper end of the locking surface 87 is continuous with a rear end of the upper end surface 86. In other words, the upper end surface 86 is positioned between the second frontward inclined surface 84B and the locking surface 87 in the front-rear direction. The locking surface 87 is a flat surface facing rearward. In the attached state where the ink cartridge 30 is attached to the cartridge case 110, the locking surface 87 and the contact surface 92 are in contact with the locking portion 139 of the cartridge case 110. The lock surface 87 is an example of a first contact surface.

The left inclined surface 85A is a flat surface inclined with respect to the left-right direction so as to extend upward from the left end toward the right end. The left inclined surface 85A is continuous with a left end of the first frontward inclined surface 84A. A boundary between the left inclined surface 85A and the first frontward inclined surface 84A extends rightward from the front end toward the rear end. A rear end of the boundary between the left inclined surface 85A and the first frontward inclined surface 84A is continuous with the upper end surface 86. The upper end of the left inclined surface 85A is continuous with the upper end surface 86. The rear end of the left inclined surface 85A is continuous with the locking surface 87. The right inclined surface 85B is a flat surface that is inclined with respect to the left-right direction so as to extend upward from the right end toward the left end. The right inclined surface 85B is continuous with the right end of the second frontward inclined surface 84B. A boundary between the right inclined surface 85B and the second frontward inclined surface 84B extends leftward from the front end toward the rear end. A rear end of the boundary between the right inclined surface 85B and the second frontward inclined surface 84B is continuous with the upper end surface 86. The rear end of the right inclined surface 85B is continuous with the locking surface 87. Since the second key portion 78 has the first frontward inclined surface 84A, the second frontward inclined surface 84B, the left inclined surface 85A, and the right inclined surface 85B, the strength of the second key portion 78 is higher than in a case where the second key portion 78 has a surface extending in the up-down direction. Therefore, the second key portion 78 is not easily deformed by an impact from the right and left direction.

As shown in FIGS. 5 and 8, a first angle θ1 formed between the second frontward inclined surface 84B and a horizontal plane is smaller than a second angle θ2 formed between the left inclined surface 85A and a horizontal plane. A third angle θ3 formed between the right inclined surface 85B and a horizontal plane may be different from the second angle θ2 formed between the left inclined surface 85A and a horizontal plane. The first angle θ1 is, for example, within a range of 5° to 10°, and is 7° in the present embodiment. The second angle θ2 is, for example, within a range of 30° to 40°. The third angle θ3 is, for example, within a range of 30° to 40°.

The mechanical characteristics of the second key portion 78, such as the arrangement and shape, differ depending on the characteristics of each ink cartridge 30. The characteristics indicated by the second key portion 78 may be the same as or different from the characteristics indicated by the first key portion 77 and the third key portion 79. In the present embodiment, the characteristic of the ink cartridge 30 indicated by the second key portion 78 is the composition of the ink. The position of the second key portion 78 in the left-right direction on the second upper surface 82 varies depending on the composition of the ink. The composition of the ink means a material contained in the ink, for example, whether a coloring material contained in the ink is a black dye or a black pigment. The composition of the ink is an example of characteristics of ink.

As shown in FIG. 8, a distance M1 of the first key portion 77 in the left-right direction is smaller than a distance M2 of the second key portion 78 in the left-right direction, that is, a maximum width of the second key portion 78 in the left-right direction. As shown in FIG. 5, a distance M3 of the front end of the first key portion 77 in the up-down direction is greater than the distance M4 of the second key portion 78 in the up-down direction, that is, a maximum height of the second key portion 78 in the up-down direction. The distance M4 corresponds to a distance of the locking surface 87 of the second key portion 78 in the up-down direction. The maximum height of the second key portion 78 in the up-down direction is less than the maximum width of the second key portion 78 in the left-right direction.

As shown in FIG. 5, a first distance N1, which is the shortest distance between the center of the supply port 34 and the first key portion 77, is smaller than a second distance N2, which is the shortest distance between the center of the supply port 34 and the second key portion 78. With such a configuration, as will be described later, when the rear end of the container body 31 is rotated upward about the supply port 34, the distance of the trajectory of rotation of the first key portion 77 is smaller than the distance of the trajectory of rotation of the second key portion 78.

As shown in FIG. 11, an ink cartridge set 300 includes a plurality of ink cartridges 30. The ink cartridges 30 included in the ink cartridge set 300 have different mechanical characteristics such as the position and/or the shape of the first key portion 77, the second key portion 78, and the third key portion 79 depending on the difference in the characteristics of the ink cartridges 30. The positions of the first key portions 77 of the four ink cartridges 30 in the left-right direction are different depending on the colors of the inks stored in the ink cartridges 30. The positions of the second key portions 78 of the four ink cartridges 30 in the left-right direction are different depending on the compositions of the inks stored in the ink cartridges 30. In this specific embodiment, the composition of the ink means whether the ink contains a dye or a pigment. The positions and/or shapes of the third key portions 79 of the four ink cartridges 30 are different depending on the sales areas of the printers in which the cartridges 30 are used. The ink cartridge 30A in FIG. 11 corresponds to the ink cartridge 30 illustrated in FIGS. 3 to 10.

The position of the first key portion 77 in the left-right direction corresponds to the position of the first key slot 115 of the cartridge case 110. The first key portion 77 of the ink cartridge 77A, which is positioned on the rightmost side in FIG. 11, is positioned to the right of the center of the ink cartridge 30A in the left-right direction on the lower surface 70. The ink cartridge 30A stores a magenta ink which contains a dye as a coloring agent. The first key portion 77B of the ink cartridge 30B, which is positioned second from the right in FIG. 11, is positioned further to the left than the first key portion 77A of the ink cartridge 30A in the left-right direction on the lower surface 70. The ink cartridge 30B stores a cyan ink which contains a dye as a coloring agent. The first key portion 77C of the ink cartridge 30C, which is positioned third from the right in FIG. 11, is positioned further to the left than the first key portion 77B of the ink cartridge 30B in the left-right direction on the lower surface 70. The ink cartridge 30C stores a yellow ink which contains a dye as a coloring agent. The first key portion 77D of the ink cartridge 30D, which is positioned on the leftmost side in FIG. 11, is positioned further to the left than the first key portion 77C of the ink cartridge 30C in the left-right direction on the lower surface 70. The ink cartridge 30D stores a black ink which contains a pigment as a coloring agent.

The positions in the left-right direction of the second key portions 78A, 78B, 78C, and 78D of the ink cartridges 30A, 30B, 30C, and 30D correspond to the positions of the respective second key slots 138 of the cartridge case 110. Each of the second key portions 78A, 78B, and 78C of the ink cartridges 30A, 30B, and 30C is positioned further leftward than the center of the second upper surface 82 in the left-right direction. The second key portion 78D of the ink cartridge 30D is positioned to the right of the center of the second upper surface 82 in the left-right direction. In the present embodiment, since the four ink cartridges 30 shown in FIG. 11 are used in the same sales area, the positions and shapes of the third key portions 79 are the same.

[Attachment of Ink Cartridge 30 to Cartridge Case 110]

As shown in FIG. 12, the ink cartridge 30 is inserted into a predetermined slot 108 of the cartridge case 110 in the frontward direction. In other words, the ink cartridge 30 is inserted such that the front wall 53 of the ink cartridge 30 faces the end surface 103 of the case body 101. The ink cartridges 30A, 30B, 30C, and 30D storing magenta, cyan, yellow, and black inks, respectively are inserted into the four slots 108A, 108B, 108C, and 108D, respectively. Hereinafter, an example in which an ink cartridge 30A storing magenta ink is inserted into the rightmost slot 108A in the left-right direction will be described. The ink cartridge 30A storing magenta ink is positioned at the rightmost position in FIG. 11. The user pushes the first rear surface 63 of the ink cartridge 30A frontward with the finger and inserts the ink cartridge 30A frontward into the cartridge case 110.

As shown in FIGS. 13A and 13B, the ink cartridge 30A is inserted into the slot 108A through the opening 112 of the case body 101. The lower surface 47 of the inserted ink cartridge 30A is supported by the guide surface 161 of the case body 101 shown in FIG. 2.

Before the supply port 34 of the ink cartridge 30A reaches the supply tube 102, the second key portion 78A reaches a position directly below the second key slot 138A of the case body 101. The second key portion 78A of the ink cartridge 30A is positioned on the left with respect to the center of the second upper surface 82 in the left-right direction. On the other hand, the second key slot 138A is positioned on the left with respect to the center of the slot 108A in the left-right direction. Therefore, when the ink cartridge 30A is further inserted frontward, as shown in FIGS. 14A and 14B, the second key portion 78A moves directly below the second key slot 138A. When this occurs, the second frontward inclined surface 84B of the second key portion 78A comes into contact with the locking portion 139, whereby a downward force is applied to the ink cartridge 30A. When the downward force is applied to the second frontward inclined surface 84B of the second key portion 78A, the ink cartridge 30A rotates clockwise as shown in FIGS. 14A and 14B. As a result, the lower surface 47 of the supply portion 33 which defines the lower end of the ink cartridge 30A comes into contact with the guide surface 161 of the case body 101, and the second key portion 78A moves frontward while coming into contact with the locking portion 139.

Further, the first key portion 77A enters the first key slot 115A in a state where the supply portion 33 is in contact with the guide surface 161 of the case body 101 and the second frontward inclined surface 84B of the second key portion 78A is in contact with the locking portion 139.

Further, one of the pair of walls 71 enters the groove 113. The other one of the pair of walls 71 enters the groove 114. Further, the rib 118 enters one of the two grooves 74. The rib 119 enters the other one of the two grooves 74. One of the pair of walls 71 enters the groove 113, and the other enters the groove 114, whereby the cover 32 is guided frontward. When the rib 118 enters one of the two grooves 74 and the rib 119 enters the other one of the two grooves 74, the cover 32 is positioned with respect to the cartridge case 110 in the up-down direction. In other words, the position of the cover 32 with respect to the cartridge case 110 in the up-down direction is determined.

The second front surface 73 of the one of the pair of walls 71 moves frontward while being in contact with the lower surface of the groove 113 and the second front surface 73 of the other one of the pair of walls 71 moves frontward while being in contact with the lower surface of the groove 114, whereby one of the walls 71 is guided into the groove 113 and the other is guided into the groove 114 in the up-down direction. Further, when the first front surface 72 of one of the walls 71 or the lower front surface 75L of the cover 32 comes in contact with the rib 118 as the ink cartridge 30A moves frontward, the rib 118 is guided into the groove 74 in the up-down direction. When the first front surface 72 of the other one of the walls 71 or the lower front surface 75L of the cover 32 comes in contact with the rib 119 as the ink cartridge 30A moves frontward, the rib 119 is guided into the groove 74 in the up-down direction. In addition, when the first key portion 77A of the ink cartridge 30A enters the first key slot 115A, the side surfaces 77S of the first key portion 77A shown in FIGS. 4 and 8 moves frontward while being into contact with the pair of protruding pieces 117, and thus the first key portion 77A is guided into the first key slot 115A in the left-right direction.

While the first key portion 77A of the ink cartridge 30A enters the first key slot 115A, the second key portion 78A enters the second key slot 138A. In addition, while the second key portion 78A enters the second key slot 138A, the second frontward inclined surface 84B and the upper end surface 86 sequentially come into contact with the locking portion 139. As shown in FIGS. 14A and 14B, a downward and rearward force acts on the container body 31 in a state where the second frontward inclined surface 84B is in contact with the locking portion 139, and a downward force acts on the container body 31 in a state where the upper end surface 86 is in contact with the container body 31. When the second frontward inclined surface 84B or the upper end surface 86 slides on the locking portion 139, the lower surface 47 of the container body 31 slides on the guide surface 161.

When the first key portion 77A of the ink cartridge 30A enters the first key slot 115A, the lower surface 77L of the first key portion 77A comes into contact with the upper end 136 of the pressing plate 134. When the first key portion 77A of the ink cartridge 30A enters the first key slot 115A, the lower surface 77L of the first key portion 77A presses the pressing plate 134 downward to move the ink receiving member 130 from the first position to the second position. When this occurs, an upward force originated from the urging, i.e., pulling force of the coil spring 133 acts on the cover 32 via the ink receiving member 130 and the pressing plate 134, but the surfaces 74L and 74U of the groove 74 shown in FIG. 8 is in contact with the rib 118, whereby the cover 32 is positioned with respect to the cartridge case 110 in the up-down direction. As a result, the cover 32 does not move upward. The pressing plate 134 moves downward against the urging force of the coil spring 133. When the pressing plate 134 moves downward, the ink receiving member 130 moves from the first position shown in FIGS. 13A and 13B to the second position shown in FIGS. 14A and 14B.

When the ink receiving member 130 is in the second position, the supply port 34 is connected to the supply tube 102 as the ink cartridge 30A moves frontward. The supply tube 102 pushes the valve 36, and the valve 36 moves rearward against the biasing force of the coil spring 37. The outer peripheral surface of the supply tube 102 connected to the supply portion 33 is in contact with the seal member 35 so as not to leak the ink.

Figure 15A:
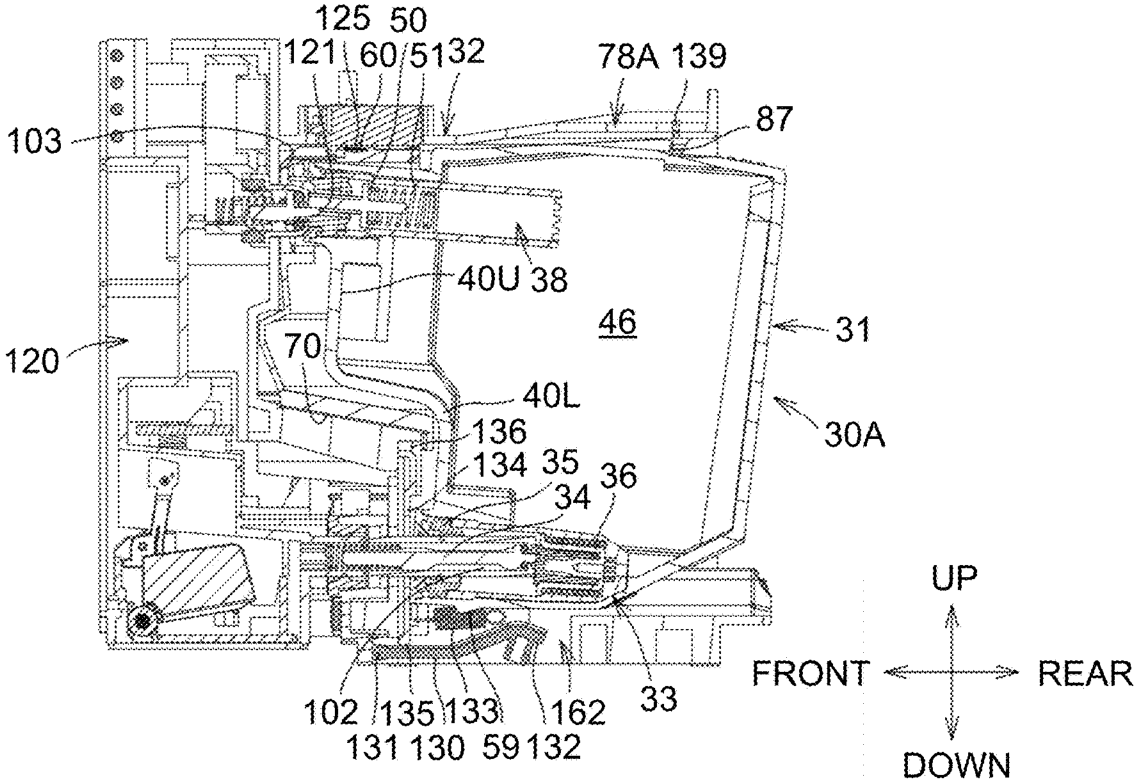
FIGS. 15A and 15B are cross-sectional views of the ink cartridge 30 and the cartridge case 110, each showing a state where the ink cartridge 30 is positioned in the cartridge case 110 and a supply tube 102 is inserted into a supply port 34.
Figure 15B:
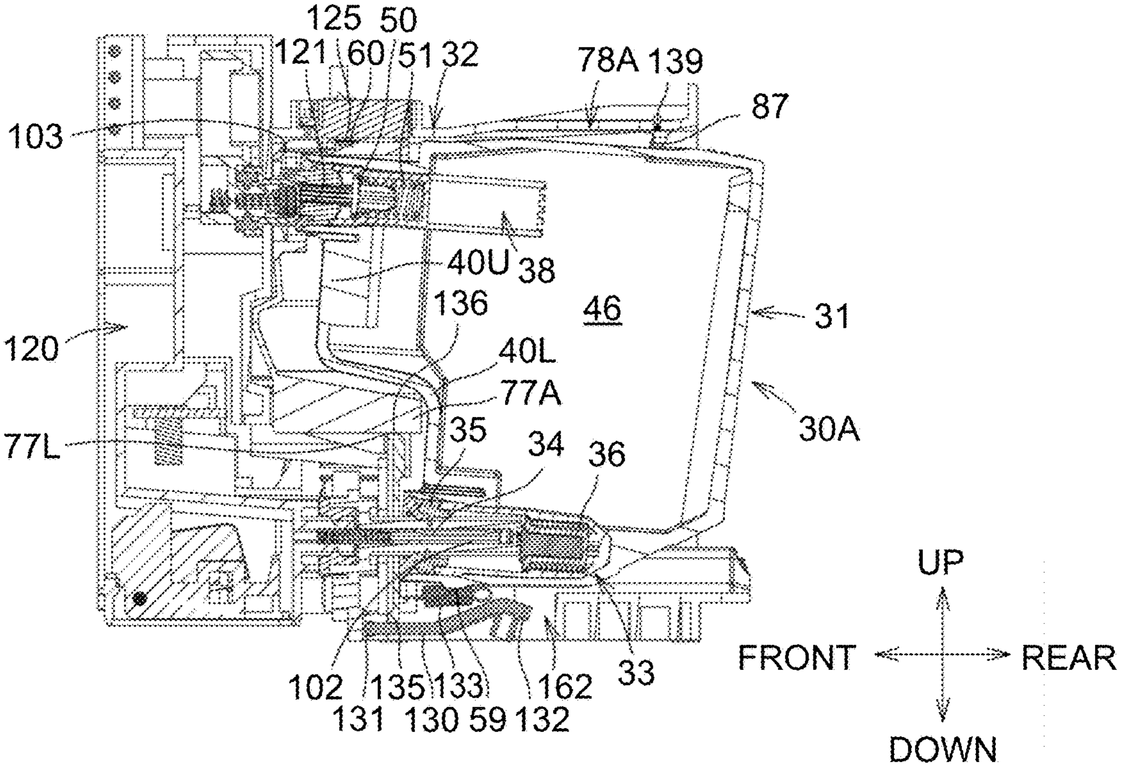

As shown in FIGS. 15A and 15B, as the ink cartridge 30A moves frontward, the rod 121 of the slot 108A comes into contact with the valve 50 of the atmosphere opening path 38 through the opening of the cover 32. The rod 121 pushes the valve 50, and the valve 50 moves rearward against the urging force of the coil spring 51. When the valve 50 moves rearward, the atmosphere opening path 38 is opened to allow air to flow between the outside and the chamber 46. Further, the electrodes 61 of the IC board 60 comes into contact with the contacts 125 and are electrically connected to the contacts 125. Further, the locking surface 87 of the second key portion 78A is positioned frontward of the locking portion 139. The contact surface 92 is positioned directly below the locking portion 139.

The contacts 125 are elastically deformable like a leaf spring, the contacts 125 apply a downward contact pressure to the electrodes 61 when the electrodes 61 contact the contacts 125. Further, the biasing force of the coil spring 133 indirectly acting upward on the cover 32. Although the contacts 125 apply the downward contact pressure to the electrodes 61 and the coil spring 133 applies the upward pressure to the first key portion 77A, the surface 74L or 74U of the grooves 74 absorbs the upward or downward pressure by the rib 118 and the rib 119 coming into contact with the surface 74L or 74U of the grooves 74. Accordingly, the force acting upward to the cover 32 and the force acting downward to the cover 32 are balanced.

Further, as shown in FIG. 15B, the position in the front-rear direction at which the upper end 136 of the pressing plate 134 is in contact with the first key portion 77A is different from the position in the front-rear direction at which the contacts 125 are in contact with the electrodes 61. Specifically, the position in the front-rear direction at which the upper end 136 of the pressing plate 134 is in contact with the first key portion 77A is positioned frontward of the position in the front-rear direction at which the contacts 125 are in contact with the electrodes 61. As a result, a force acts on the cover 32 to rotate the cover 32 about a rotation axis extending in the left-right direction such that the rear end side of the cover 32 moves more upward than the front end side thereof. On the other hand, as shown in FIG. 17, the rib 118 and the rib 119 come into contact with the surfaces 74L, 74U of the grooves 74, whereby the rotation of the cover 32 is suppressed.

Figure 17:
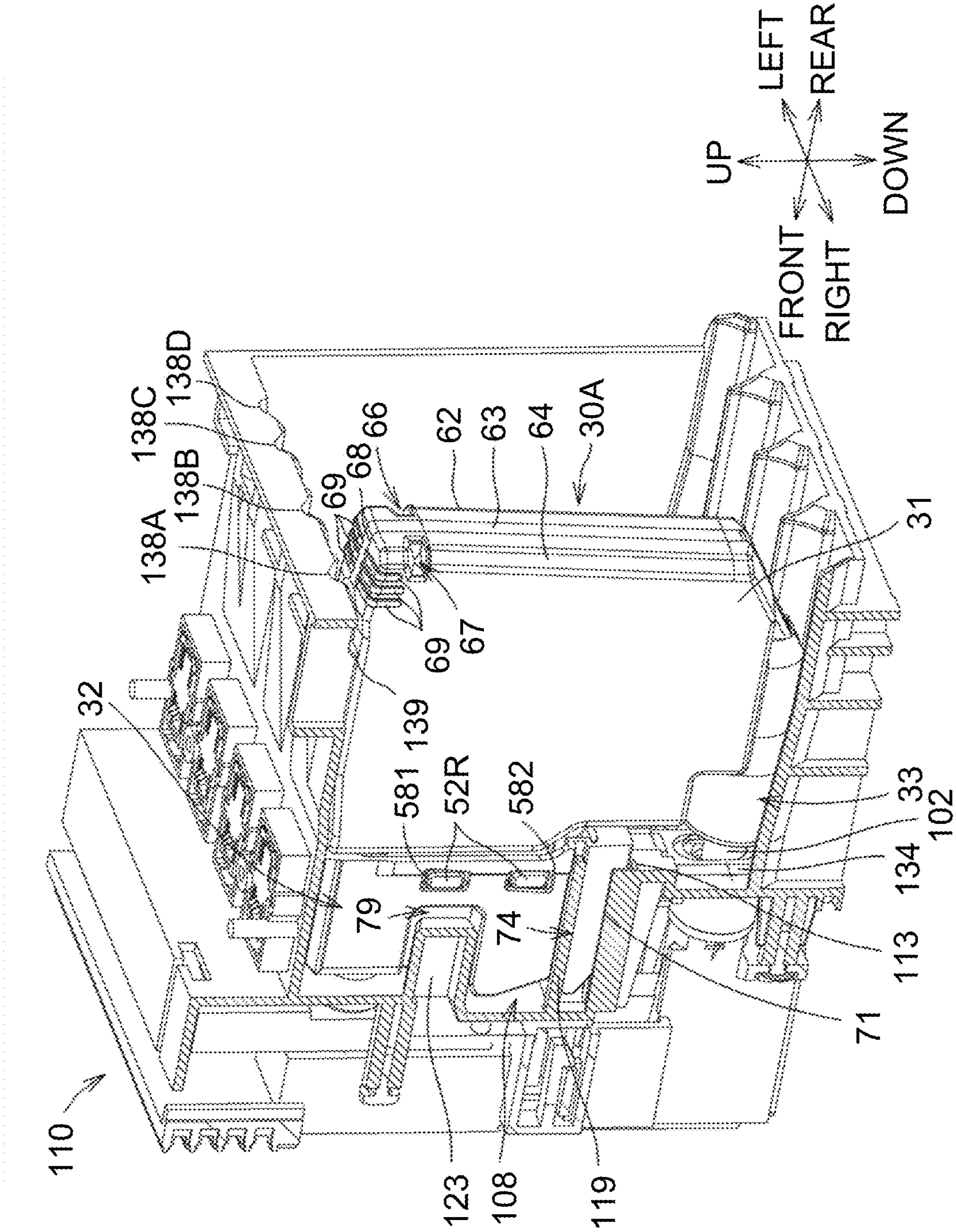
FIG. 17 is a partial cross-sectional perspective view of the ink cartridge 30 and the cartridge case 110, showing the attached state of the ink cartridge 30 where the ink cartridge 30 is attached to the cartridge case 110.

As shown in FIG. 17, when the ink cartridge 30A is inserted to be in the attached state in the slot 108A, the third key portions 79 matches with the fitting piece 122 and the fitting piece 123. It is assumed that an ink cartridge 30 which is sold in a different area, and which is not provided with one of the recesses of the third key portion 79 formed in the left wall 54 and the right wall 55 of the cover 32 is inserted into the slot 108D. In the slot 108D, the fitting piece 122 is positioned on the right side, and the fitting piece 123 is positioned on the left side. In the ink cartridge 30 in which one of the recesses of the third key portion 79 formed in the left wall 54 and the right wall 55 of the cover 32 is not provided, the front wall 53 of the cover 32 comes into contact with one of the fitting piece 122 and the fitting piece 123. Thus, the ink cartridge 30 cannot be further inserted into the slot 108D in the frontward direction. Since the ink cartridge 30 cannot be inserted into the slot 108D, it means that the ink cartridge 30 is identified as an ink cartridge 30 that is intended to be used in a printer sold in a sales area different from that of the printer 10.

Figure 16A:
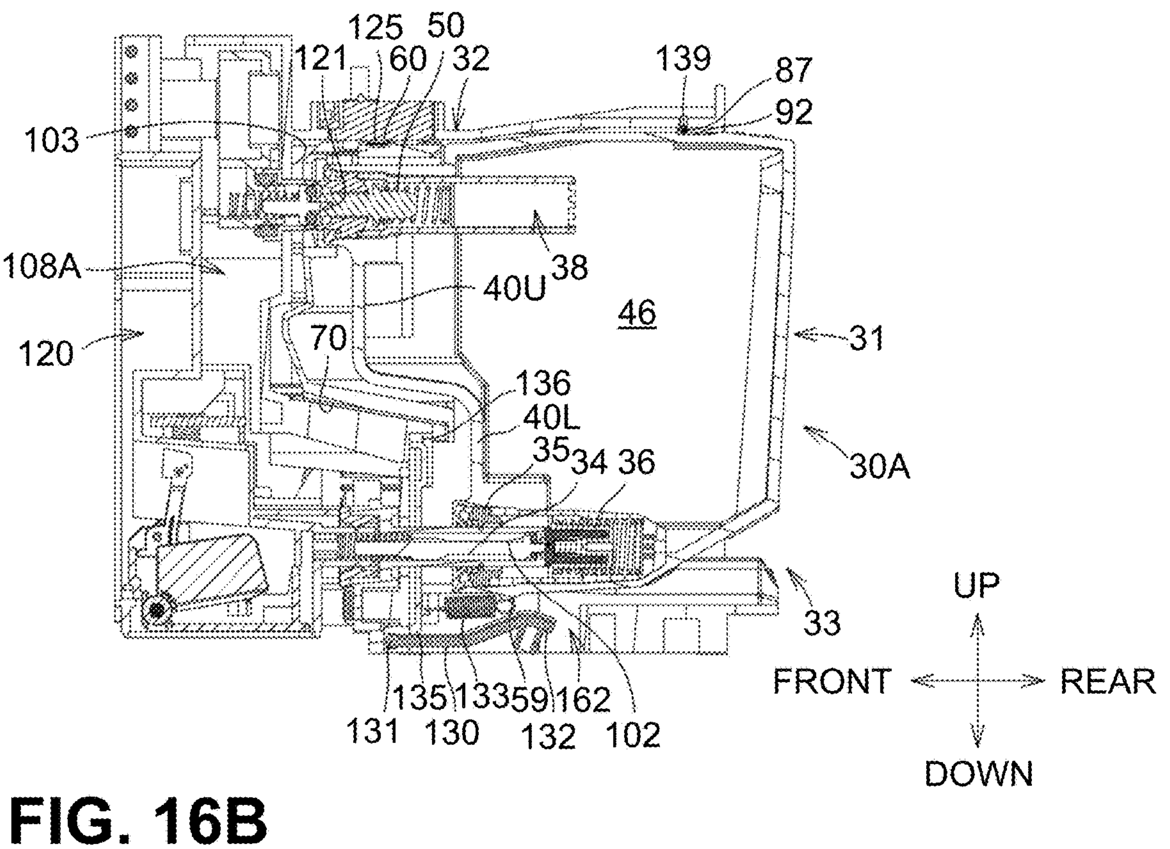
FIGS. 16A and 16B are cross-sectional views of the ink cartridge 30 and the cartridge case 110, each showing an attached state of the ink cartridge 30 where the ink cartridge 30 is attached to the cartridge case 110.
Figure 16B:
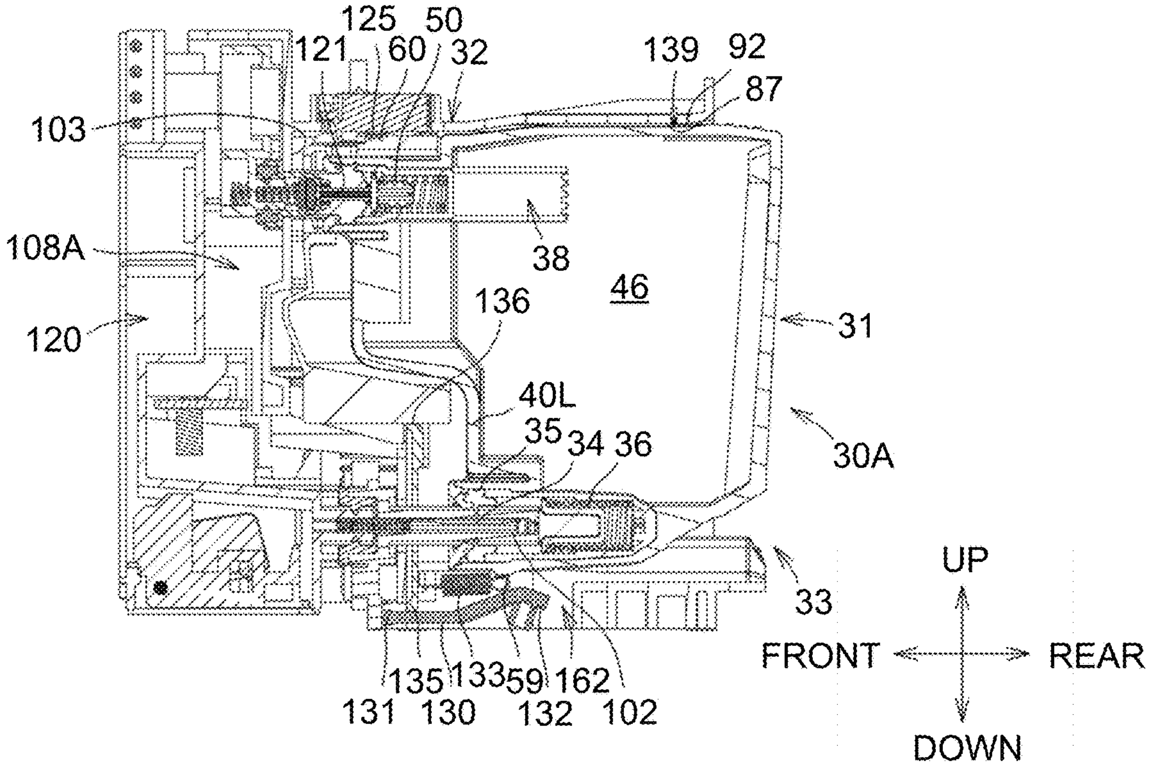

In the state shown in FIGS. 15A and 15B, the container body 31 is rotatable around the supply port 34 such that the rear end thereof is to be moved downward and upward in a state where the container body 31 is inserted in the slot 108A. More specifically, the container body 31 is rotatable around an axis extending in the left-right direction and passing through the center of the supply port 34 so that the rear end side thereof moves upward in the slot 108A. Although the position of the cover 32 with respect to the cartridge case 110 in the up-down direction is determined as described before, because the through hole 58 of the cover 32 is sufficiently larger than the outer shape of the protrusion 52 of the container body 31, the container body 31 can rotate like this. When the ink cartridge 30A rotates so that the rear end side moves upward, the locking surface 87 of the second key portion 78A and the locking portion 139 face each other in the front-rear direction. When the user removes his/her fingers from the ink cartridge 30A, the ink cartridge 30A is moved rearward by the urging forces of the coil spring 37 and the coil spring 51, and the locking surface 87 comes into contact with the locking portion 139 as shown in FIGS. 16A and 16B. Accordingly, the ink cartridge 30A is held in the attached state. Further, the contact surface 92 comes into contact with the locking portion 139. As a result, the container body 31 of the ink cartridge 30A is positioned in the up-down direction with respect to the cartridge case 110. In other words, the position of the ink cartridge 30A with respect to the cartridge case 110 in the up-down direction is determined.

In a state where the ink cartridge 30A is held in the cartridge case 110, the internal space of the ink cartridge 30A communicates with the atmosphere through the internal space of the atmosphere opening path 38. As a result, the ink in the chamber 46 flows into the internal space of the supply tube 102 through the internal space of the supply portion 33.

In addition, although the ink cartridge 30A is urged rearward by the coil spring 37 and the coil spring 51, the locking surface 87 of the ink cartridge 30A and the locking portion 139 of the cartridge case 110 come into contact with each other, and thus the rearward movement of the ink cartridge 30A is suppressed. As a result, the ink cartridge 30A is held in the cartridge case 110.

In addition, in the attached state where the ink cartridge 30A is held in the cartridge case 110, the electrodes 61 of the IC board 60 are in contact with the contacts 125. Further, the electrodes 61 are electrically connected to the contacts 125 so that the IC can communicate with the control unit of the printer 10 via the electrodes 61 and the contacts 125.

In addition, in the attached state of the ink cartridge 30A, the downward force which the electrodes 61 of the ink cartridge 30A receive from the contacts 125 is transmitted to the supply tube 102 which is inserted into the internal space of the supply portion 33. Since the downward force transmitted to the supply tube 102 is weakened by the upward counteracting force by the biasing force of the coil spring 133 via the pressing plate 134, it is possible to reduce the possibility that the supply tube 102 is deformed.

It is assumed that an ink cartridge 30 having the first key portion 77 at the same position as the ink cartridge 30A and the second key portion 78 at the same position as the ink cartridge 30D is inserted into the rightmost slot 108A of the cartridge case 110 shown in FIG. 2. In the rightmost slot 108A, the first key slot 115A is positioned on the right side of the slot 108A in the left-right direction, corresponding to the position of the first key portion 77 of the ink cartridge 30A. On the other hand, the second key slot 138A is positioned on the left side with respect to the center of the slot 108A in the left-right direction, corresponding to the position of the second key portion 78 of the ink cartridge 30A, not of the ink cartridge 30D. Therefore, since the second key portion 78 of this ink cartridge 30 and the second key slot 108A of the second key slot 138A are misaligned in the left-right direction, the upper end surface 86 comes into contact with the case body 101 before the second key portion 78 enters the second key slot 138A as the ink cartridge 30 rotates. As a result, since the locking surface 87 and the locking portion 139 do not face with each other in the front-rear direction, the ink cartridge 30A is not held in the slot 108D. Since the container body 31 cannot be rotated, the user understands that the ink cartridge 30 is not the ink cartridge 30 to be inserted into the slot 108A.

It is assumed that an ink cartridge 30 having the first key portion 77 at the same position as the ink cartridge 30A and the second key portion 78 at the same position as the ink cartridge 30D is inserted into the rightmost slot 108A of the cartridge case 110 shown in FIG. 2. In the rightmost slot 108A, the first key slot 115A is positioned on the right side of the slot 108A in the left-right direction, corresponding to the position of the first key portion 77 of the ink cartridge 30A. Therefore, the first key portion 77 of the ink cartridge 30 can enter the first key slot 115A. On the other hand, the second key slot 138A is positioned on the left side with respect to the center of the slot 108A in the left-right direction, corresponding to the position of the second key portion 78 of the ink cartridge 30A, not of the ink cartridge 30D. Therefore, since the second key portion 78 of this ink cartridge 30 and the second key slot 108A of the second key slot 138A are misaligned in the left-right direction, the upper end surface 86 comes into contact with the case body 101 before the second key portion 78 enters the second key slot 138A as the ink cartridge 30 rotates. As a result, since the locking surface 87 and the locking portion 139 do not face with each other in the front-rear direction, the ink cartridge 30A is not held in the slot 108D. Since the container body 31 cannot be rotated, the user understands that the ink cartridge 30 is not the ink cartridge 30 to be inserted into the slot 108A.

Next, the movement of the ink cartridge 30A, which is in the attached state where the ink cartridge 30A attached to the cartridge case 110, is detached and removed from the cartridge case 110 will be described. As shown in FIG. 17, in the attached state, the rib 118 and the rib 119, which are in contact with the grooves 74, restrict the up-down movement and rotation of the cover 32. Since the container body 31 is relatively movable with respect to the cover 32, only the container body 31 is rotatable around the supply port 34, more specifically, around the axis extending in the left-right direction and passing through the center of the supply port 34, even when the movement in the up-down direction and the rotation of the cover 32 are restricted. By the rotation of the container body 31, the locking surface 87 and the locking portion 139 selectively contact with each other and are separated from each other in the up-down direction.

In the attached state, when the user presses down the operation surface 68 of the container body 31 with a finger, the rear end side of the container body 31 moves downward. Thus, the locking surface 87 and the locking portion 139 are separated from each other in the up-down direction. When the user removes his/her finger from the operation surface 68, the ink cartridge 30 is moved rearward in the slot 108A by the urging forces of the coil spring 37 and the coil spring 51.

In the attached state, the protrusion 59 of the ink cartridge 30A is positioned in the space 162 of the case body 101. As the ink cartridge 30A moves rearward in the slot 108A, the protrusion 59 also moves rearward in the space 162, and the protrusion 59 comes into contact with the front end of the guide surface 161. As a result, the rearward movement of the ink cartridge 30A is restricted, and as shown in FIGS. 14A and 14B, the ink cartridge 30A does not jump out from the slot 108A, and stands still in a state where the front side of the ink cartridge 30A is positioned in the slot 108A. Further, as shown in FIGS. 13A and 13B, when the ink cartridge 30A moves rearward, the protrusion 59 of the ink cartridge 30A separates from the guide surface 161 of the slot 108A, and the ink cartridge 30A is taken out from the slot 108A.

Operation and Effect of Present Embodiment

The position of the cover 32 is determined in the up-down direction in the cartridge case 110 by the surface 74L and the surface 74U of the groove 74 contacting with the rib 118 or the rib 119. The container body 31 is rotatable about a rotation axis in the left-right direction with respect to the cover 32. The lock surface 87 comes in contact with the lock portion 139 by the rotation of the container body 31. The lock surface 87 is in contact with the lock portion 139, and thus the ink cartridge 30 is not moved rearward in the cartridge case 110.

In the cartridge case 110, the position of the cover 32 is determined in the up-down direction regardless of the position of the container body 31 in the up-down direction. The position of the cover 32 is determined in the up-down direction, and thus the position of the electrodes 61 of the IC board 60 is determined in the up-down direction. As a result, the contact 125 is electrically stably contacted to the electrodes 61*s* of the IC board 60.

First Modification

In the above-described embodiment, the surface 592 is inclined with respect to the rear surface 522 so as to extend rearward as it extends upward. The surface 560 is inclined with respect to the rear surface 530 so as to extend rearward as it extends upward. However, the surface 592 may be parallel to the rear surface 522 without being inclined. That is, the surface 592 may extend in the up-down direction. The surface 560 may be parallel to the rear surface 530 without being inclined. That is, the surface 560 may extend in the up-down direction.

Second Modification

Figure 24:
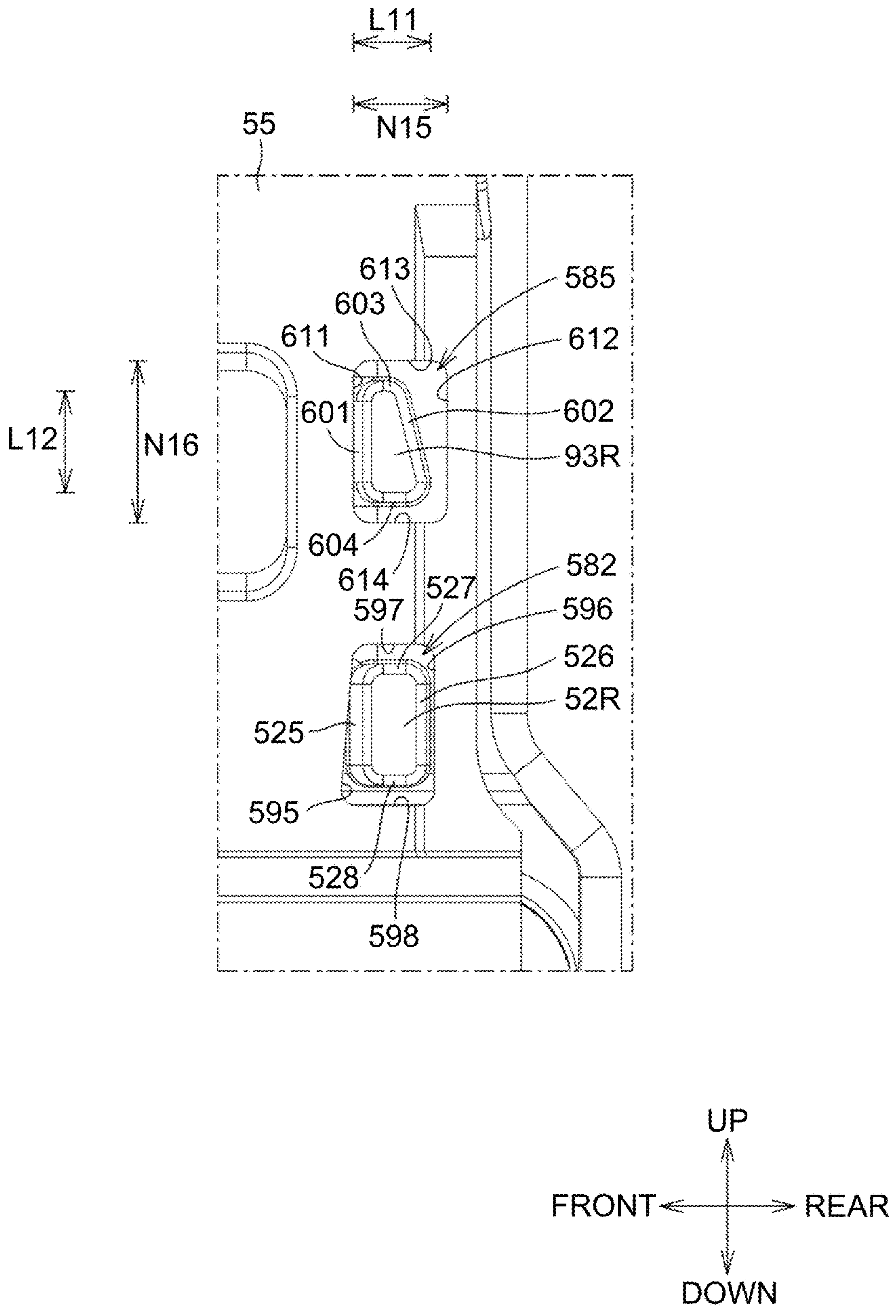
FIG. 24 is an enlarged view of the vicinity of a protrusion 93R.
Figure 25:
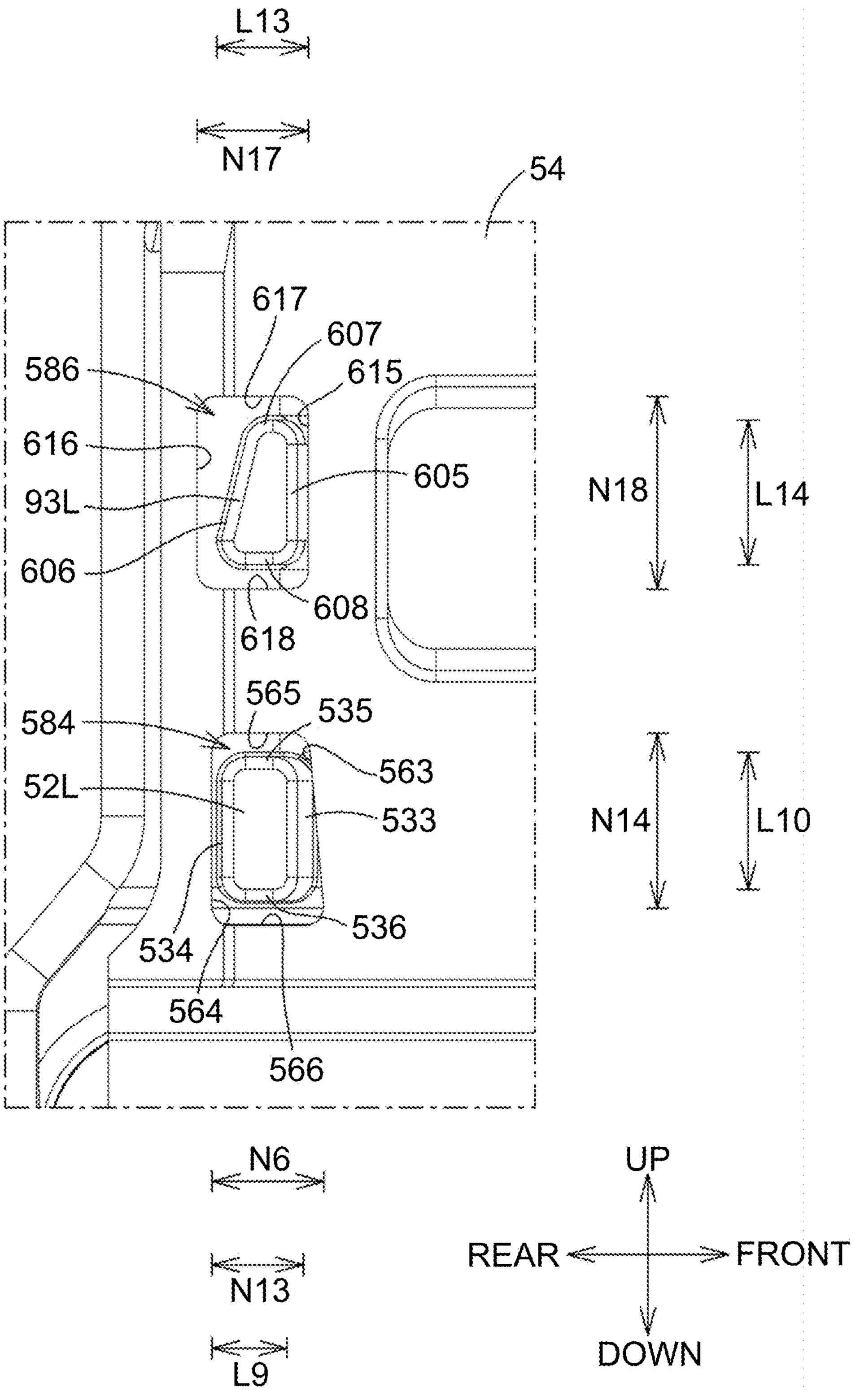
FIG. 25 is an enlarged view of the vicinity of a protrusion 93L.

In the above-described embodiment, the protrusions 52R and 52L are quadrangular poles. However, at least one of the protrusions 52R and 52L may have a shape other than a quadrangular pole. For example, as shown in FIGS. 24 and 25, the protrusions 52R and 52L on the upper side may be replaced to protrusions 93R and 93L. Further, the through holes 585 and 586 on the upper side may be replaced to through hole 581,583.

The protrusion 93R has a front surface 601 facing forward, a rear surface 602 facing rearward, an upper surface 603 facing upward, and a lower surface 604 facing downward. The front surface 601 extends in the up-down direction. The rear surface 602 is inclined with respect to a surface 612 of the through hole 585 so as to extend forward as it extends upward. The front surface 601 is an example of the first front surface. The rear surface 602 is an example of the first rear surface.

The protrusion 93L has a front surface 605 facing forward, a rear surface 606 facing rearward, an upper surface 607 facing upward, and a lower surface 608 facing downward. The front surface 605 extends in the up-down direction. The rear surface 606 is inclined with respect to a surface 615 of the through hole 586 so as to extend forward as it extends upward. The front surface 605 is an example of the third front surface. The rear surface 606 is an example of the third rear surface.

The through hole 585 has a surface 611 facing the front surface 601 of the protrusion 93R, a surface 612 facing the rear surface 602 of the protrusion 93R, and surfaces 613 and 614 each connecting the surface 611 and the surface 612. The surface 611 faces rearward. The surface 612 faces forward. The surface 611 is an example of the first surface. The surface 612 is an example of the second surface.

The through hole 586 has a surface 615 facing the front surface 605 of the protrusion 93L, a surface 616 facing the rear surface 606 of the protrusion 93L, and surfaces 617 and 618 each connecting the surface 615 and the surface 616. The surface 615 faces rearward. The surface 616 faces forward. The surface 615 is an example of the fifth surface. The surface 616 is an example of the sixth surface.

A distance N15 between the lower end of the surface 611 of the through hole 585 and the lower end of the surface 612 of the through hole 585 in the front-rear direction is greater than a distance L11 between the lower end of the front surface 601 of the protrusion 93R and the lower end of the rear surface 602 in the front-rear direction. A distance N16 between the surfaces 613 and 614 of the through hole 585 in the up-down direction is greater than a distance L12 between the upper surface 603 and the lower surface 604 of the protrusion 93R in the up-down direction. The protrusion 93R engages with the through hole 585. In other words, the protrusion 93R is engaged with the through hole 585, and thus the movement of the protrusion 93R in the front-rear direction and the movement of the protrusion 93R in the up-down direction are limited to a predetermined range by the through hole 585.

A distance N17 between the lower end of the surface 615 of the through hole 586 and the lower end of the surface 616 of the through hole 586 in the front-rear direction is greater than a distance L13 between the lower end of the front surface 605 of the protrusion 93L and the lower end of the rear surface 606 of the protrusion 93L in the front-rear direction. A distance N18 between the surfaces 617 and 618 of the through hole 586 in the up-down direction is greater than a distance L14 between the upper surface 607 and the lower surface 608 of the protrusion 93L in the up-down direction. The protrusion 93L engages with the through hole 586. In other words, the protrusion 93L is engaged with the through hole 586, and thus the movement of the protrusion 93L in the front-rear direction and the movement of the protrusion 93L in the up-down direction are limited to a predetermined range by the through hole 586.

The protrusions 93R and 93L and the through holes 585 and 586 allow the container body 31 to rotate about a rotation axis in the left-right direction with respect to the cover of which the position in the up-down direction is determined. Further, since the size of the through holes 585 and 586 can be reduced, a decrease in the strength of the cover 32 can be suppressed.

Third Modification

Figure 26:
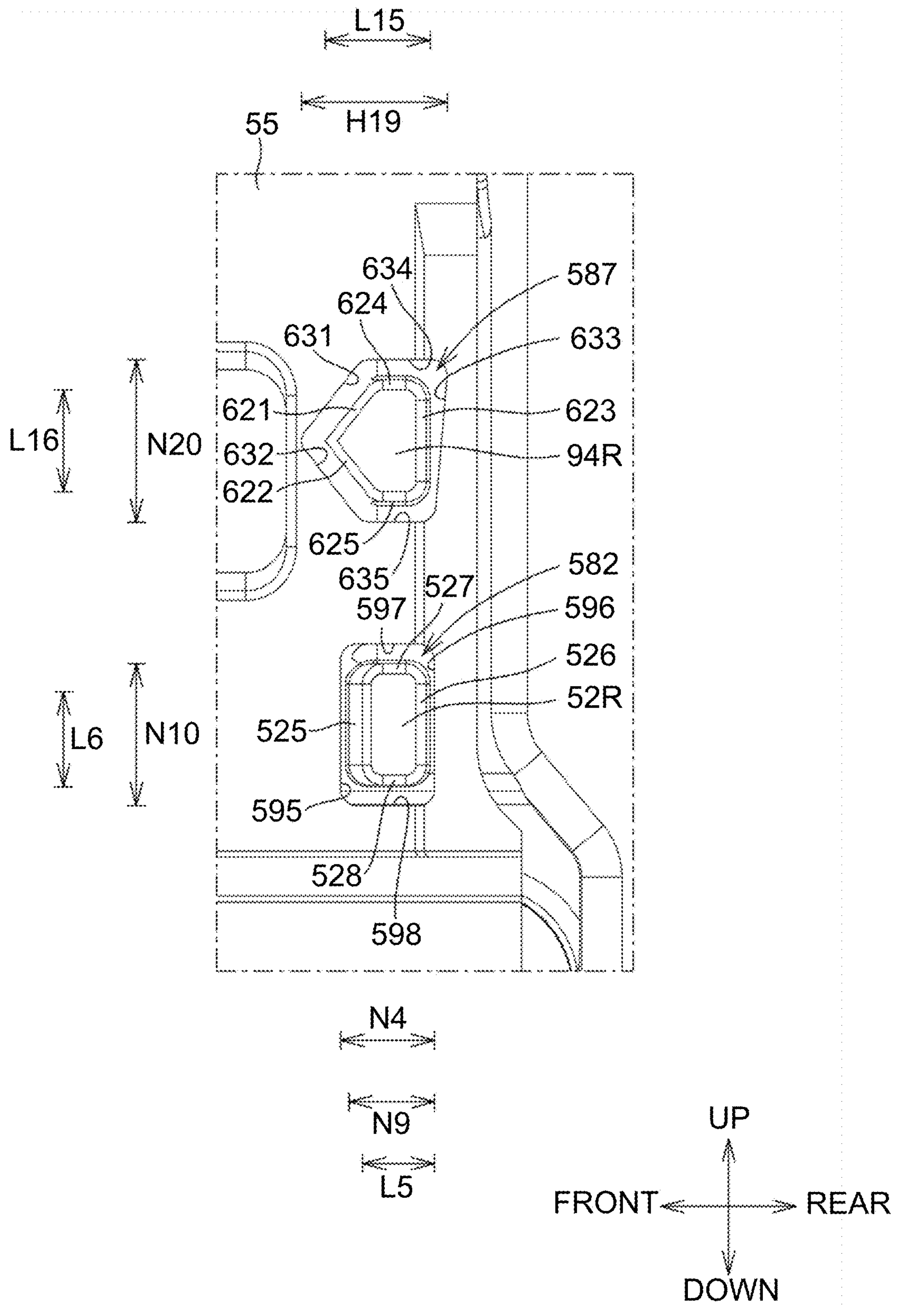
FIG. 26 is an enlarged view of the vicinity of a protrusion 94R.
Figure 27:
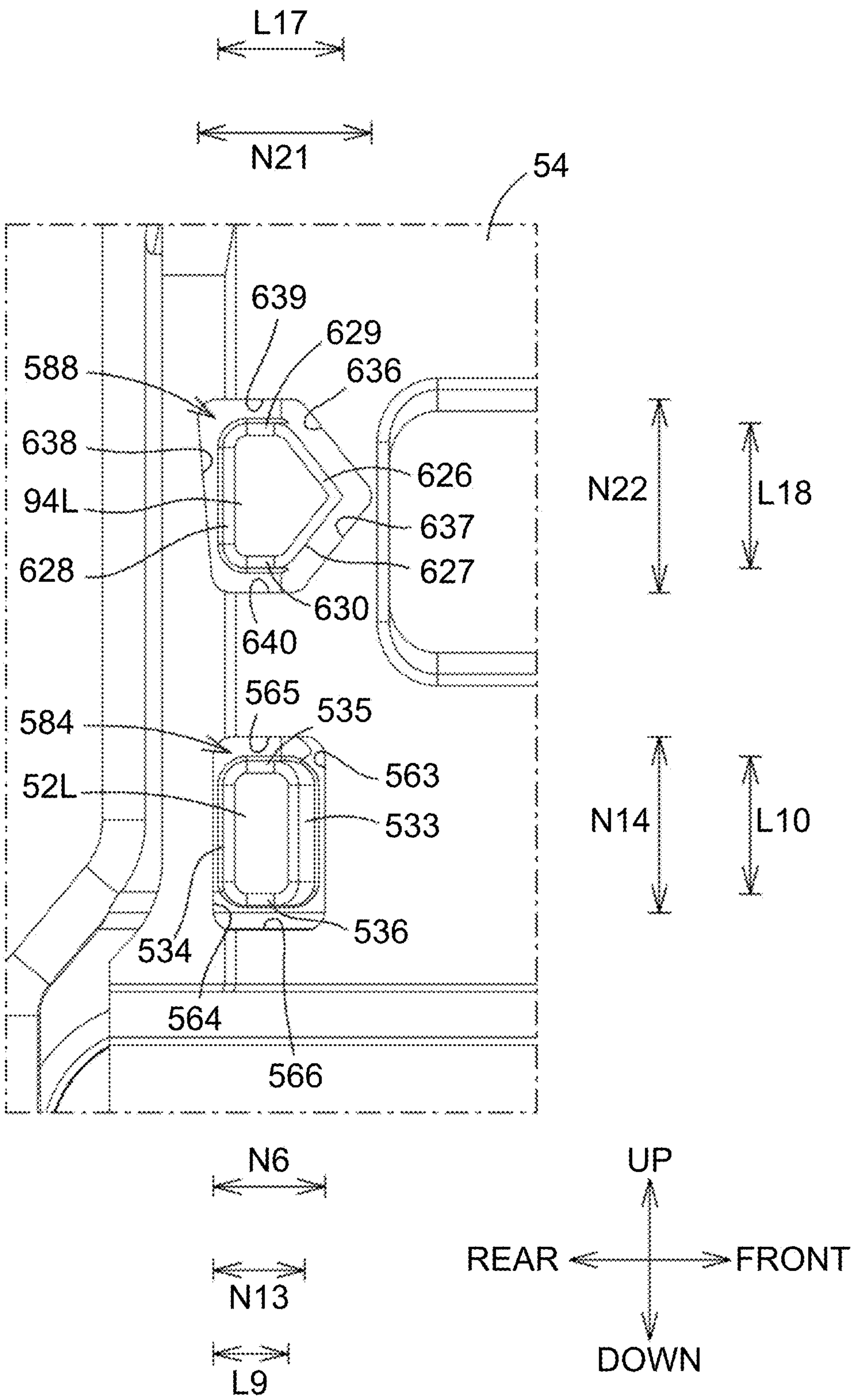
FIG. 27 is an enlarged view of the vicinity of a protrusion 94L.

As shown in FIGS. 26 and 27, the protrusions 52R and 52L on the upper side may be replaced to protrusions 94R and 94L. Further, the through holes 587 and 588 on the upper side may be replaced to through holes 581 and 583.

The protrusion 94R has a first front surface 621 facing forward and upward, a second front surface 622 facing forward and downward, a rear surface 623 facing rearward, an upper surface 624 facing upward, and a lower surface 625 facing downward. The first front surface 621 is inclined with respect to the up-down direction so as to extend rearward as it extends upward. The second front surface 622 is inclined with respect to the up-down direction so as to extend forward as it extends upward. The rear surface 623 is an example of the first rear surface.

The protrusion 94L has a third front surface 626 facing forward and upward, a fourth front surface 627 facing forward and downward, a rear surface 628 facing rearward, an upper surface 629 facing upward, and a lower surface 630 facing downward. The third front surface 626 is inclined with respect to the up-down direction so as to extend rearward as it extends upward. The fourth front surface 627 is inclined with respect to the up-down direction so as to extend forward as it extends upward. The rear surface 628 is an example of the first rear surface.

The through hole 587 has a surface 631 facing the first front surface 621 of the protrusion 94R, a surface 632 facing the second front surface 622 of the protrusion 94R, a surface 633 facing the rear surface 623 of the protrusion 94R, a surface 634 connecting the surface 631 and the surface 633, and a surface 635 connecting the surface 632 and the surface 633. The surface 631 is inclined with respect to the up-down direction so as to extend rearward as it extends upward. The surface 632 is inclined with respect to the up-down direction so as to extend forward as it extends upward. The surface 631 is an example of the first surface. The surface 632 is an example of the second surface.

The through hole 588 has a surface 636 facing the first front surface 626 of the protrusion 94L, a surface 637 facing the second front surface 627 of the protrusion 94L, a surface 638 facing the rear surface 628 of the protrusion 94L, a surface 639 connecting the surface 636 and the surface 638, and a surface 640 connecting the surface 637 and the surface 638. The surface 636 is inclined with respect to the up-down direction so as to extend rearward as it extends upward. The surface 637 is inclined with respect to the up-down direction so as to extend forward as it extends upward. The surface 636 is an example of the third surface. The surface 637 is an example of the fourth surface.

In the third modification, the surface 595 of the through hole 582 extends in the up-down direction. The surface 563 of the through hole 584 extends in the up-down direction.

A distance N19 between a boundary between the surfaces 631 and 632 of the through hole 587 and the lower end of the surface 633 is greater than a distance L15 between a boundary between the first front surface 621 and the second front surface 622 of the protrusion 94R and the rear surface 623 in the front-rear direction. A distance N20 in the up-down direction between the surfaces 634 and 635 of the through hole 587 is greater than a distance L16 in the up-down direction between the upper surface 624 and the lower surface 625 of the protrusion 94R. The protrusion 94R engages with the through hole 587. In other words, the protrusion 94R is engaged with the through hole 587, and thus the movement of the protrusion 94R in the front-rear direction and the movement of the protrusion 94R in the up-down direction are limited to a predetermined range by the through hole 587.

A distance N21 between a boundary between the surfaces 636 and 637 of the through hole 588 and the lower end of the surface 638 is greater than a distance L17 between a boundary between the third front surface 626 and the fourth front surface 627 of the protrusion 94L and the rear surface 628 in the front-rear direction. A distance N22 in the up-down direction between the surfaces 639 and 640 of the through hole 588 is greater than a distance L18 in the up-down direction between the upper surface 624 and the lower surface 625 of the protrusion 94L. The protrusion 94L engages with the through hole 588. In other words, the protrusion 94L is engaged with the through hole 588, and thus the movement of the protrusion 94L in the front-rear direction and the movement of the protrusion 94L in the up-down direction are limited to a predetermined range by the through hole 588.

The protrusions 94R and 94L and the through holes 587 and 588 allow the container body 31 to rotate about a rotation axis in the left-right direction with respect to the cover 32 of which the position is determined in the up-down direction. Further, the first front surface 621 of the protrusion 94R comes into contact with the surface 631 of the through hole 587 and the second front surface 622 comes into contact with the surface 632 of the through hole 587, whereby the position of the protrusion 94R in the up-down direction is determined in the through hole 587. The third front surface 626 of the protrusion 94L comes into contact with the surface 636 of the through hole 588, and the fourth front surface 627 comes into contact with the surface 637 of the through hole 587, whereby the position of the protrusion 94L in the up-down direction is determined in the through hole 588.

Fourth Modification

Figure 28:
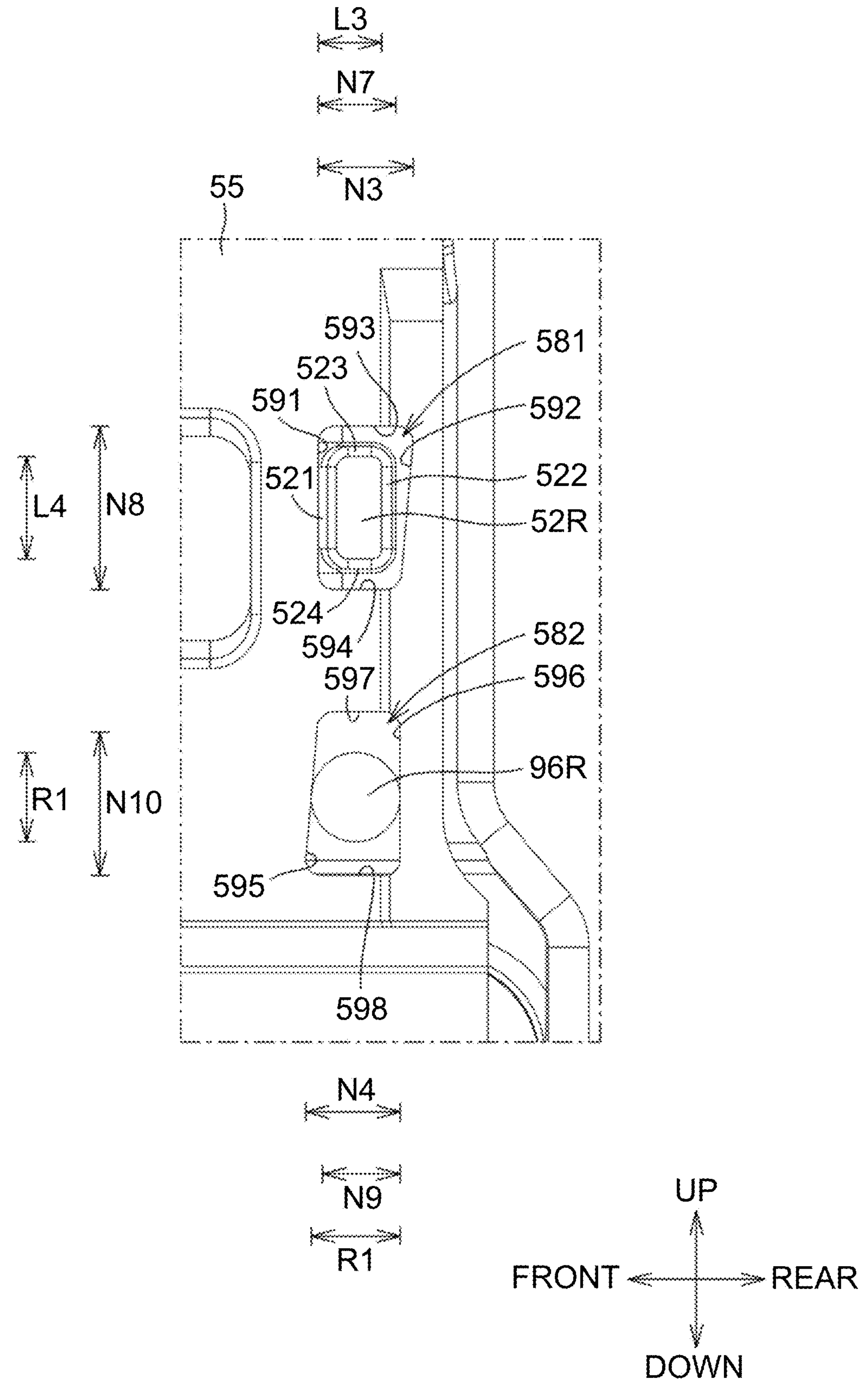
FIG. 28 is an enlarged view of the vicinity of a protrusion 96R.
Figure 29:
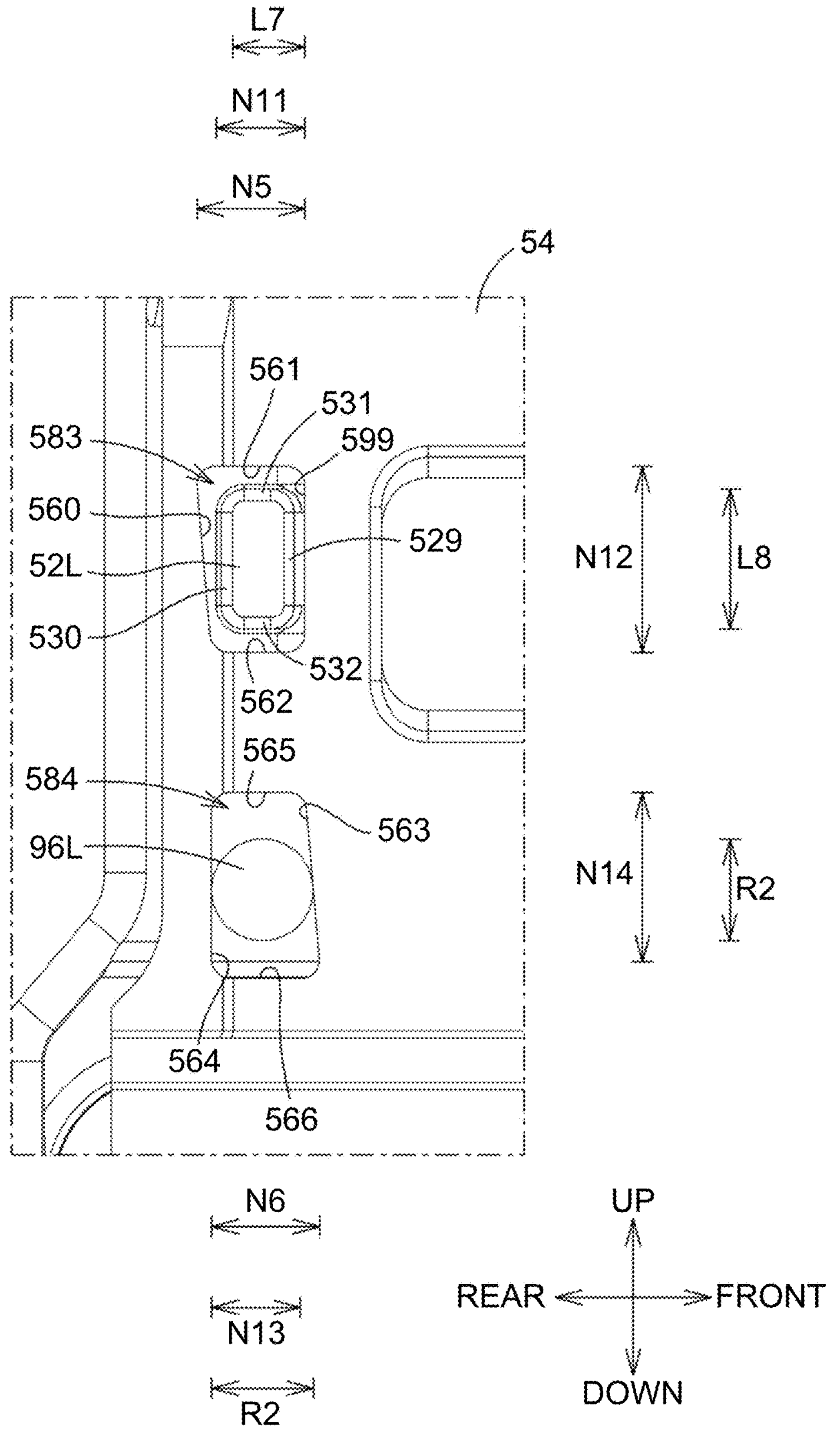
FIG. 29 is an enlarged view of the vicinity of a protrusion 96L.

As shown in FIGS. 28 and 29, the protrusions 52R and 52L located on the lower side may be replaced to the protrusions 96R and 96L. The protrusion 96R is a cylinder. The protrusion 96L is a cylinder. The outer radius 96R of the protrusion R1 is smaller than each of the distances N4 and N10 of the through hole 582. The outer radius 96L of the protrusion R2 is smaller than each of the distances N6 and N13 of the through hole 584. The outer peripheral surface of the protrusion 96R is in contact with the surfaces 595 and 596 of the through hole 582. The outer peripheral surface of the protrusion 96L is in contact with the surfaces 563 and 564 of the through hole 583.

The protrusion 96R engages with the through hole 582. In other words, the protrusion 96R is engaged with the through hole 582, and thus the movement of the protrusion 96R in the front-rear direction and the movement of the protrusion 96R in the up-down direction are limited to a predetermined range by the through hole 582. The protrusion 96L engages with the through hole 584. In other words, the protrusion 96L is engaged with the through hole 584, and thus the movement of the protrusion 96L in the front-rear direction and the movement of the protrusion 96L in the up-down direction are limited to a predetermined range by the through hole 584.

The protrusions 96R and 96L and the through holes 582 and 584 allow the container body 31 to rotate about a rotation axis extending in the left-right direction and passing through the center of the protrusion 96R and the center of the protrusion 96L with respect to the cover 32 of which the position is determined in the up-down direction. The cross-sectional shape of the protrusions 96R and 96L orthogonal to the left-right direction may be an elliptical shape instead of a circular shape.

Fifth Modification

Figure 30:
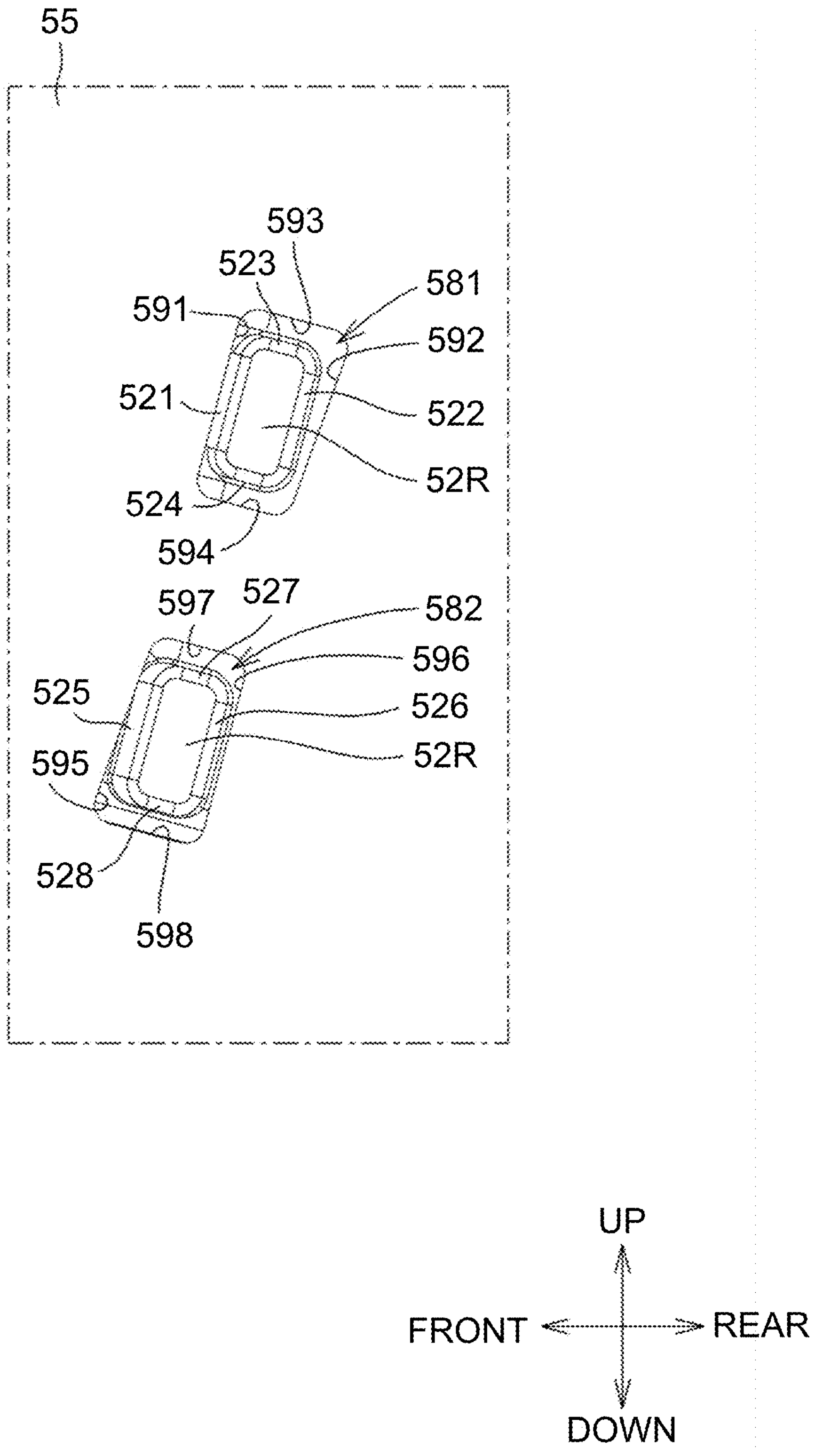
FIG. 30 is an enlarged view of the vicinity of a protrusion 52R according to a fifth modification.
Figure 31:
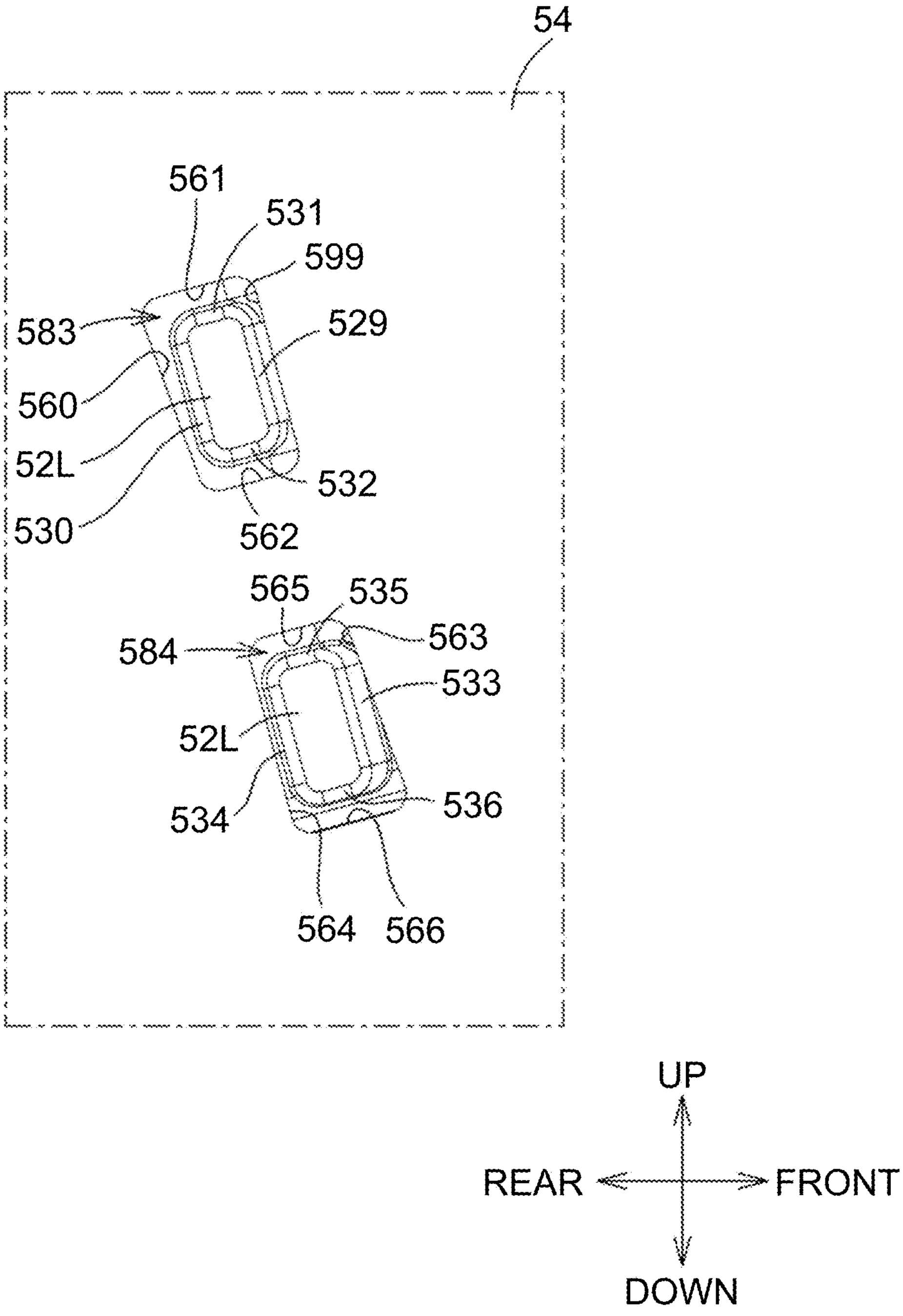
FIG. 31 is an enlarged view of the vicinity of a protrusion 52L according to the fifth modification.

As shown in FIGS. 30 and 31, the two protrusions 52R may be arranged at different positions in the front-rear direction and may be arranged in the up-down direction. In FIG. 30, the upper protrusion 52R is positioned rearward of the lower protrusion 52R. The two protrusions 52L may be arranged at different positions in the front-rear direction and may be arranged in the up-down direction. In FIG. 31, the upper protrusion 52L is positioned rearward of the lower protrusion 52L.

In the fifth modification, the front surface 521 of the protrusion 52R faces upward and forward. The rear surface 522 faces downward and rearward. The upper surface 523 faces upward and rearward. The lower surface 524 faces downward and forward. The front surface 525 of the protrusion 52R faces upward and forward. The rear surface 526 faces downward and rearward. The upper surface 527 faces upward and rearward. The lower surface 528 faces downward and forward.

The front surface 529 of the protrusion 52L faces upward and forward. The rear surface 530 faces downward and rearward. The upper surface 531 faces upward and rearward. The lower surface 532 faces downward and forward. The front surface 533 of the protrusion 52L faces upward and forward. The rear surface 534 faces downward and rearward. The upper surface 535 faces upward and rearward. The lower surface 536 faces downward and forward.

As shown in FIG. 30, the through hole 581 is positioned rearward of the through hole 582. As shown in FIG. 31, the through hole 583 is positioned rearward of the through hole 584.

The surface 591 of the through hole 581 faces rearward and downward. The surface 592 faces forward and upward. The surface 593 faces downward and forward. The surface 594 faces upward and rearward. The surface 595 of the through hole 582 faces rearward and downward. The surface 596 faces forward and upward. The surface 597 faces downward and forward. The surface 598 faces upward and rearward.

The surface 599 of the through hole 583 faces rearward and downward. The surface 560 faces forward and upward. The surface 561 faces downward and forward. The surface 562 faces upward and rearward. The surface 563 of the through hole 584 faces rearward and downward. The surface 564 faces forward and upward. The surface 565 faces downward and forward. The surface 566 faces upward and rearward.

A distance N3 in the front-rear direction between the upper end of the surface 591 and the upper end of the surface 592 of the through hole 581 is greater than a distance N4 in the front-rear direction between the lower end of the surface 595 and the lower end of the surface 596 of the through hole 582. A distance N5 in the front-rear direction between the upper end of the surface 599 and the upper end of the surface 560 of the through hole 583 is greater than a distance N6 in the front-rear direction between the lower end of the surface 563 and the lower end of the surface 564 of the through hole 584.

A distance N7 between the lower end of the surface 591 of the through hole 581 and the lower end of the surface 592 is greater than a distance L3 between the front surface 521 and the rear surface 522 of the protrusion 52R in the front-rear direction. A distance N8 in the up-down direction between the surfaces 593 and 594 of the through hole 581 is greater than a distance L4 in the up-down direction between the upper surface 523 and the lower surface 524 of the protrusion 52R. The protrusion 52R engages with the through hole 581. In other words, the protrusion 52R is engaged with the through hole 581, and thus the movement of the protrusion 52R in the front-rear direction and the movement of the protrusion 52R in the up-down direction are limited to a predetermined range by the through hole 581.

A distance N9 between the upper end of the surface 595 of the through hole 582 and the upper end of the surface 596 is greater than a distance L5 between the front surface 525 and the rear surface 526 of the protrusion 52R in the front-rear direction. A distance N10 in the up-down direction between the surfaces 597 and 598 of the through hole 582 is greater than a distance L6 in the up-down direction between the upper surface 527 and the lower surface 528 of the protrusion 52R. The protrusion 52R engages with the through hole 582. In other words, the protrusion 52R is engaged with the through hole 582, and thus the movement of the protrusion 52R in the front-rear direction and the movement of the protrusion 52R in the up-down direction are limited to a predetermined range by the through hole 582.

A distance N11 between the lower end of the surface 599 of the through hole 583 and the lower end of the surface 560 is greater than a distance L7 between the front surface 529 and the rear surface 530 of the protrusion 52L in the front-rear direction. A distance N12 in the up-down direction between the surfaces 561 and 562 of the through hole 583 is greater than a distance L8 between the upper surface 531 and the lower surface 532 of the protrusion 52L. The protrusion 52L engages with the through hole 583. In other words, the protrusion 52L is engaged with the through hole 583, and thus the movement of the protrusion 52L in the front-rear direction and the movement of the protrusion 52L in the up-down direction are limited to a predetermined range by the through hole 583.

A distance N13 between the upper end of the surface 563 of the through hole 584 and the upper end of the surface 564 in the front-rear direction is greater than a distance L9 between the front surface 533 and the rear surface 534 of the protrusion 52L in the front-rear direction. A distance N14 in the up-down direction between the surfaces 565 and 566 of the through hole 584 is greater than a distance L10 between the upper surface 535 and the lower surface 536 of the protrusion 52L. The protrusion 52L engages with the through hole 584. In other words, the protrusion 52L is engaged with the through hole 584, and thus the movement of the protrusion 52L in the front-rear direction and the movement of the protrusion 52L in the up-down direction are limited to a predetermined range by the through hole 584.

Figure 32:
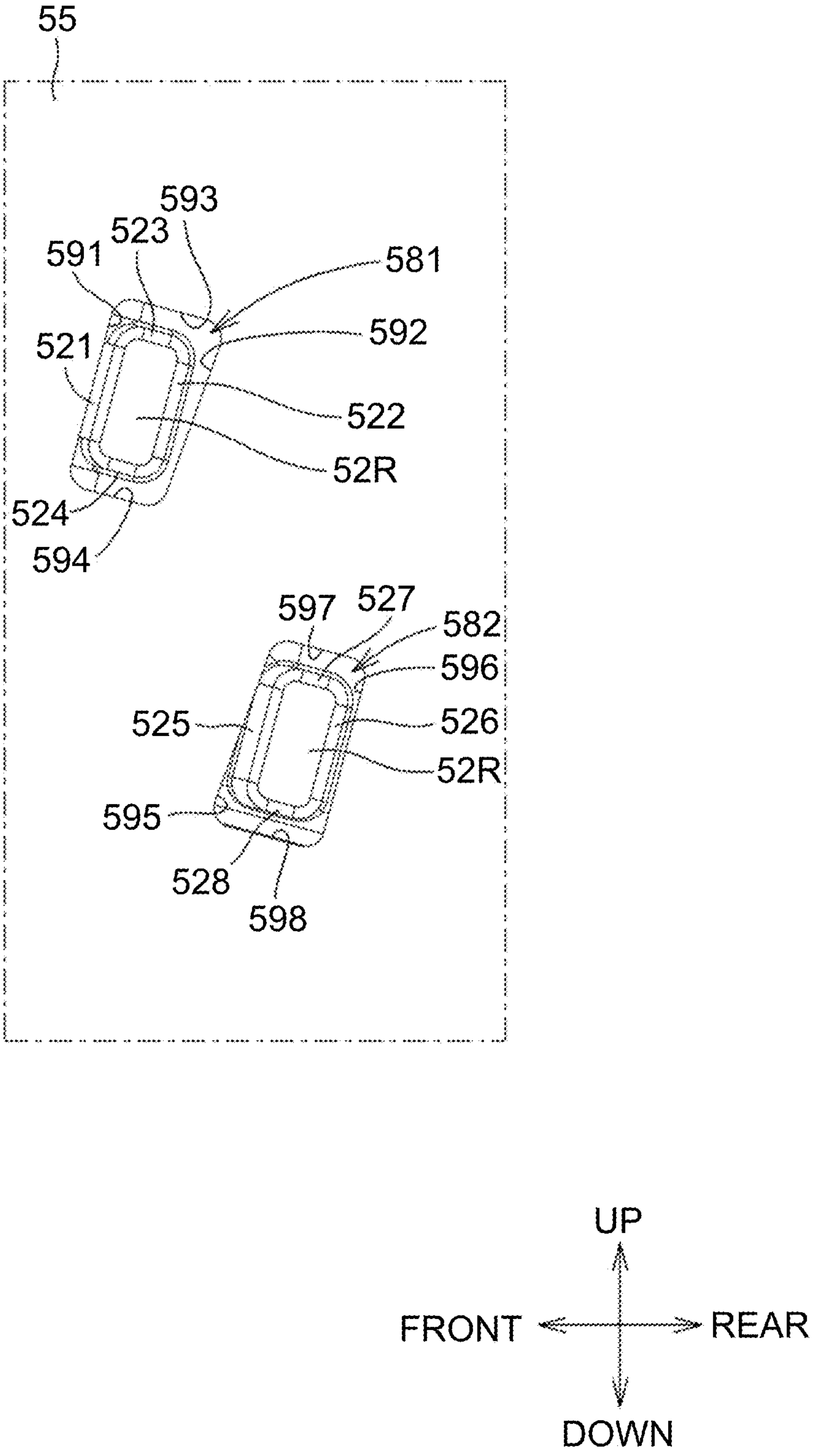
FIG. 32 is an enlarged view of the vicinity of a protrusion 52R according to the fifth modification.
Figure 33:
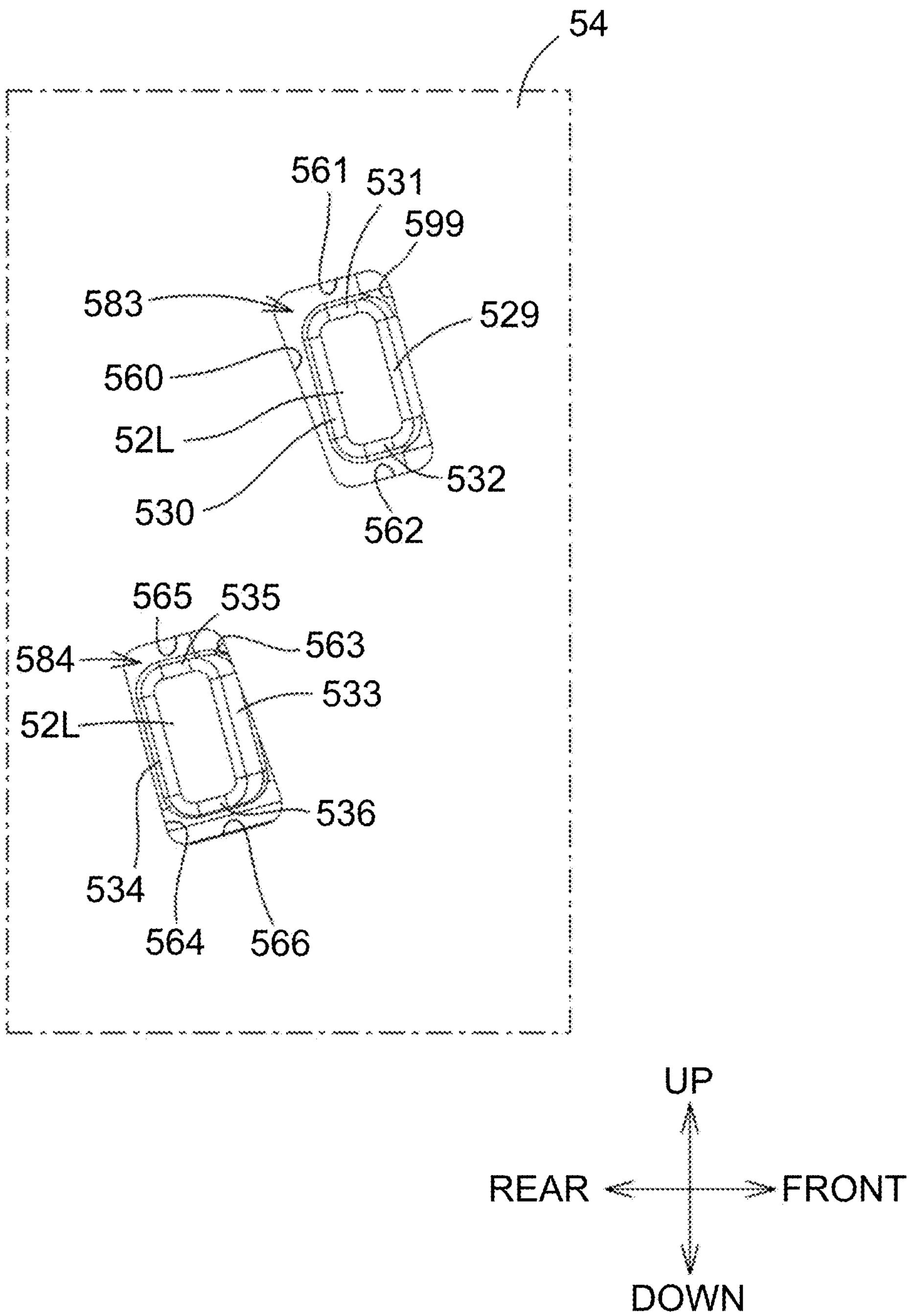
FIG. 33 is an enlarged view of the vicinity of a protrusion 52L according to the fifth modification.

The protrusions 92R and 92L and the through holes 581, 582, 583, and 584 allow the container body 31 to rotate about a rotation axis in the left-right direction with respect to the cover 32 of which the position in the up-down direction is determined. The positions of the protrusions 92R and 92L and the through holes 581, 582,583, and 584 may be the positions shown in FIGS. 32 and 33.

Sixth Modification

In the above-described embodiment, the protrusions 52R and 52L are positioned in the container body 31. Further, the through holes 581,582,583, and 584 are positioned in the cover 32. Alternatively, the container body 31 may have the recesses 151,152,153, and 154. The cover 32 may have the protrusions 155,156,157, and 158.

Figure 34:
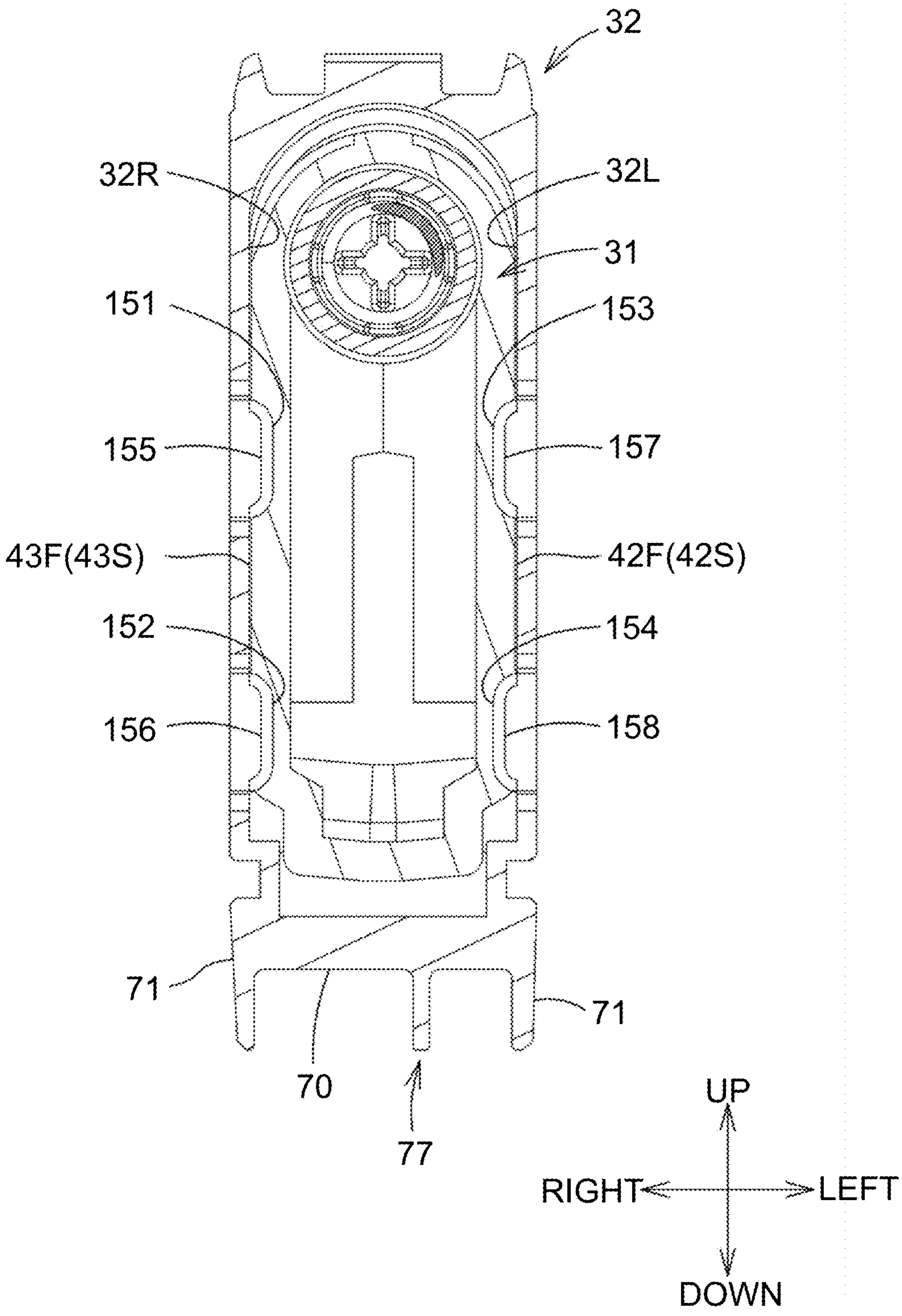
FIG. 34 is a cross-sectional view showing a cross section taken along line XX-XX of a sixth modification.

As shown in FIG. 34, two recesses 151 and 152 are positioned on the right surface 43S of the container body 31. The recess 151 is recessed leftward from the right surface 43S. The recess 152 is recessed leftward from the right surface 43S. The two recesses 151 and 152 are arranged in the up-down direction on the right surface 43S. The recess 151 has a quadrangular shape in which the distance in the up-down direction is greater than the distance in the front-rear direction in a side view. The recess 152 has a quadrangular shape in which the distance in the up-down direction is longer than the distance in the front-rear direction in a side view. The recess 151 is an example of the first engaging portion or a first recess. The recess 152 is an example of the first engagement portion and a second recess.

Two recesses 153 and 154 are positioned on the left surface 42S of the container body 31. The recess 153 is recessed rightward from the left surface 42S. The recess 154 is recessed rightward from the left surface 42S. The two recesses 153 and 154 are arranged in the up-down direction on the left surface 42S. The recess 153 has a quadrangular shape in which the distance in the up-down direction is greater than the distance in the front-rear direction in a side view. The recess 153 has a quadrangular shape in which the distance in the up-down direction is greater than the distance in the front-rear direction in a side view. The recess 153 is an example of the second engagement portion and a third recess. The recess 154 is an example of the second engagement portion and a fourth recess.

Two protrusions 155 and 156 are positioned on an inner surface 32R of the cover 32 that faces the right surface 43S of the container body 31. The protrusion 156 protrudes leftward from the inner surface 32R. The protrusion 156 protrudes leftward from the inner surface 32R. The two protrusions 155 and 156 are arranged in the up-down direction on the inner surface 32R. The protrusion 155 is a quadrangular pole having the distance in the up-down direction is greater than the distance in the front-rear direction in a side view. The protrusion 156 is a quadrangular pole having the distance in the up-down direction is greater than the distance in the front-rear direction in a side view. The protrusion 155 is an example of the third engagement portion and the first protrusion. The protrusion 156 is an example of the third engagement portion and the second protrusion.

Two protrusions 157 and 158 are positioned on an inner surface 32L of the cover 32 that faces the left surface 42S of the container body 31. The protrusion 157 protrudes leftward from the inner surface 32R. The protrusion 158 protrudes leftward from the inner surface 32R. The two protrusions 157 and 158 are arranged in the up-down direction on the inner surface 32R. The protrusion 157 is a quadrangular pole having the distance in the up-down direction is greater than the distance in the front-rear direction in a side view. The protrusion 158 is a quadrangular pole having the distance in the up-down direction is greater than the distance in the front-rear direction in a side view. The protrusion 157 is an example of the fourth engagement portion and the third protrusion. The protrusion 158 is an example of the fourth engagement portion and the fourth protrusion.

The recess 151 of the container body 31 engages with the protruding portion 155. The recess 151 of the container body 31 has the distance in the front-rear direction greater than the distance of the protruding portion 155 in the front-rear direction and the distance in the up-down direction greater than the distance of the protruding portion 155 in the up-down direction. The recess 152 of the container body 31 engages with the protrusion 156. The recess 152 of the container body 31 has the distance in the front-rear direction greater than the distance of the protrusion 156 in the front-rear direction and the distance in the up-down direction greater than the distance of the protrusion 156 in the up-down direction.

The recess 153 of the container body 31 engages with the protrusion 157.

The recess 153 of the container body 31 has the distance in the front-rear direction greater than the distance of the protrusion 157 in the front-rear direction and the distance in the up-down direction greater than the distance of the protrusion 157 in the up-down direction. The recess 154 of the container body 31 engages with the protrusion 158. The recess 154 of the container body 31 has the distance in the front-rear direction greater than the distance of the protrusion 158 in the front-rear direction and the distance in the up-down direction greater than the distance of the protrusion 158 in the up-down direction.

In a state where the container body 31 and the cover 32 are assembled, the cover 32 is movable relative to the container body 31 in the up-down direction and the front-rear direction. The cover 32 can move relative to the container body 31 not only in the up-down direction and the front-rear direction but also in a direction in which the cover 32 rotates relative to the container body 31.

In the above-described embodiment, the atmosphere opening path 38 is positioned on the upper front wall 40U of the container body 31, but the atmosphere opening path 38 may be positioned on a wall other than the front wall 40 of the container body 31, for example, on the upper wall 44.

In the above-described embodiment, the pressing plate 134 and the ink receiving member 130 are arranged in the cartridge case 110. However, the pressing plate 134 and the ink receiving member 130 may also be omitted. In other words, the first key portion 77 may realize only the function of identifying the characteristic of the ink cartridge 30.

In the above-described embodiment, the ink cartridge 30 is shown as an example of the ink container. However, the ink container may not be a cartridge attached to the printer 10, but may be a bottle for replenishing ink to a tank or the like of the printer.

What is claimed is:

1. An ink container attachable to an attachment portion, the ink container comprising:

a first member that includes a chamber configured to store ink and a supply portion having a supply opening that opens forward in a front-rear direction; and a second member positioned forward of the first member, wherein the first member includes:

a first contact surface that is positioned upward of the supply opening in an up-down direction orthogonal to the front-rear direction, faces rearward in the front-rear direction, and is in contact with the attachment portion in an attached state where the ink container is attached to the attachment portion;

a first engagement portion positioned at one side of the first member in a left-right direction intersecting the front-rear direction and the up-down direction; and a second engagement portion positioned at an other side of the first member in the left-right direction, the second member includes:

a second contact surface that faces upward in the up-down direction and is in contact with the attachment portion in the attached state;

a third contact surface that faces downward in the up-down direction and is configured to be in contact with the attachment portion in the attached state;

a third engagement portion configured to engage with the first engagement portion; and a fourth engagement portion configured to engage with the second engagement portion, and the first member is rotatable, with respect to the second member, about a rotation axis extending in the left-right direction.

2. The ink container according to claim 1, wherein the second member includes an electrical interface having an electrode facing upward, and the first member is movable, with respect to the second member, in the up-down direction.

3. The ink container according to claim 1, wherein the first member includes a right surface facing rightward in the left-right direction and a left surface facing leftward in the left-right direction, the first engagement portion is a protrusion that protrudes rightward in the left-right direction from the right surface, the second engagement portion is a protrusion that protrudes leftward in the left-right direction from the left surface, the third engagement portion is a recess configured to engage with the first engagement portion, and the fourth engagement portion is a recess configured to engage with the second engagement portion.

4. The ink container according to claim 3, wherein the first engagement portion is provided by a first protrusion and a second protrusion, as the protrusions, the second engagement portion is provided by a third protrusion and a fourth protrusion, as the protrusions, the third engagement portion is provided by a first through hole and a second through hole, as the recesses, the fourth engagement portion is provided by a third through hole and a fourth through hole, as the recesses, the first through hole and the second through hole are arranged in the up-down direction, the third through hole and the fourth through hole are arranged in the up-down direction, the first through hole is engaged with the first protrusion, and has a distance in the front-rear direction greater than a distance of the first protrusion in the front-rear direction and a distance in the up-down direction greater than a distance of the first protrusion in the up-down direction, the second through hole is engaged with the second protrusion, the third through hole is engaged with the third protrusion, and has a distance in the front-rear direction greater than a distance of the third protrusion in the front-rear direction and a distance in the up-down direction greater than a distance of the third protrusion in the up-down direction, and the fourth through hole is engaged with the first protrusion, the first protrusion is a quadrangular pole, the second protrusion is a cylinder, the first protrusion is a quadrangular pole, and the first protrusion is a cylinder.

5. The ink container according to claim 3, wherein the first engagement portion is provided by a first protrusion and a second protrusion, as the protrusions, the second engagement portion is provided by a third protrusion and a fourth protrusion, as the protrusions, the third engagement portion is provided by a first through hole and a second through hole, as the recesses, the fourth engagement portion is provided by a third through hole and a fourth through hole, as the recesses, the first through hole and the second through hole are arranged in the up-down direction, the third through hole and the fourth through hole are arranged in the up-down direction, the first through hole is engaged with the first protrusion, and has a distance in the front-rear direction greater than a distance of the first protrusion in the front-rear direction and a distance in the up-down direction greater than a distance of the first protrusion in the up-down direction, the second through hole is engaged with the second protrusion, and has a distance in the front-rear direction greater than a distance of the second protrusion in the front-rear direction and a distance in the up-down direction greater than a distance of the second protrusion in the up-down direction, the third through hole is engaged with the third protrusion, and has a distance in the front-rear direction greater than a distance of the third protrusion in the front-rear direction and a distance in the up-down direction greater than a distance of the third protrusion in the up-down direction, the fourth through hole is engaged with the first protrusion, and has a distance in the front-rear direction greater than a distance of the fourth protrusion in the front-rear direction and a distance in the up-down direction greater than a distance of the fourth protrusion in the up-down direction, the first protrusion and the second protrusion are different in position in the front-rear direction, and are arranged in the up-down direction, and the third protrusion and the fourth protrusion are different in position in the front-rear direction, and are arranged in the up-down direction.

6. The ink container according to claim 3, wherein the first engagement portion is provided by a first protrusion and a second protrusion, as the protrusions, the second engagement portion is provided by a third protrusion and a fourth protrusion, as the protrusions, the third engagement portion is provided by a first through hole and a second through hole, as the recesses, the fourth engagement portion is provided by a third through hole and a fourth through hole, as the recesses, the first through hole and the second through hole are arranged in the up-down direction, the third through hole and the fourth through hole are arranged in the up-down direction, the first through hole is engaged with the first protrusion, and has a distance in the front-rear direction greater than a distance of the first protrusion in the front-rear direction and a distance in the up-down direction greater than a distance of the first protrusion in the up-down direction, the second through hole is engaged with the second protrusion, and has a distance in the front-rear direction greater than a distance of the second protrusion in the front-rear direction and a distance in the up-down direction greater than a distance of the second protrusion in the up-down direction, the third through hole is engaged with the third protrusion, and has a distance in the front-rear direction greater than a distance of the third protrusion in the front-rear direction and a distance in the up-down direction greater than a distance of the third protrusion in the up-down direction, and the fourth through hole is engaged with the first protrusion, and has a distance in the front-rear direction greater than a distance of the fourth protrusion in the front-rear direction and a distance in the up-down direction greater than a distance of the fourth protrusion in the up-down direction.

7. The ink container according to claim 6, wherein the first protrusion has a first front surface and a second front surface, the second protrusion has a third front surface and a fourth front surface, the first through hole has a first surface that faces the first front surface and a second surface that faces the second front surface, the second through hole has a third surface that faces the third front surface and a fourth surface that faces the fourth front surface, the first front surface is inclined with respect to the up-down direction so as to extend rearward as the first front surface extends upward, the second front surface is inclined with respect to the up-down direction so as to extend frontward as the second front surface extends upward, the third front surface is inclined with respect to the up-down direction so as to extend rearward as the third front surface extends upward, the fourth front surface is inclined with respect to the up-down direction so as to extend frontward as the fourth front surface extends upward, the first surface is inclined with respect to the up-down direction so as to extend rearward as the first surface extends upward, and the second surface is inclined with respect to the up-down direction so as to extend forward as the second surface extends upward, and the third surface is inclined with respect to the up-down direction so as to extend rearward as the third surface extends upward, and the fourth surface is inclined with respect to the up-down direction so as to extend forward as the fourth surface extends upward.

8. The ink container according to claim 6, wherein the first protrusion is a quadrangular pole having a first front surface and a first rear surface, the second protrusion is a quadrangular pole having a second front surface and a second rear surface, the third protrusion is a quadrangular pole having a third front surface and a third rear surface, the fourth protrusion is a quadrangular pole having a fourth front surface and a fourth rear surface, the first through hole has a first surface that faces the first front surface and a second surface that faces the first rear surface, the second through hole has a third surface that faces the second front surface and a fourth surface that faces the second rear surface, the third through hole has a fifth surface that faces the third front surface and a sixth surface that faces the third rear surface, the fourth through hole has a seventh surface that faces the fourth front surface and an eighth surface that faces the fourth rear surface, each of the first front surface, the second front surface, the third front surface, and the fourth front surface extends in the up-down direction, a distance in the front-rear direction between the first surface and the second surface is greater than a distance in the front-rear direction between the third surface and the fourth surface, and a distance in the front-rear direction between the fifth surface and the sixth surface is greater than a distance in the front-rear direction between the seventh surface and the eighth surface.

9. The ink container according to claim 8, wherein the first surface is positioned rearward of the third surface, and the fifth surface is positioned rearward of the seventh surface.

10. The ink container according to claim 8, wherein the second surface is inclined, with respect to the first rear surface, so as to extend rearward as the second surface extends upward, and the sixth surface is inclined, with respect to the third rear surface, so as to extend rearward as the sixth surface extends upward.

11. The ink container according to claim 8, wherein the first rear surface is inclined, with respect to the second surface, so as to extend forward as the first rear surface extends upward, and the third rear surface is inclined, with respect to the sixth surface, so as to extend forward as the third rear surface extends upward.

12. The ink container according to claim 1, wherein the second member has an inner surface that faces the first member, the third engagement portion is a protrusion that protrudes rightward from an inner surface of the second member, the fourth engagement portion is a protrusion that protrudes leftward from an inner surface of the second member, the first engagement portion is a recess that engages with the third engagement portion, and the second engagement portion is a recess that engages with the fourth engagement portion.

13. The ink container according to claim 12, wherein the third engagement portion is provided by a first protrusion and a second protrusion, as the protrusions, the fourth engagement portion is provided by a third protrusion and a fourth protrusion, as the protrusions, the first engagement portion is provided by a first recess and a second recess, as the recesses, the second engagement portion is provided by a third recess and a fourth recess, as the recesses, the first protrusion and the second protrusion are arranged in the up-down direction, the third protrusion and the fourth protrusion are arranged in the up-down direction, the first recess engages with the first protrusion, has a distance in the front-rear direction greater than a distance of the first protrusion in the front-rear direction and a distance in the up-down direction greater than a distance of the first protrusion in the up-down direction, the second recess engages with the second protrusion, has a distance in the front-rear direction greater than a distance of the second protrusion in the front-rear direction and a distance in the up-down direction greater than a distance of the second protrusion in the up-down direction, the third recess engages with the third protrusion, has a distance in the front-rear direction greater than a distance of the third protrusion in the front-rear direction and a distance in the up-down direction greater than a distance of the third protrusion in the up-down direction, and the fourth recess engages with the fourth protrusion, has a distance in the front-rear direction greater than a distance of the fourth protrusion in the front-rear direction and a distance in the up-down direction greater than a distance of the fourth protrusion in the up-down direction.

* * * * *